United States Patent
Zhou et al.

(10) Patent No.: US 12,224,825 B2
(45) Date of Patent: *Feb. 11, 2025

(54) MAPPING BETWEEN BEAMS AND ANTENNA PANELS

(71) Applicant: QUALCOMM Incorporated, San Diego, CA (US)

(72) Inventors: Yan Zhou, San Diego, CA (US); Tianyang Bai, Mountain View, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,529

(22) Filed: Nov. 8, 2023

(65) Prior Publication Data

US 2024/0187060 A1 Jun. 6, 2024

Related U.S. Application Data

(63) Continuation of application No. 17/450,120, filed on Oct. 6, 2021, now Pat. No. 11,855,722.

(60) Provisional application No. 63/198,297, filed on Oct. 8, 2020, provisional application No. 63/198,296, filed on Oct. 8, 2020.

(51) Int. Cl.
*H04L 5/12* (2006.01)
*H04B 7/06* (2006.01)
*H04B 7/08* (2006.01)

(52) U.S. Cl.
CPC ......... *H04B 7/0608* (2013.01); *H04B 7/0632* (2013.01); *H04B 7/0695* (2013.01); *H04B 7/0802* (2013.01)

(58) Field of Classification Search
CPC .. H04B 7/0608; H04B 7/0632; H04B 7/0695; H04B 7/0802
USPC ................ 375/262, 260, 259, 219, 295, 316
See application file for complete search history.

(56) References Cited

U.S. PATENT DOCUMENTS

| | | | |
|---|---|---|---|
| 2018/0026687 A1* | 1/2018 | Rahman | H04B 7/0469 375/267 |
| 2019/0028167 A1* | 1/2019 | Chang | H04B 7/063 |
| 2022/0116083 A1 | 4/2022 | Zhou et al. | |

(Continued)

FOREIGN PATENT DOCUMENTS

| | | |
|---|---|---|
| EP | 3890205 A1 | 10/2021 |
| WO | 2019193581 A2 | 10/2019 |
| WO | 2021044382 A1 | 3/2021 |

(Continued)

OTHER PUBLICATIONS

International Preliminary Report on Patentability—PCT/US2021/071769—The International Bureau of WIPO—Geneva, Switzerland—Apr. 20, 2023.

(Continued)

*Primary Examiner* — Zewdu A Kassa
(74) *Attorney, Agent, or Firm* — Harrity & Harrity, LLP

(57) ABSTRACT

Various aspects of the present disclosure generally relate to wireless communication. In some aspects, a user equipment (UE) may generate a report indicating a mapping between antenna panels and reference signal beam indications. The UE may transmit the report and apply the mapping to the antenna panels for reference signals. Numerous other aspects are provided.

20 Claims, 30 Drawing Sheets

1300 ⟶

1330
Generate mapping between antenna panels of UE and reference signal beam indications

BS 1310

1335
Transmit mapping

1345
Communicate based at least in part on the mapping

1340
Configure antenna panels based at least in part on mapping

UE 1320

(56) References Cited

U.S. PATENT DOCUMENTS

2022/0321240 A1* 10/2022 Zhang .................. H04B 17/318

FOREIGN PATENT DOCUMENTS

| WO | 2021203263 A1 | 10/2021 |
| WO | 2022031546 A1 | 2/2022 |

OTHER PUBLICATIONS

International Search Report and Written Opinion—PCT/US2021/071769—ISA/EPO—Feb. 16, 2022.

Qualcomm Incorporated: "Enhancements on Multi-Beam Operation", 3GPP Draft, 3GPP TSG-RAN WG1 Meeting #97, R1-1907290 Enhancements on Multi-beam Operation, 3rd Generation Partnership Project (3GPP), Mobile Competence Centre, 650, Route Des Lucioles, F-06921 Sophia-Anti Polis Cedex, France, vol. RAN WG1, No. Reno, USA, May 13-May 17, 2019, May 13, 2019 (May 13, 2019), XP051728730, XP051709313, pp. 1-26, Sections 2-8, Sections 1, 6, 8.2 and 8.4, p. 11, paragraph 1-paragraph 2.

Kumar N., "Lean Beam Management for New Radio", Department of Electrical and Information Technology Lund University, Aug. 19, 2020, 81 Pages.

\* cited by examiner

MAPPING BETWEEN BEAMS AND ANTENNA PANELS

CROSS-REFERENCE TO RELATED APPLICATIONS

This application is a continuation of U.S. application Ser. No. 17/450,120 entitled "MAPPING BETWEEN BEAMS AND ANTENNA PANELS" filed Oct. 6, 2021, which claims priority to U.S. Provisional Patent Application No. 63/198,296, filed on Oct. 8, 2020, entitled "USER EQUIPMENT INITIATED UPDATE OF MAPPING BETWEEN BEAMS AND ANTENNA PANELS" and U.S. Provisional Patent Application No. 63/198,297, filed on Oct. 8, 2020, entitled "SIGNALED MAPPING BETWEEN BEAMS AND ANTENNA PANELS," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for updating a mapping between beams and antenna panels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a 5G BS, or a 5G Node B.

The above multiple access technologies have been adopted in various telecommunication standards to provide a common protocol that enables different user equipment to communicate on a municipal, national, regional, and even global level. 5G, which may also be referred to as New Radio (NR), is a set of enhancements to the LTE mobile standard promulgated by the 3GPP). 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

A user equipment (UE) may receive downlink communications or transmit uplink communications using a beam generated by an antenna panel, which may be a physical or virtual grouping of antennas or antenna ports. A beam may be configured as, or represented by, a beam indication, and the beam indication may be mapped to the antenna panel. Multiple beam indications may be mapped to multiple antenna panels.

Due to UE movement and/or rotation, one antenna panel of the UE may be better than another antenna panel for a beam indication. For example, a reference signal may be measured by an antenna panel. If a change in position of the UE causes the antenna panel measuring the reference signal to be blocked, the UE may determine that the UE needs to switch from the antenna panel to another antenna panel. However, a base station transmitting or receiving a reference signal in the beam indication may not receive information about the need for switching antenna panels until the base station receives a scheduled beam report. Until then, the UE has to use the antenna panel with poor quality.

According to various aspects described herein, a UE may initiate generation and transmission of a report, to a base station, that indicates a mapping between one or more beam indications and one or more antenna panels. A beam indication may be a reference signal beam indication, or a beam indication that is specific to a reference signal. This may be due to an event or other triggering condition. The UE may receive, from the base station, an indication to use the new mapping, and/or the UE may proceed to use the new mapping a specified time duration after transmitting the report. As a result, the UE and the base station may use a better antenna panel for a reference signal and not suffer a degradation in communications.

In some aspects, a method of wireless communication performed by a UE includes generating a report indicating a mapping between one or more antenna panels and one or more beam indications, and transmitting, to a base station, the report indicating the mapping.

In some aspects, a method of wireless communication performed by a base station includes receiving a report indicating a mapping between one or more antenna panels of a UE and one or more beam indications, and transmitting, to the UE, one of an indication to apply the mapping indicated by the report, an indication to apply a modified mapping, or an indication to not apply the mapping.

In some aspects, a UE for wireless communication includes a memory and one or more processors coupled to the memory, the one or more processors configured to generate a report indicating a mapping between one or more antenna panels and one or more beam indications, and transmit, to a base station, the report indicating the mapping.

In some aspects, a base station for wireless communication includes a memory and one or more processors coupled to the memory, the one or more processors configured to receive a report indicating a mapping between one or more antenna panels of a UE and one or more beam indications, and transmit, to the UE, one of an indication to apply the mapping indicated by the report, an indication to apply a modified mapping, or an indication to not apply the mapping.

In some aspects, a non-transitory computer-readable medium storing a set of instructions for wireless communication includes one or more instructions that, when executed by one or more processors of a UE, cause the UE to generate a report indicating a mapping between one or more antenna panels and one or more beam indications, and transmit, to a base station, the report indicating the mapping.

In some aspects, a non-transitory computer-readable medium storing a set of instructions for wireless communication includes one or more instructions that, when executed by one or more processors of a base station, cause the base station to receive a report indicating a mapping between one or more antenna panels of a UE and one or more beam indications, and transmit, to the UE, one of an indication to apply the mapping indicated by the report, an indication to apply a modified mapping, or an indication to not apply the mapping.

In some aspects, an apparatus for wireless communication includes means for generating a report indicating a mapping between one or more antenna panels and one or more beam indications; and means for transmitting, to a base station, the report indicating the mapping.

In some aspects, an apparatus for wireless communication includes means for receiving a report indicating a mapping between one or more antenna panels of a UE and one or more beam indications, and means for transmitting, to the UE, one of an indication to apply the mapping indicated by the report, an indication to apply a modified mapping, or an indication to not apply the mapping.

In some aspects, an antenna panel may generate an analog beam, and transmit or receive a reference signal, data, or control information in the beam. The beam may be configured as a beam indication that corresponds to a transmission configuration indication (TCI) state or spatial relation information. A base station may transmit a downlink reference signal, and a UE may have an antenna panel that is mapped to a beam indication that includes the downlink reference signal (reference signal beam indication). Conversely, the UE may also have an antenna panel that is mapped to a beam indication for an uplink reference signal (reference signal beam indication). Due to changing circumstances, a base station may need to update a mapping between a beam indication and an antenna panel at the UE. If a mapping is not aligned, the UE may use an antenna panel that is no longer preferred or has poor strength or quality. The UE may use the antenna panel until the base station responds to a scheduled beam report from the UE. During this time, performance may degrade and the UE may waste time, processing resources, and signaling resources sending retransmissions or performing other operations that are based on degraded signals and/or inaccurate reference signal measurements.

According to various aspects described herein, a base station may indicate, to a UE, a new mapping between one or more beam indications and one or more antenna panels. The UE may receive the new mapping and configure an antenna panel to associate with a beam indication according to the mapping. Accordingly, the UE may switch one or more antenna panels for one or more beam indications without waiting for a base station response to a scheduled beam report. Thus, the UE and the base station may experience increased reliability and quality of communications as well as decreased network overhead. The reduced network overhead further causes the base station and the UE to conserve power, processing resources, and signaling resources.

In some aspects, a method of wireless communication performed by a UE includes receiving, from a base station, a mapping between one or more antenna panels of the UE and one or more reference signal beam indications. The method may include configuring the one or more antenna panels based at least in part on the mapping.

In some aspects, a method of wireless communication performed by a base station includes generating a mapping between one or more antenna panels of a UE and one or more reference signal beam indications, transmitting the mapping to the UE, and communicating with the UE based at least in part on the mapping.

In some aspects, a method of wireless communication performed by a UE includes transmitting a report, scheduled by a base station, for a beam indication that includes: a downlink reference signal, the report including a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier. The method may include applying a mapping between one or more antenna panels of the UE and one or more reference signal beam indications based at least in part on the report for the downlink reference signal.

In some aspects, a method of wireless communication performed by a base station includes scheduling a report, from a UE, for a beam indication that includes: a downlink reference signal, the report including a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier. The method may include applying a mapping between one or more antenna panels of the UE and one or more reference signal beam indications based at least in part on the report for the downlink reference signal.

In some aspects, a method of wireless communication performed by a UE includes receiving, in downlink control information (DCI) from a base station, a scheduling offset for receiving, after the DCI, data or a downlink reference signal. The method may include buffering downlink data according to a default beam indication, and according to a configured mapping between the default beam indication and one or more antenna panels of the UE, based at least in part on whether the scheduling offset satisfies an offset threshold.

In some aspects, a UE for wireless communication includes a memory and one or more processors coupled to the memory, the one or more processors configured to receive, from a base station, a mapping between one or more antenna panels of the UE and one or more reference signal beam indications. The one or more processors may be configured to configure the one or more antenna panels based at least in part on the mapping.

In some aspects, a base station for wireless communication includes a memory and one or more processors coupled to the memory, the one or more processors configured to generate a mapping between one or more antenna panels of a UE and one or more reference signal beam indications, transmit the mapping to the UE, and communicate with the UE based at least in part on the mapping.

In some aspects, a UE for wireless communication includes a memory and one or more processors coupled to the memory, the one or more processors configured to transmit a report, scheduled by a base station, for a beam indication that includes: a downlink reference signal, the report including a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier. The one or more processors may be configured to apply a mapping between one or more antenna panels of the UE and one or more reference signal beam indications based at least in part on the report for the downlink reference signal.

In some aspects, a base station for wireless communication includes a memory and one or more processors coupled to the memory, the one or more processors configured to schedule a report, from a UE, for a beam indication that includes a downlink reference signal, the report including: a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier. The one or more processors may be configured to apply a mapping between one or more antenna panels of the UE and one or more reference signal beam indications based at least in part on the report for the downlink reference signal.

In some aspects, a UE for wireless communication includes a memory and one or more processors coupled to the memory, the one or more processors configured to receive, in DCI from a base station, a scheduling offset for receiving, after the DCI, data or a downlink reference signal, and buffer downlink data according to a default beam indication, and according to a configured mapping between the default beam indication and one or more antenna panels of the UE, based at least in part on whether the scheduling offset satisfies an offset threshold.

In some aspects, a non-transitory computer-readable medium storing a set of instructions for wireless communication includes one or more instructions that, when executed by one or more processors of a UE, cause the UE to receive, from a base station, a mapping between one or more antenna panels of the UE and one or more reference signal beam indications, and configure the one or more antenna panels based at least in part on the mapping.

In some aspects, a non-transitory computer-readable medium storing a set of instructions for wireless communication includes one or more instructions that, when executed by one or more processors of a base station, cause the base station to generate a mapping between one or more antenna panels of a UE and one or more reference signal beam indications, transmit the mapping to the UE, and communicate with the UE based at least in part on the mapping.

In some aspects, a non-transitory computer-readable medium storing a set of instructions for wireless communication includes one or more instructions that, when executed by one or more processors of a UE, cause the UE to transmit a report, scheduled by a base station, for a beam indication that includes: a downlink reference signal, the report including a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier; and apply a mapping between one or more antenna panels of the UE and one or more reference signal beam indications based at least in part on the report for the downlink reference signal.

In some aspects, a non-transitory computer-readable medium storing a set of instructions for wireless communication includes one or more instructions that, when executed by one or more processors of a base station, cause the base station to schedule a report, from a UE, for a beam indication that includes a downlink reference signal, the report including: a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier; and apply a mapping between one or more antenna panels of the UE and one or more reference signal beam indications based at least in part on the report for the downlink reference signal.

In some aspects, a non-transitory computer-readable medium storing a set of instructions for wireless communication includes one or more instructions that, when executed by one or more processors of a UE, cause the UE to receive, in DCI from a base station, a scheduling offset for receiving, after the DCI, data or a downlink reference signal, and buffer downlink data according to a default beam indication, and according to a configured mapping between the default beam indication and one or more antenna panels of the UE, based at least in part on whether the scheduling offset satisfies an offset threshold.

In some aspects, an apparatus for wireless communication includes means for receiving, from a base station, a mapping between one or more antenna panels of the apparatus and one or more reference signal beam indications and means for configuring the one or more antenna panels based at least in part on the mapping.

In some aspects, an apparatus for wireless communication includes means for generating a mapping between one or more antenna panels of a UE and one or more reference signal beam indications, means for transmitting the mapping to the UE, and means for communicating with the UE based at least in part on the mapping.

In some aspects, an apparatus for wireless communication includes means for transmitting a report, scheduled by a base station, for a beam indication that includes: a downlink reference signal, the report including a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier; and means for applying a mapping between one or more antenna panels of the apparatus and one or more reference signal beam indications based at least in part on the report for the downlink reference signal.

In some aspects, an apparatus for wireless communication includes means for scheduling a report, from a UE, for a beam indication that includes a downlink reference signal, the report including: a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier; and means for applying a mapping between one or more antenna panels of the UE and one or more reference signal beam indications based at least in part on the report for the downlink reference signal.

In some aspects, an apparatus for wireless communication includes means for receiving, in DCI from a base station, a scheduling offset for receiving, after the DCI, data or a downlink reference signal and means for buffering downlink data according to a default beam indication, and according to a configured mapping between the default beam indication and one or more antenna panels of the apparatus, based at least in part on whether the scheduling offset satisfies an offset threshold.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
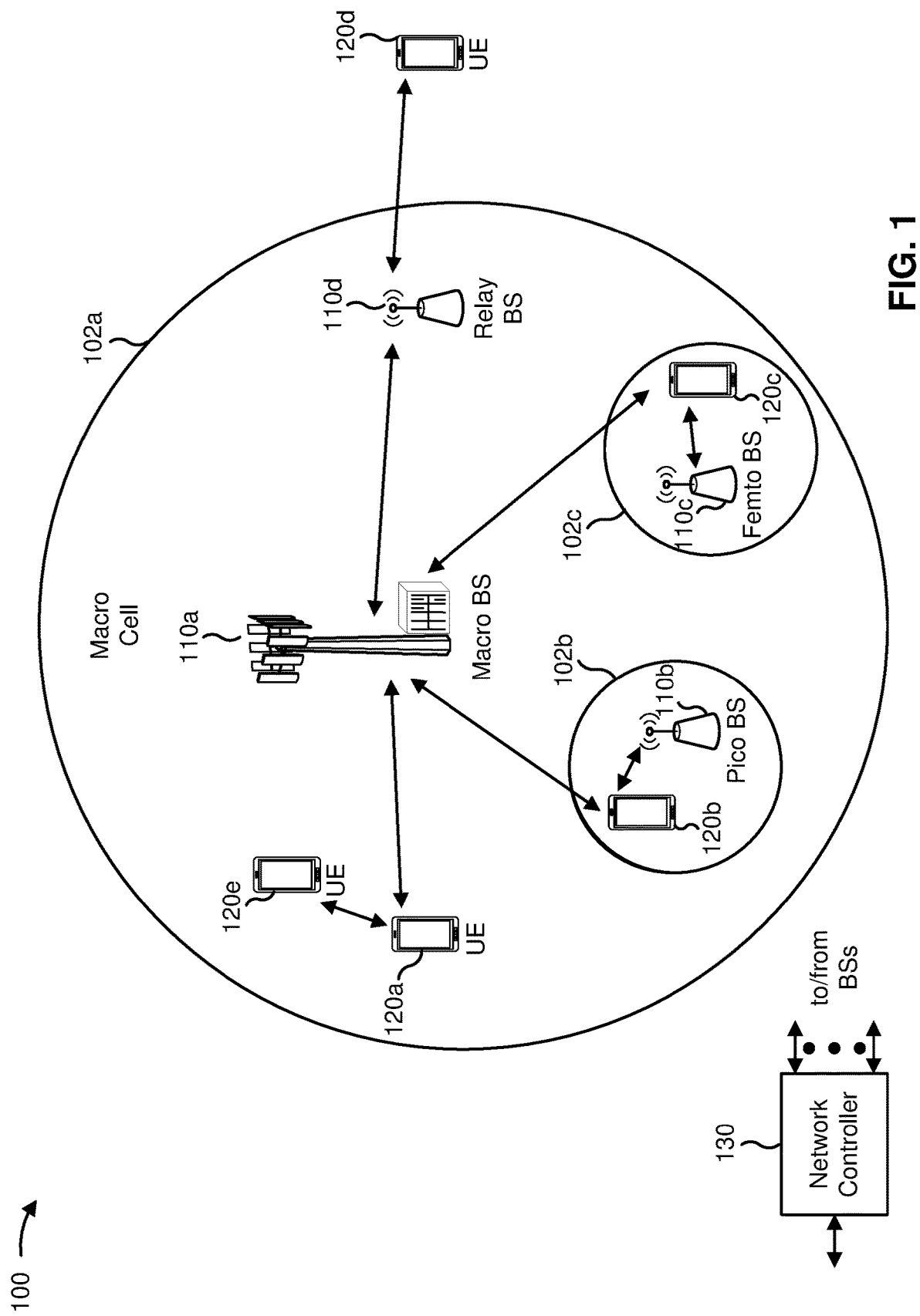
FIG. 1 is diagram illustrating an example of a wireless network, in accordance with the present disclosure.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, and/or algorithms (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, and/or functions, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as a 5G BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, or a station, among other examples. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment. UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled. UE 120 may use such processors to generate and transmit a mapping of beams and antennas.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, and/or channels. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHZ-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHZ). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
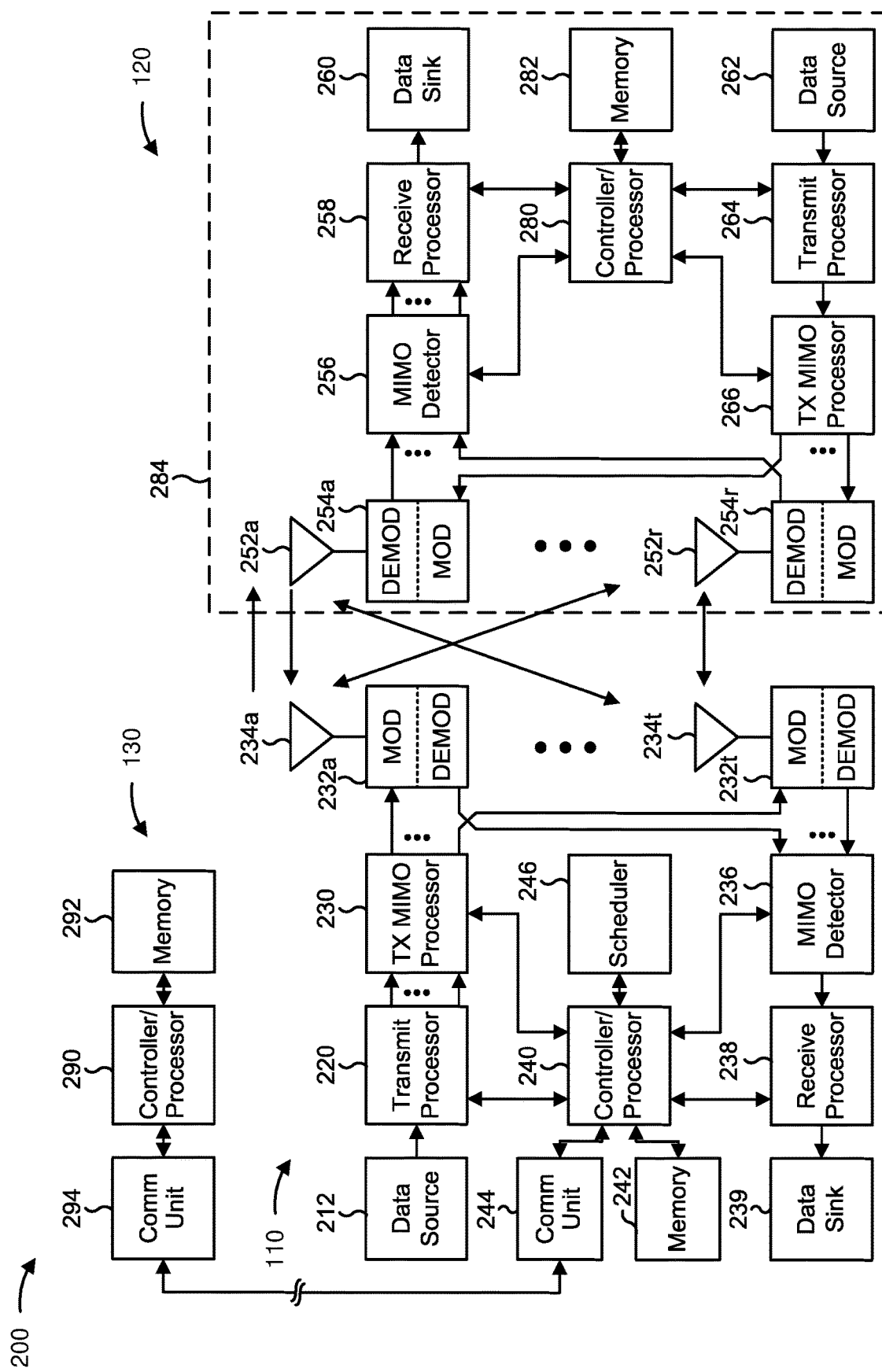
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with a mapping between beams and antenna panels, as described in more detail elsewhere herein. For example, controller/processor 240 of base station 110, controller/processor 280 of UE 120, and/or any other component(s) of FIG. 2 may perform or direct operations of, for example, method 700 of FIG. 7, method 800 of FIG. 8, method 1600 of FIG. 16, method 1700 of FIG. 17, method 1800 of FIG. 18, method 1900 of FIG. 19, method 2000 of FIG. 20, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, method 700 of FIG. 7, method 800 of FIG. 8, method 1600 of FIG. 16, method 1700 of FIG. 17, method 1800 of FIG. 18, method 1900 of FIG. 19, method 2000 of FIG. 20, and/or other processes as described herein. In some aspects, executing instructions may include running the instructions, converting the instructions, compiling the instructions, and/or interpreting the instructions, among other examples.

As indicated above, FIG. 2 is provided as an example. Other examples may differ from what is described with regard to FIG. 2.

Figure 3:
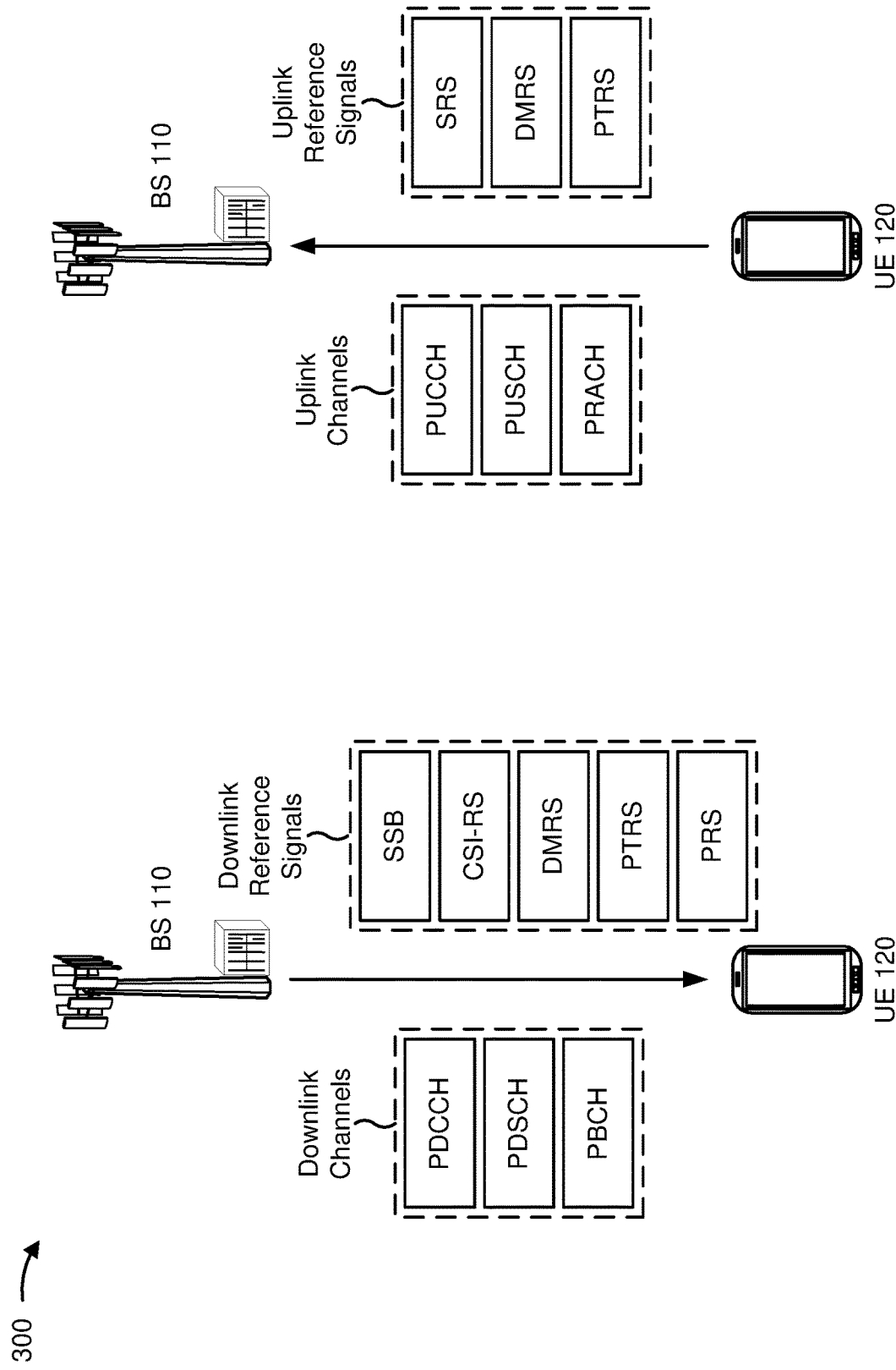
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
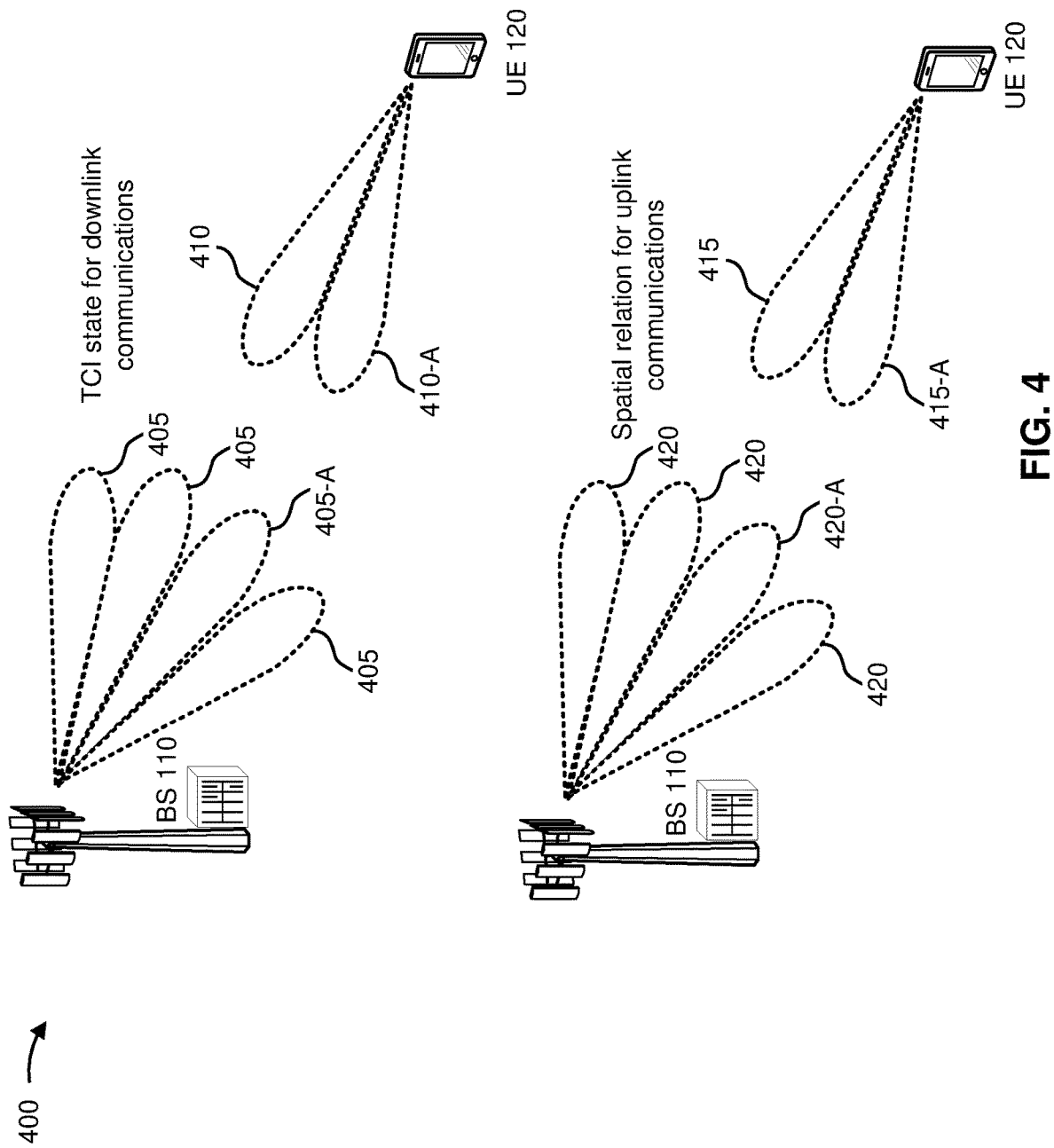
FIG. 4 is a diagram illustrating an example of using beams for communications between a base station and a UE, in accordance with the present disclosure.

FIG. 4 is a diagram illustrating an example 400 of using beams for communications between a base station and a UE, in accordance with the present disclosure. As shown in FIG. 4, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 405.

The UE 120 may attempt to receive downlink transmissions via one or more UE receive beams 410, which may be configured using different beamforming parameters at receive circuitry of the UE 120. The UE 120 may identify a particular BS transmit beam 405, shown as BS transmit beam 405-A, and a particular UE receive beam 410, shown as UE receive beam 410-A, that provide relatively favorable performance (for example, that have a best channel quality of the different measured combinations of BS transmit beams 405 and UE receive beams 410). In some examples, the UE 120 may transmit an indication of which BS transmit beam 405 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 405-A and the UE receive beam 410-A), which may be further refined and maintained in accordance with one or more established beam refinement procedures.

A downlink beam, such as a BS transmit beam 405 or a UE receive beam 410, may be associated with a TCI state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 405 may be associated with an SSB, and the UE 120 may indicate a preferred BS transmit beam 405 by transmitting uplink transmissions in resources of the SSB that are associated with the preferred BS transmit beam 405.

A particular SSB may have an associated TCI state (for example, for an antenna port or for beamforming). The base station 110 may, in some examples, indicate a downlink BS transmit beam 405 based at least in part on antenna port QCL properties that may be indicated by the TCI state. A TCI state may be associated with one downlink reference signal set (for example, an SSB and an aperiodic, periodic, or semi-persistent CSI-RS) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the base station 110 indicating a BS transmit beam 405 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission on a PDCCH or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 415.

The base station 110 may receive uplink transmissions via one or more BS receive beams 420. The base station 110 may identify a particular UE transmit beam 415, shown as UE transmit beam 415-A, and a particular BS receive beam 420, shown as BS receive beam 420-A, that provide relatively favorable performance (for example, that have a best channel quality of the different measured combinations of UE transmit beams 415 and BS receive beams 420). In some examples, the base station 110 may transmit an indication of which UE transmit beam 415 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 415-A and the BS receive beam 420-A), which may be further refined and maintained in accordance with one or more established beam refinement procedures. An uplink beam, such as a UE transmit beam 415 or a BS receive beam 420, may be associated with a spatial relation. A spatial relation may indicate a directionality or a characteristic of the uplink beam, similar to one or more QCL properties, as described above.

In some aspects, the UE 120 may perform beam management procedures. A first beam management procedure may be referred to as a beam selection procedure, an initial beam acquisition procedure, a beam sweeping procedure, a cell search procedure, a beam search procedure, and/or the like. CSI-RSs may be transmitted from the base station 110 to the UE 120. The CSI-RSs may be periodic (e.g., using RRC signaling and/or the like), semi-persistent (e.g., using media access control (MAC) control element (MAC-CE) signaling and/or the like), and/or aperiodic (e.g., using DCI and/or the like).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) or beam pair(s). The UE 120 may report the measurements to the base station 110 to enable the base station 110 to select one or more beam pair(s) for communication between the base station 110 and the UE 120. The first beam management process may also use SSBs for beam management in a similar manner as described above.

A second beam management procedure may be referred to as a beam refinement procedure, a base station beam refinement procedure, a TRP beam refinement procedure, a transmit beam refinement procedure, and/or the like. CSI-RSs may be transmitted from the base station 110 to the UE 120. The CSI-RSs may be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

A third beam management procedure may be referred to as a beam refinement procedure, a UE beam refinement procedure, a receive beam refinement procedure, and/or the like. The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams). Other examples of beam management procedures may differ from what is described with respect to FIG. 4. For example, the UE 120 and the base station 110 may perform the third beam management procedure before performing the second beam management procedure, the UE 120 and the base station 110 may perform a similar beam management procedure to select a UE transmit beam, and/or the like.

As indicated above, FIG. 4 is provided as an example. Other examples may differ from what is described with respect to FIG. 4.

Figure 5:
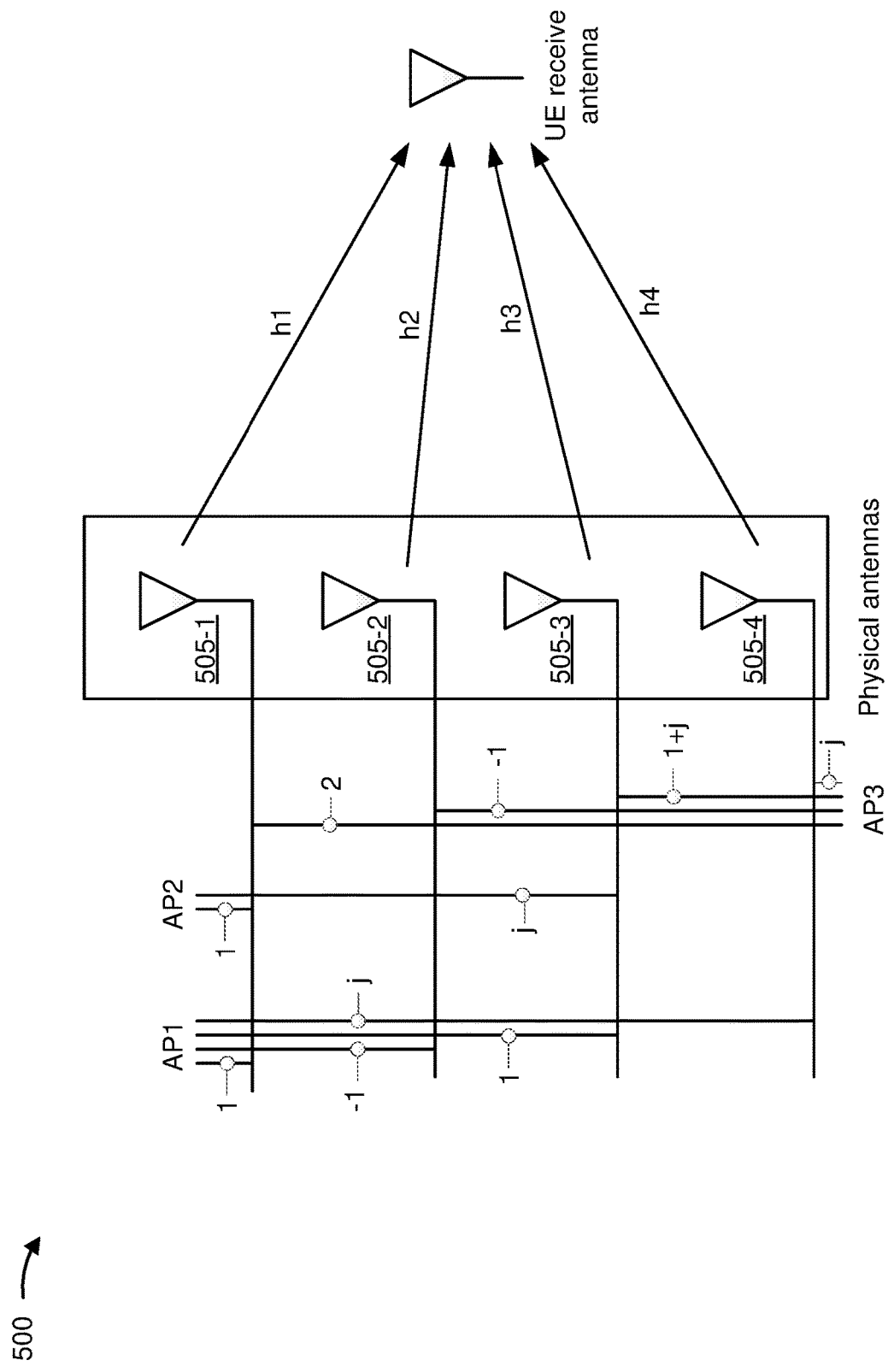
FIG. 5 is a diagram illustrating an example of antenna ports, in accordance with the present disclosure.

FIG. 5 is a diagram illustrating an example 500 of antenna ports, in accordance with the present disclosure.

As shown in FIG. 5, a first physical antenna 505-1 may transmit information via a first channel h1, a second physical antenna 505-2 may transmit information via a second channel h2, a third physical antenna 505-3 may transmit information via a third channel h3, and a fourth physical antenna 505-4 may transmit information via a fourth channel h4. Such information may be conveyed via a logical antenna port, which may represent some combination of the physical antennas and/or channels. In some cases, a UE 120 may not have knowledge of the channels associated with the physical antennas, and may only operate based on knowledge of the channels associated with antenna ports, as defined below. Any combination of first physical antenna 505-1, second physical antenna 505-2, third physical antenna 505-3, or fourth physical antenna 505-4 may be considered to form an antenna panel.

An antenna port may be defined such that a channel, over which a symbol on the antenna port is conveyed, can be inferred from a channel over which another symbol on the same antenna port is conveyed. In example 500, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and a specific set of weighting factors applied to a set of channels may be referred to as a precoder.

Similarly, a channel associated with antenna port 2 (AP2) is represented as h1+j*h3, and a channel associated with antenna port 3 (AP3) is represented as 2*h1−h2+(1+j)*h3+j*h4. In this case, antenna port 3 can be represented as the sum of antenna port 1 and antenna port 2 (e.g., AP3=AP1+AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

In some situations, a UE may include multiple antenna panels, where each panel includes a plurality of antenna elements. For example, the UE may include three panels, where each panel has N antenna elements (e.g., cross-polarized elements and/or other similar antenna elements). An antenna panel may include a physical grouping of antenna elements (e.g., the elements are embedded in a same substrate and/or sharing one or more hardware components, such as a modulator, a demodulator, and/or a processor) and/or a virtual grouping of antenna elements (e.g., the elements are grouped by the UE based at least in part on one or more properties of the elements). In some situations, the UE may assign antenna ports (e.g., as described above in connection with FIG. 3) across antenna panels such that antenna ports that cannot simultaneously transmit and/or simultaneously receive are included on a same panel. Antenna panels of a UE may include a different number of antenna ports, a different number of beams, and/or a different effective isotropic radiated power.

As indicated above, FIG. 5 is provided merely as an example. Other examples may differ from what is described with regard to FIG. 5.

An antenna panel may generate an analog beam, and transmit or receive a reference signal, data, or control information in the beam. The beam may be configured as a beam indication that corresponds to a TCI state or spatial relation information. Due to UE movement and/or rotation, one antenna panel of the UE may be better than another antenna panel for the beam indication. For example, a reference signal may be measured by different antenna panels. If a change in position by the UE causes an antenna panel measuring the reference signal to be blocked, the UE may determine that the UE needs to switch from the current antenna panel to another antenna panel. However, a base station transmitting or receiving a reference signal in the beam indication may not receive information about the need for an antenna panel switch until the base station receives a scheduled beam report. Until then, the UE may use the current antenna panel with poor strength or quality. As a result, performance may degrade and the UE may waste time, processing resources, and signaling resources sending retransmissions or performing other operations that are based on degraded signals and/or inaccurate reference signal measurements.

According to various aspects described herein, a UE may, on its own initiative, report, to a base station, a mapping between one or more beam indications and one or more antenna panels when movement or some other triggering condition creates a need to switch antenna panels. The UE may receive an indication to use the new mapping, or the UE may proceed to use the new mapping a specified time duration after transmitting the report. Accordingly, when an antenna panel is blocked or otherwise experiencing interference, the UE may cause an antenna panel switch without waiting for a scheduled report. Thus, the UE and the base station may experience increased reliability and quality of communications as well as decreased network overhead.

The reduced network overhead further causes the base station and the UE to conserve power, processing resources, and signaling resources.

Figure 6:
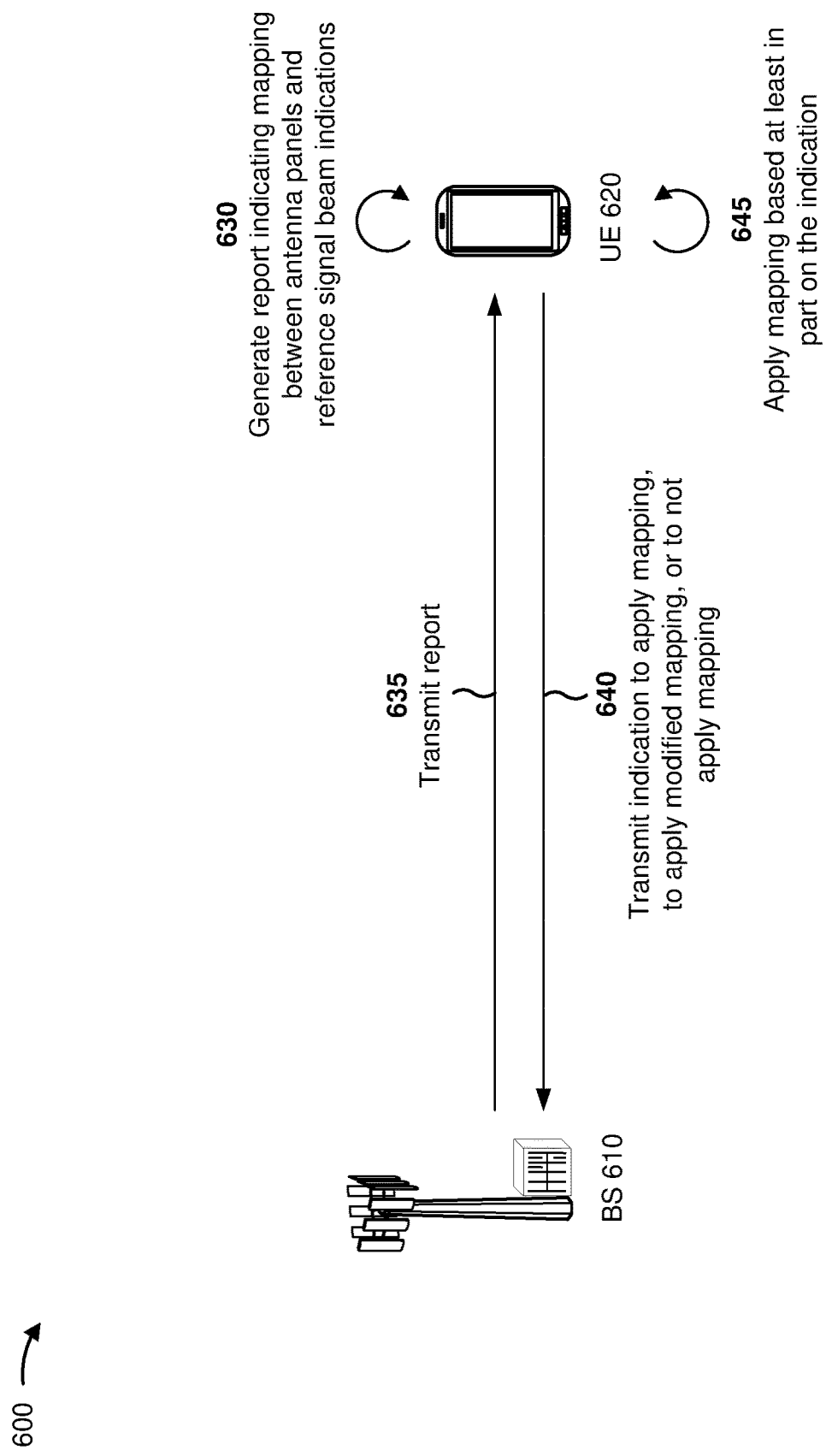
FIG. 6 is a diagram illustrating an example associated with a UE-initiated update of a mapping between beams and antenna panels, in accordance with the present disclosure.

FIG. 6 is a diagram illustrating an example 600 associated with a UE-initiated update of a mapping between beams and antenna panels, in accordance with the present disclosure. As shown in FIG. 6, example 600 includes communication between a BS 610 and a UE 620. In some aspects, BS 610 and UE 620 may be included in a wireless network, such as wireless network 100. BS 610 and UE 620 may communicate on a wireless access link, which may include an uplink and a downlink. BS 610 may have configured UE 620 to use an antenna panel to measure a downlink reference signal in a beam indication.

UE 620 may determine to update a mapping of the beam indication to another antenna panel. This may be due to a triggering condition configured by BS 610. For example, the triggering condition may be that UE 620 has determined that another antenna panel would be better for the beam indication than a currently configured antenna panel. UE 620 may compare a signal strength of the configured antenna panel and a signal strength of the other antenna panel of the UE to determine a difference in signal strength (e.g., Layer 1 RSRP) between the configured antenna panel and the other antennal panel. If the difference satisfies a strength difference threshold, UE 620 may determine to generate and transmit a report of an update mapping between the beam indication and the other antenna panel. The strength difference threshold may be a specified amount of signal strength (e.g., in decibels) between a first signal strength and a second signal strength. The difference between the signal strength of the configured antenna panel and the signal strength of the other antenna panel may satisfy the strength difference threshold if, for example, the difference meets or exceeds the strength difference threshold. In some aspects, UE 620 may also compare a signal quality of each antenna panel (e.g., signal to interference plus noise ratio (SINR)).

UE 620 may measure a downlink reference signal at multiple antenna panels. The downlink reference signal (e.g., CSI-RS) may be indicated in stored configuration information (e.g., standard configuration) or indicated by BS 610. UE 620 may determine which reference signal to measure, whether it is the downlink reference signal in the beam indication or a DMRS transmitted in the beam indication. If at least one antenna panel satisfies a triggering condition, UE 620 may be configured to report up to a configured number of antenna panels with associated measurement information. The at least one antenna panel may satisfy the triggering condition if the triggering condition is met (e.g., threshold is satisfied for the triggering condition).

In some aspects, a triggering condition may be a battery power status of UE 620. For example, if UE 620 determines that a power status satisfies a time threshold or a power threshold, UE 620 may generate a new mapping that involves deactivating the configured antenna panel and activating another antenna panel. The time threshold may be a specified amount of time, and the power status may be a time remaining for battery power. The power status may satisfy the time threshold if, for example, the time remaining for battery power is less than or equal to the time threshold. The power threshold may be a specified amount of battery power (e.g., battery power percentage), and the power status may be a percentage of remaining battery power. The power status may satisfy the power threshold if, for example, the percentage of remaining battery power is less than or equal to the power threshold.

At 630, UE 620 may generate a report indicating a mapping between one or more antenna panels and one or more beam indications. As shown in example 600, the beam indications may be, for example, reference signal beam indications, which are beam indications specific to one or more reference signals. The triggering condition for generating the report may be configured by BS 610, or separately determined by UE 620. For example, UE 620 may determine that a gain of a signal has dropped below a certain threshold.

At 635, UE 620 may transmit the report to BS 610. UE 620 may transmit the report in UCI on a PUCCH or PUSCH. The uplink resource for the UCI may be preconfigured in advance. Alternatively, UE 620 may "piggyback" or multiplex the UCI with an uplink transmission using an existing uplink grant. In some aspects, UE 620 may transmit the report in an RRC message, a MAC CE, or DCI. UE 620 may transmit the MAC CE in a resource indicated by an uplink grant requested by UE 620 via a scheduling request. If the scheduling request is for the PUCCH, the scheduling request may be a normal scheduling request or a special scheduling request reserved for mapping updates. If a PUCCH-based scheduling request is not configured, UE 620 may initiate a random access channel (RACH) procedure and transmit the MAC CE in a resource indicated by an uplink grant associated with the RACH procedure, such as in a msg A of a 2-step RACH procedure or a msg 3 of a 4-step RACH procedure.

In some aspects, the report may include one or more beam indication identifiers for respective beam indications. Each beam indication identifier may correspond to a TCI state identifier, a spatial relation identifier, or a joint uplink-downlink TCI state identifier. The beam indication may correspond to an uplink TCI state identifier which is associated with a downlink TCI state identifier or quasi-co-located with a downlink TCI state identifier. Each antenna panel identifier may include one or more of a downlink antenna panel identifier, an uplink antenna panel identifier, or a joint uplink-downlink panel identifier. An antenna panel identifier may be for uplink only, downlink only, or joint uplink-downlink. In some aspects, the report may include up to a certain number of better quality antenna panel identifiers for a beam indication. The report may include measurement information, such as signal strength or signal quality metrics.

BS 610 may determine whether to accept the mapping indicated in the report based at least in part on channel conditions, a UE capability, traffic conditions, beam history, mapping history, UE location, or TCI states at BS 610. BS 610 may also reject or modify the mapping indicated in the report. For example, BS 610 may accept most but not all of proposed antenna panel reassignments for beam indications. At 640, BS 610 may transmit an indication for the mapping in the report. BS 610 may transmit this "final" mapping via an RRC message, a MAC CE, or DCI.

At 645, UE 620 may apply the mapping indicated in the report based at least in part on the indication from BS 610. This may include configuring one or more antenna panels to map to one or more beam indications. UE 620 may use an existing mapping until UE 620 receives the indication.

In some aspects, UE 620 may implicitly update a mapping at UE 620 based at least on the report. That is, UE 620 may not wait for the indication from BS 610. If UE 620 is not to wait for the indication from BS 610, UE 620 may follow a configured rule for using new antenna panels for a same beam identification. The rule may include using a new antenna panel with a highest measured strength and/or quality.

In some aspects, applying an updated mapping may include waiting a specified time duration after transmitting the report before applying the updated mapping. In some aspects, UE 620 may wait a specified time duration after receiving an acknowledgement of the report from BS 610. Correspondingly, BS 610 may wait a specified time duration after receiving the report or after transmitting an acknowledgement of the report in DCI. BS 610 may configure UE 620 with the specified time duration.

As a result of UE 620 initiating an update of the mapping between antenna panels and beam indications, UE 620 and BS 610 may suffer less degradation in communications caused by changing conditions at the antenna panels of UE 620.

As indicated above, FIG. 6 is provided as an example. Other examples may differ from what is described with respect to FIG. 6.

Figure 7:
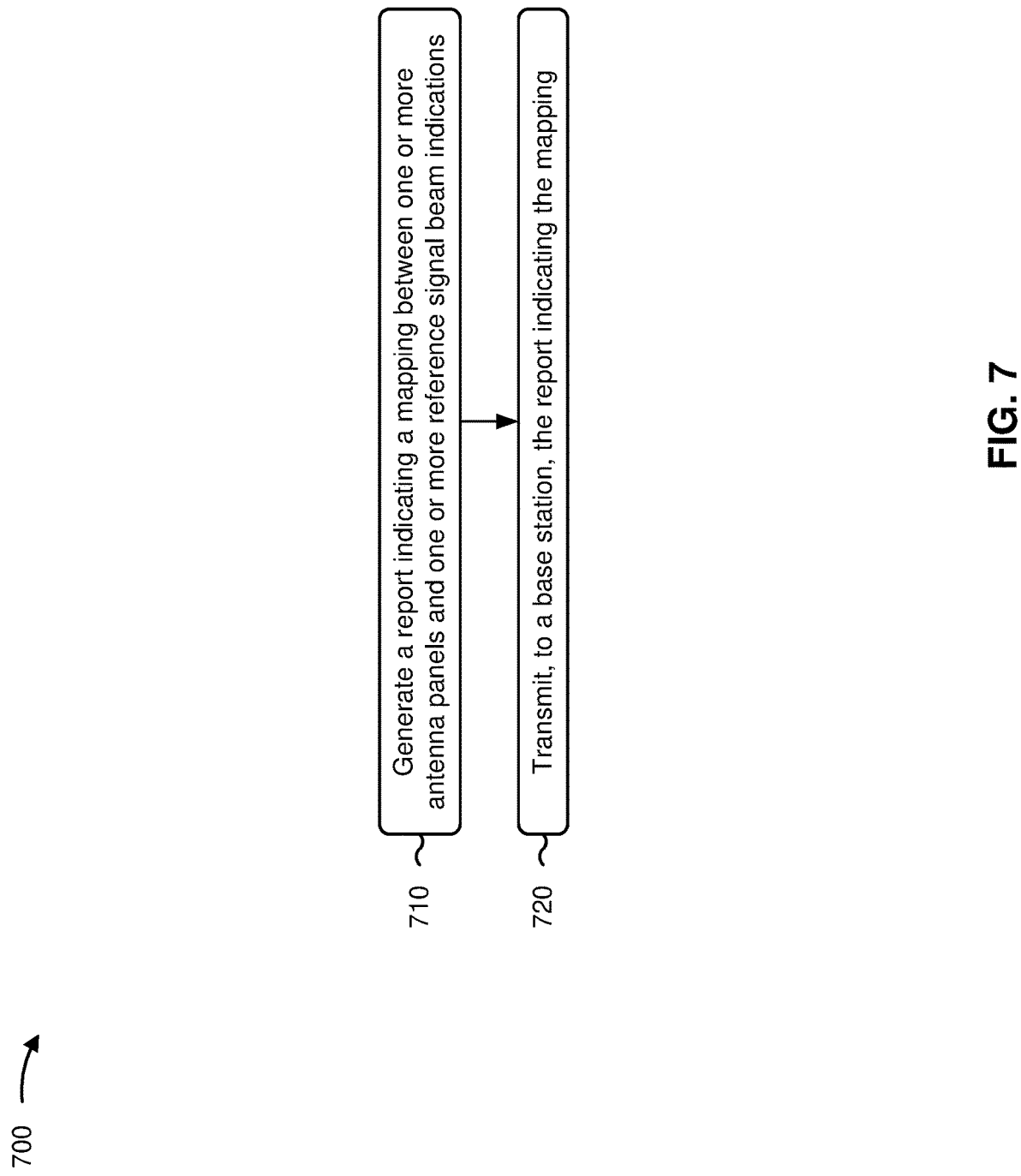
FIG. 7 is a flowchart of an example method of wireless communication, in accordance with the present disclosure.

FIG. 7 is a flowchart of an example method 700 of wireless communication. The method 700 may be performed by, for example, a UE (e.g., UE 120 depicted in FIGS. 1-4, UE 620 depicted in FIG. 6).

At 710, the UE may generate a report indicating a mapping between one or more antenna panels and one or more beam indications (e.g., reference signal beam indications). For example, the UE (e.g., using generation component 908 depicted in FIG. 9) may generate a report indicating a mapping between one or more antenna panels and one or more reference signal beam indications, as described above in connection with, for example, FIGS. 3-6.

In some aspects, the report is generated based at least in part on a triggering condition configured by a base station.

In some aspects, generating the report includes determining that a beam indication mapping is to switch from a first antenna panel to a second antenna panel based at least in part on a determination that one of a difference between a signal strength of a downlink reference signal for a beam indication at the second antenna panel and a signal strength of the downlink reference signal for the beam indication at the first antenna panel satisfies a strength difference threshold, or a difference between a signal quality of the downlink reference signal for the beam indication at the second antenna panel and a signal quality of the downlink reference signal for the beam indication at the first antenna panel satisfies a quality difference threshold. The quality difference threshold may be a specified amount of signal quality (e.g., signal to noise ratio (SNR)) between a first signal quality and a second signal quality. The difference between the signal quality of the downlink reference signal for the beam indication at the second antenna panel and the signal quality of the downlink reference signal for the beam indication at the first antenna may satisfy the quality difference threshold if, for example, the difference meets or exceeds the quality difference threshold.

In some aspects, the report is generated based at least in part on whether a power status of the UE satisfies a power threshold. In some aspects, method 700 includes determining a triggering condition for generating and transmitting the report. In some aspects, method 700 includes determining a downlink reference signal to measure for a beam indication at an antenna panel.

At 720, the UE may transmit, to a base station, the report indicating the mapping. For example, the UE (e.g., using transmission component 904 depicted in FIG. 9) may transmit, to a base station, the report indicating the mapping, as described above in connection with, for example, FIGS. 3-6.

In some aspects, method 700 includes switching a beam indication mapping from a first antenna panel to a second antenna panel based at least in part on expected power savings of the second antenna panel for the beam indication.

In some aspects, transmitting the report includes transmitting the report in UCI on a physical uplink channel. In some aspects, transmitting the report in the UCI includes one of transmitting the UCI on a configured uplink resource or multiplexing the report with an uplink transmission that is scheduled with an uplink grant.

In some aspects, transmitting the report includes transmitting the report in a MAC CE. In some aspects, transmitting the report in the MAC CE includes multiplexing the report with an uplink transmission that is scheduled with an uplink grant.

In some aspects, transmitting the report in the MAC CE includes transmitting the MAC CE in a resource indicated by an uplink grant that is received after transmitting a scheduling request. In some aspects, transmitting the report in the MAC CE includes transmitting the MAC CE in a resource indicated by an uplink grant that is associated with a random access channel procedure.

In some aspects, the report includes a current antenna panel identifier mapped to a beam indication identifier, where the beam indication identifier corresponds to one of a TCI state identifier, an uplink TCI state identifier, a spatial relation identifier, or a joint uplink-downlink TCI state identifier.

In some aspects, the report includes one or more candidate antenna panel identifiers for mapping to a beam indication identifier, where each of the one or more candidate antenna panel identifiers includes one or more of a downlink antenna panel identifier, an uplink antenna panel identifier, or a joint uplink-downlink panel identifier, and where the beam indication identifier corresponds to one of a TCI state identifier, an uplink TCI state identifier, a spatial relation identifier, or a joint uplink-downlink TCI state identifier.

In some aspects, method 700 includes applying a received mapping between the one or more antenna panels and the one or more beam indications, where the received mapping is received from the base station after transmitting the report.

In some aspects, method 700 includes applying the mapping indicated in the report. In some aspects, method 700 includes selecting an antenna panel, from among the one or more antenna panels, to map to a beam indication of the one or more beam indications, based at least in part on a panel selection rule. In some aspects, applying the mapping includes applying the mapping after a specified time duration after transmitting the report, or a specified time duration after receiving an acknowledgement of the report from the base station. In some aspects, method 700 includes transmitting an acknowledgement to the base station and applying the mapping after a specified time duration after transmitting the acknowledgement of the report from the base station.

Although FIG. 7 shows example blocks of method 700, in some aspects, method 700 may include additional blocks, fewer blocks, different blocks, or differently arranged blocks than those depicted in FIG. 7. Additionally, or alternatively, two or more of the blocks of method 700 may be performed in parallel.

Figure 8:
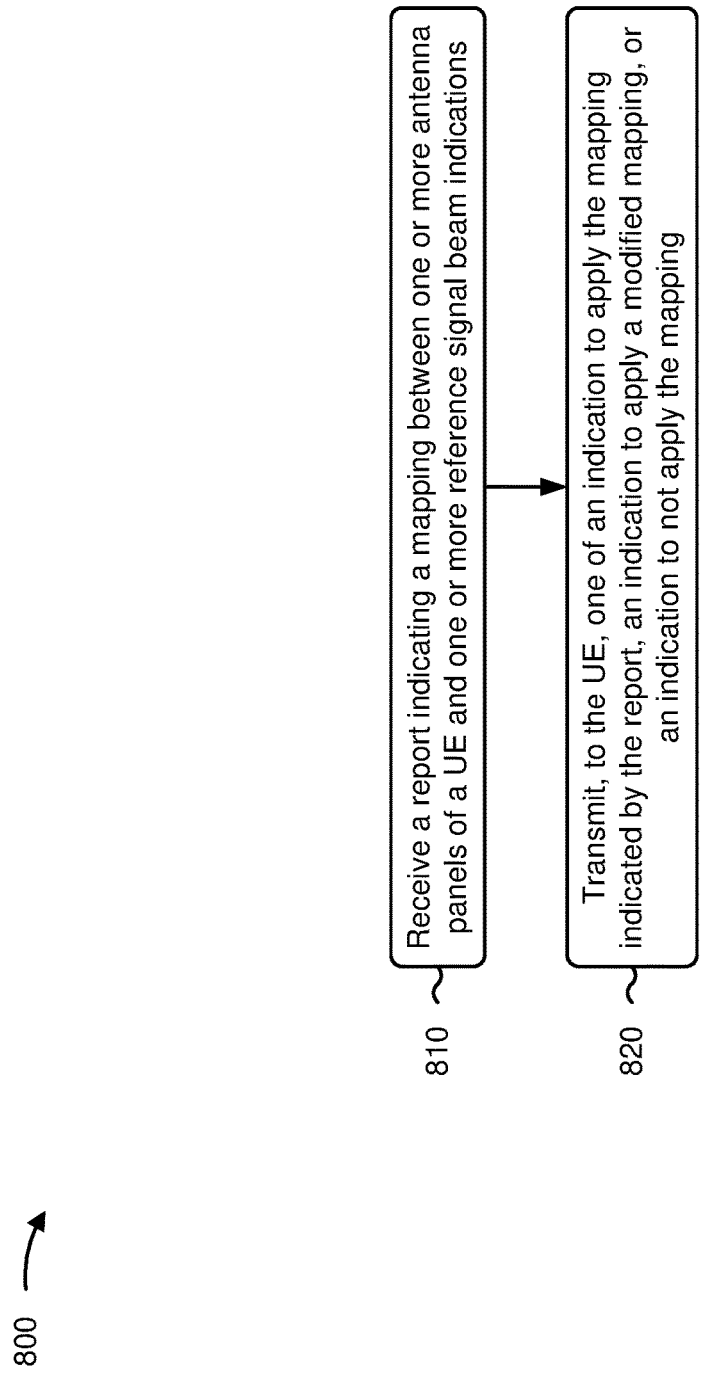
FIG. 8 is a flowchart of an example method of wireless communication, in accordance with the present disclosure.

FIG. 8 is a flowchart of an example method 800 of wireless communication. The method 800 may be performed by, for example, a base station (e.g., base station 110).

At 810, the base station may receive a report indicating a mapping between one or more antenna panels of a UE and one or more beam indications (e.g., reference signal beam indications). For example, the base station (e.g., using reception component 1102 depicted in FIG. 11) may receive a report indicating a mapping between one or more antenna panels of a UE and one or more reference signal beam indications, as described above in connection with, for example, FIGS. 3-6.

In some aspects, receiving the report includes receiving the report in UCI on a physical uplink channel.

In some aspects, receiving the report in the UCI includes one of receiving the UCI on a configured uplink resource or receiving the report multiplexed with an uplink transmission that is scheduled with an uplink grant.

In some aspects, receiving the report includes receiving the report in a MAC CE. In some aspects, receiving the report in the MAC CE includes receiving the report multiplexed with an uplink transmission that is scheduled with an uplink grant. In some aspects, receiving the report in the MAC CE includes receiving the MAC CE in a resource indicated by an uplink grant that is based at least in part on a scheduling request. In some aspects, receiving the report in the MAC CE includes receiving the MAC CE in a resource indicated by an uplink grant that is associated with a random access channel procedure.

In some aspects, the report includes a current antenna panel identifier mapped to a beam indication identifier, where the beam indication identifier corresponds to one of a TCI state identifier, an uplink TCI state identifier, a spatial relation identifier, or a joint uplink-downlink TCI state identifier.

In some aspects, the report includes one or more candidate antenna panel identifiers for mapping to a beam indication identifier, where each of the one or more candidate antenna panel identifiers includes one or more of a downlink antenna panel identifier, an uplink antenna panel identifier, or a joint uplink-downlink panel identifier, and where the beam indication identifier corresponds to one of a TCI state identifier, an uplink TCI state identifier, a spatial relation identifier, or a joint uplink-downlink TCI state identifier.

At 820, the base station may transmit, to the UE, one of an indication to apply the mapping indicated by the report, an indication to apply a modified mapping, or an indication to not apply the mapping. For example, the base station (e.g., using transmission component 1104 depicted in FIG. 11) may transmit, to the UE, one of an indication to apply the mapping indicated by the report, an indication to apply a modified mapping, or an indication to not apply the mapping, as described above in connection with, for example, FIGS. 3-6.

In some aspects, method 800 includes transmitting, to the UE, a triggering condition for transmitting the report. In some aspects, method 800 includes transmitting, to the UE, a quantity of antenna panels for the report. In some aspects, method 800 includes transmitting, to the UE, a power threshold for determining whether the report is to be transmitted.

In some aspects, method 800 includes transmitting, to the UE, a panel selection rule for selecting an antenna panel, from among the one or more antenna panels, to map to a beam indication of the one or more beam indications.

In some aspects, method 800 includes transmitting, to the UE, a specified time duration for applying the mapping after one or more of transmitting the report, or receiving an acknowledgement of the report from the base station.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

Figure 9:
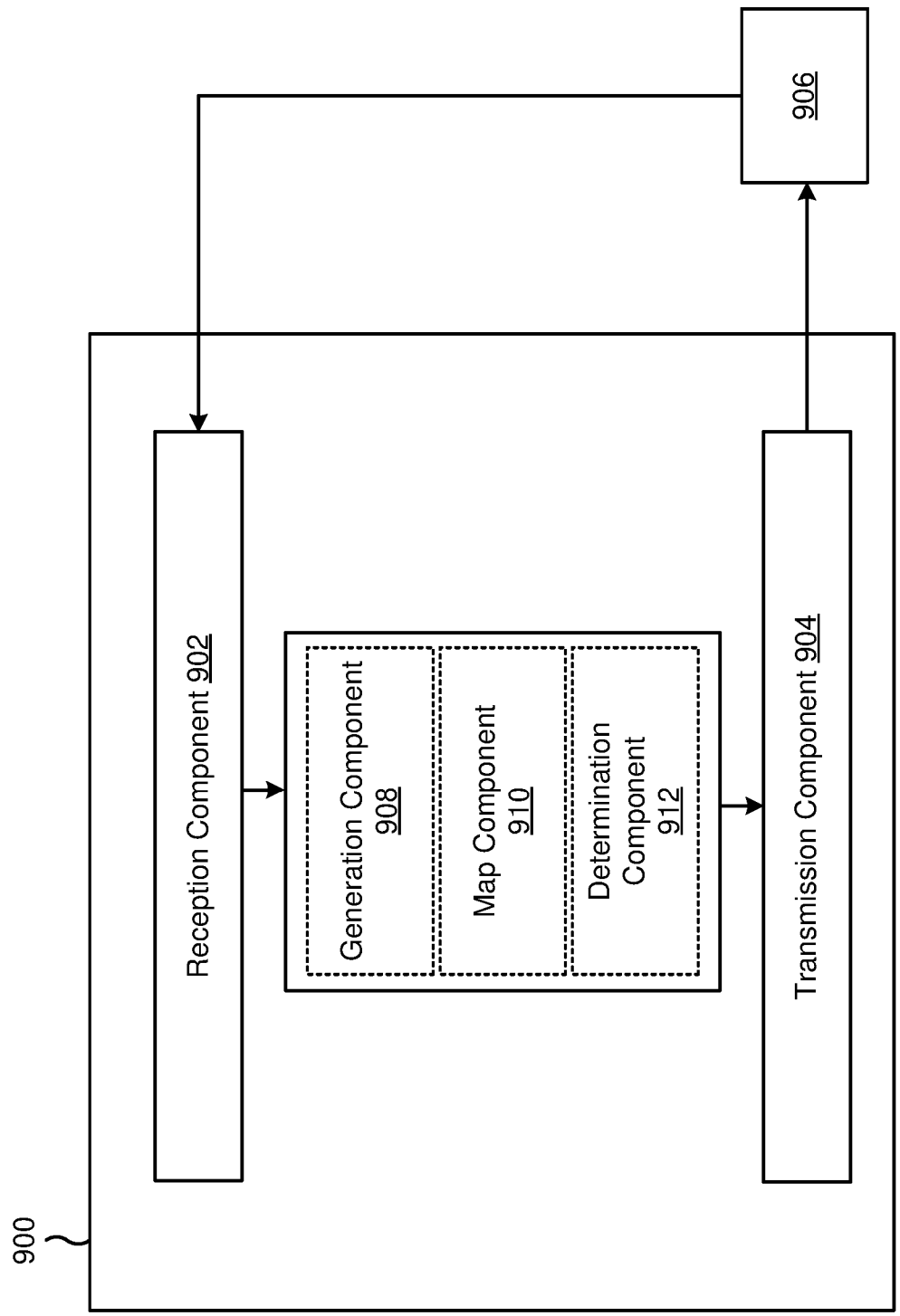
FIG. 9 is a block diagram of an example apparatus for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may a generation component 908, a map component 910, and/or a determination component 912, among other examples.

In some aspects, the apparatus 900 may be configured to perform one or more operations described herein in connection with FIGS. 1-6. Additionally or alternatively, the apparatus 900 may be configured to perform one or more processes described herein, such as method 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The generation component 908 may generate a report indicating a mapping between one or more antenna panels and one or more reference signal beam indications. In some aspects, the generation component 908 may include a controller/processor, a memory, or a combination thereof, of the UE described above in connection with FIG. 2. The transmission component 904 may transmit, to a base station, the report indicating the mapping.

The map component 910 may switch a beam indication mapping from a first antenna panel to a second antenna panel based at least in part on expected power savings of the second antenna panel for the beam indication. In some aspects, the map component 910 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The determination component 912 may determine a triggering condition for generating and transmitting the report. In some aspects, the determination component 912 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The determination component 912 may determine a downlink reference signal to measure for a beam indication at an antenna panel. In some aspects, the determination component 912 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The map component 910 may apply a received mapping between the one or more antenna panels and the one or more beam indications, where the received mapping is received from the base station after transmitting the report. In some aspects, the map component 910 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The map component 910 may apply the mapping indicated in the report. In some aspects, the map component 910 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The generation component 908 may select an antenna panel, from among the one or more antenna panels, to map to a beam indication of the one or more beam indications, based at least in part on a panel selection rule. In some aspects, the generation component 908 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
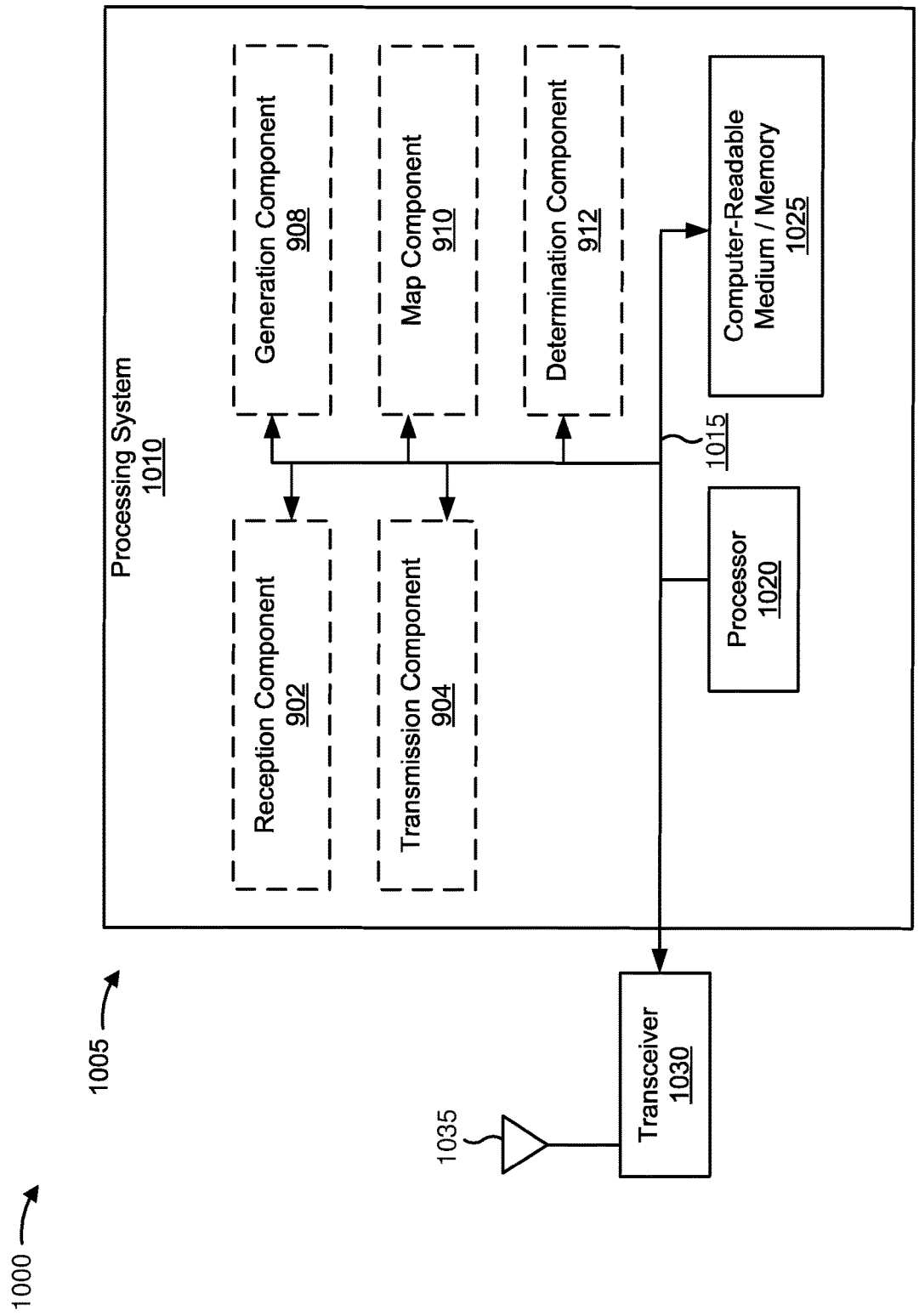
FIG. 10 is a diagram illustrating an example of a hardware implementation for an apparatus employing a processing system, in accordance with the present disclosure.

FIG. 10 is a diagram illustrating an example 1000 of a hardware implementation for an apparatus 1005 employing a processing system 1010. The apparatus 1005 may be a UE.

The processing system 1010 may be implemented with a bus architecture, represented generally by the bus 1015. The bus 1015 may include any number of interconnecting buses and bridges depending on the specific application of the processing system 1010 and the overall design constraints. The bus 1015 links together various circuits including one or more processors and/or hardware components, represented by the processor 1020, the illustrated components, and the computer-readable medium/memory 1025. The bus 1015 may also link various other circuits, such as timing sources, peripherals, voltage regulators, power management circuits, and/or the like.

The processing system 1010 may be coupled to a transceiver 1030. The transceiver 1030 is coupled to one or more antennas 1035. The transceiver 1030 provides a means for communicating with various other apparatuses over a transmission medium. The transceiver 1030 receives a signal from the one or more antennas 1035, extracts information from the received signal, and provides the extracted information to the processing system 1010, specifically the reception component 902 depicted in FIG. 9. In addition, the transceiver 1030 receives information from the processing system 1010, specifically the transmission component 904 depicted in FIG. 9, and generates a signal to be applied to the one or more antennas 1035 based at least in part on the received information. The generation component 908 depicted in FIG. 9 regenerates a report indicating a mapping between beam indications and antenna panels. The map component 910 depicted in FIG. 9 configures antenna panels according to a mapping. The determination component 912 depicted in FIG. 9 determines downlink reference signals to measure or triggering conditions.

The processing system 1010 includes a processor 1020 coupled to a computer-readable medium/memory 1025. The processor 1020 is responsible for general processing, including the execution of software stored on the computer-readable medium/memory 1025. The software, when executed by the processor 1020, causes the processing system 1010 to perform the various functions described herein for any particular apparatus. The computer-readable medium/memory 1025 may also be used for storing data that is manipulated by the processor 1020 when executing software. The processing system further includes at least one of the illustrated components. The components may be software modules running in the processor 1020, resident/stored in the computer-readable medium/memory 1025, one or more hardware modules coupled to the processor 1020, or some combination thereof.

In some aspects, the processing system 1010 may be a component of the UE 120 and may include the memory 282 and/or at least one of the TX MIMO processor 266, the RX processor 258, and/or the controller/processor 280. In some aspects, the apparatus 1005 for wireless communication includes means for generating a report indicating a mapping between one or more antenna panels and one or more reference signal beam indications; and/or means for transmitting, to a base station, the report indicating the mapping. In some aspects, the UE includes means for switching a beam indication mapping from a first antenna panel to a second antenna panel based at least in part on expected power savings of the second antenna panel for the beam indication.

In some aspects, the UE includes means for determining a triggering condition for generating and transmitting the report and/or means for determining a downlink reference signal to measure for a beam indication at an antenna panel.

In some aspects, the UE includes means for applying a received mapping between the one or more antenna panels and the one or more beam indications, wherein the received mapping is received from the base station after transmitting the report, means for applying the mapping indicated in the report, and/or means for selecting an antenna panel, from among the one or more antenna panels, to map to a beam indication of the one or more beam indications, based at least in part on a panel selection rule.

The aforementioned means may be one or more of the aforementioned components of the apparatus 900 and/or the processing system 1010 of the apparatus 1005 configured to perform the functions recited by the aforementioned means. As described elsewhere herein, the processing system 1010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
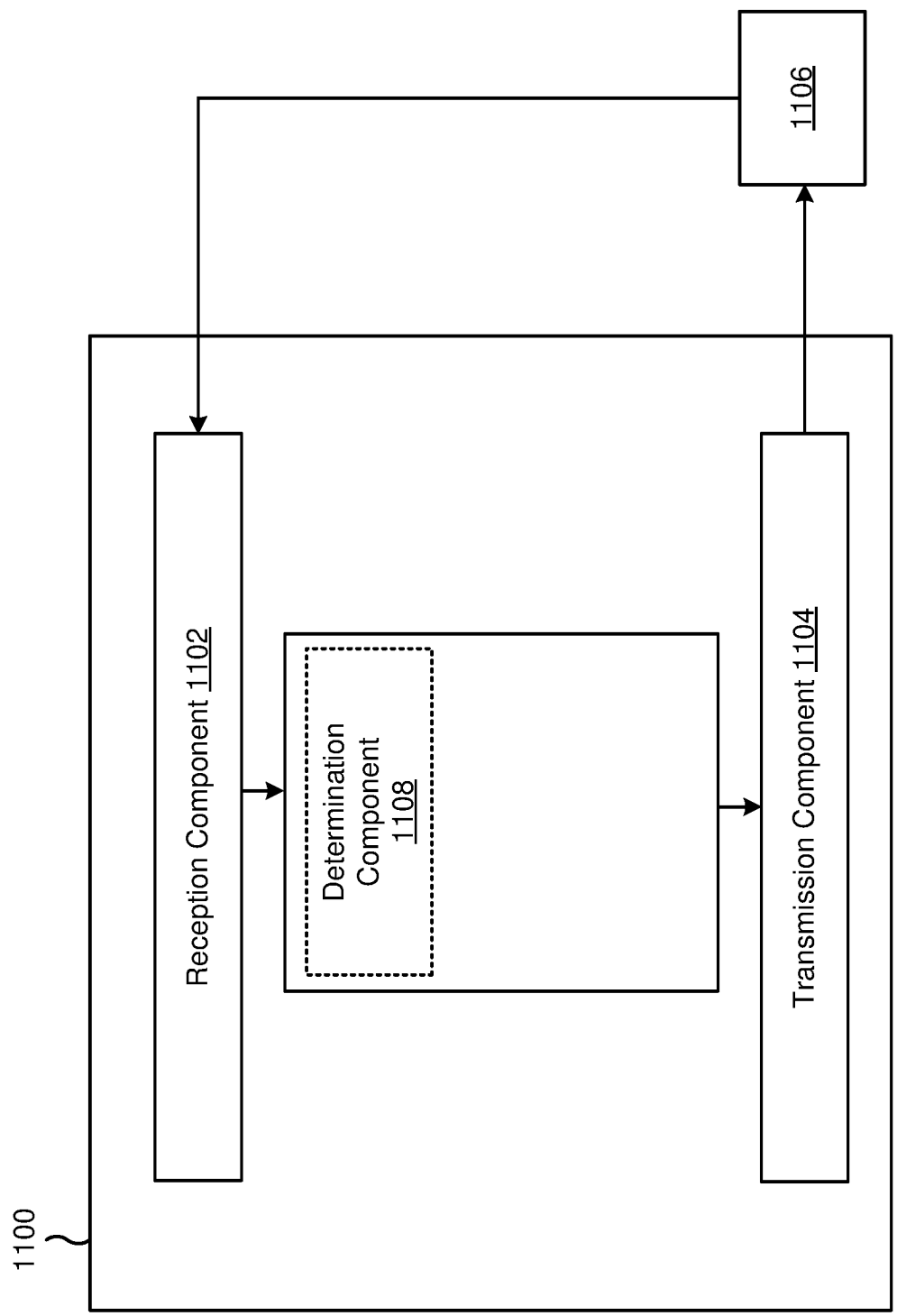
FIG. 11 is a block diagram of an example apparatus for wireless communication, in accordance with the present disclosure.

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 1-6. Additionally or alternatively, the apparatus 1100 may be configured to perform one or more processes described herein, such as method 800 of FIG. 8. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The reception component 1102 may receive a report indicating a mapping between one or more antenna panels of a UE and one or more reference signal beam indications. The determination component 1108 may determine whether to accept, modify, or reject the mapping indicated in the report. In some aspects, the transmission component 1104 may include a controller/processor, a memory, or a combination thereof, of the base station described above in connection with FIG. 2. The transmission component 1104 may transmit, to the UE, one of an indication to apply the mapping indicated by the report, an indication to apply a modified mapping, or an indication to not apply the mapping.

The transmission component 1104 may transmit, to the UE, a triggering condition for transmitting the report. The transmission component 1104 may transmit, to the UE, a quantity of antenna panels for the report. The transmission component 1104 may transmit, to the UE, a power threshold for determining whether the report is to be transmitted. The transmission component 1104 may transmit, to the UE, a panel selection rule for selecting an antenna panel, from among the one or more antenna panels, to map to a beam indication of the one or more beam indications. The transmission component 1104 may transmit, to the UE, a specified time duration for applying the mapping after one or more of transmitting the report, or receiving an acknowledgement of the report from the base station.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
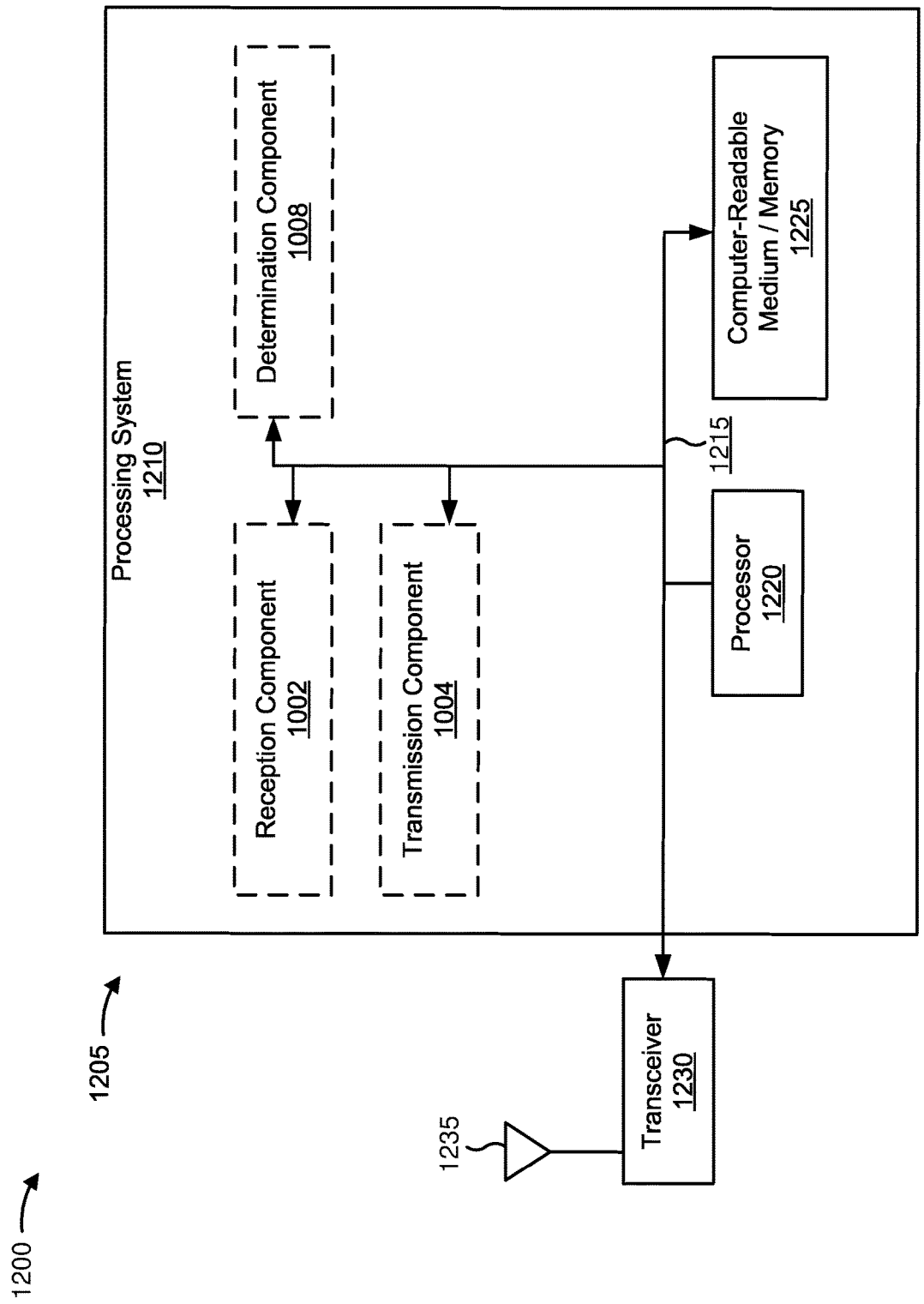
FIG. 12 is a diagram illustrating an example of a hardware implementation for an apparatus employing a processing system, in accordance with the present disclosure.

FIG. 12 is a diagram illustrating an example 1200 of a hardware implementation for an apparatus 1205 employing a processing system 1210. The apparatus 1205 may be a base station.

The processing system 1210 may be implemented with a bus architecture, represented generally by the bus 1215. The bus 1215 may include any number of interconnecting buses and bridges depending on the specific application of the processing system 1210 and the overall design constraints. The bus 1215 links together various circuits including one or more processors and/or hardware components, represented by the processor 1220, the illustrated components, and the computer-readable medium/memory 1225. The bus 1215 may also link various other circuits, such as timing sources, peripherals, voltage regulators, power management circuits, and/or the like.

The processing system 1210 may be coupled to a transceiver 1230. The transceiver 1230 is coupled to one or more antennas 1235. The transceiver 1230 provides a means for communicating with various other apparatuses over a transmission medium. The transceiver 1230 receives a signal from the one or more antennas 1235, extracts information from the received signal, and provides the extracted information to the processing system 1210, specifically the reception component 1102 depicted in FIG. 11. In addition, the transceiver 1230 receives information from the processing system 1210, specifically the transmission component 1104 depicted in FIG. 11, and generates a signal to be applied to the one or more antennas 1235 based at least in part on the received information. The determination component 1008 depicted in FIG. 10 determines a mapping or whether to accept, modify, or reject a mapping indicated in a report.

The processing system 1210 includes a processor 1220 coupled to a computer-readable medium/memory 1225. The processor 1220 is responsible for general processing, including the execution of software stored on the computer-readable medium/memory 1225. The software, when executed by the processor 1220, causes the processing system 1210 to perform the various functions described herein for any particular apparatus. The computer-readable medium/memory 1225 may also be used for storing data that is manipulated by the processor 1220 when executing software. The processing system further includes at least one of the illustrated components. The components may be software modules running in the processor 1220, resident/stored in the computer-readable medium/memory 1225, one or more hardware modules coupled to the processor 1220, or some combination thereof.

In some aspects, the processing system 1210 may be a component of the base station 110 and may include the memory 242 and/or at least one of the TX MIMO processor 230, the RX processor 238, and/or the controller/processor 240. In some aspects, the apparatus 1205 for wireless communication includes means for means for receiving a report indicating a mapping between one or more antenna panels of a UE and one or more reference signal beam indications; and/or means for transmitting, to the UE, one of an indication to apply the mapping indicated by the report, an indication to apply a modified mapping, or an indication to not apply the mapping. In some aspects, the base station includes means for transmitting, to the UE, a triggering condition for transmitting the report, means for transmitting, to the UE, a quantity of antenna panels for the report, and/or means for transmitting, to the UE, a power threshold for determining whether the report is to be transmitted. In some aspects, the base station includes means for transmitting, to the UE, a panel selection rule for selecting an antenna panel, from among the one or more antenna panels, to map to a beam indication of the one or more beam indications. In some aspects, the base station includes means for transmitting, to the UE, a specified time duration for applying the mapping after one or more of transmitting the report, or receiving an acknowledgement of the report from the base station.

The aforementioned means may be one or more of the aforementioned components of the apparatus 1100 and/or the processing system 1210 of the apparatus 1205 configured to perform the functions recited by the aforementioned means. As described elsewhere herein, the processing system 1210 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 12 is provided as an example. Other examples may differ from what is described in connection with FIG. 12.

The following provides an overview of some Aspects of the present disclosure:

Aspect 1: A method of wireless communication performed by a user equipment (UE), comprising: generating a report indicating a mapping between one or more antenna panels and one or more beam indications; and transmitting, to a base station, the report indicating the mapping.

Aspect 2: The method of Aspect 1, wherein the report is generated based at least in part on a triggering condition configured by a base station.

Aspect 3: The method of Aspect 1 or 2, wherein generating the report includes determining that a beam indication mapping is to switch from a first antenna panel to a second antenna panel based at least in part on a determination that one of: a difference between a signal strength of a downlink reference signal for a beam indication at the second antenna panel and a signal strength of the downlink reference signal for the beam indication at the first antenna panel satisfies a strength difference threshold, or a difference between a signal quality of the downlink reference signal for the beam indication at the second antenna panel and a signal quality of the downlink reference signal for the beam indication at the first antenna panel satisfies a quality difference threshold.

Aspect 4: The method of any of Aspects 1-3, wherein the report is generated based at least in part on whether a power status of the UE satisfies a power threshold.

Aspect 5: The method of Aspect 4, further comprising switching a beam indication mapping from a first antenna panel to a second antenna panel based at least in part on expected power savings of the second antenna panel for the beam indication.

Aspect 6: The method of any of Aspects 1-5, further comprising determining a triggering condition for generating and transmitting the report.

Aspect 7: The method of any of Aspects 1-6, further comprising determining a downlink reference signal to measure for a beam indication at an antenna panel.

Aspect 8: The method of any of Aspects 1-7, wherein transmitting the report includes transmitting the report in uplink control information (UCI) on a physical uplink channel.

Aspect 9: The method of Aspect 8, wherein transmitting the report in the UCI includes one of transmitting the UCI on a configured uplink resource or multiplexing the report with an uplink transmission that is scheduled with an uplink grant.

Aspect 10: The method of any of Aspects 1-7, wherein transmitting the report includes transmitting the report in a medium access control control element (MAC CE).

Aspect 11: The method of Aspect 10, wherein transmitting the report in the MAC CE includes multiplexing the report with an uplink transmission that is scheduled with an uplink grant.

Aspect 12: The method of Aspect 10 or 11, wherein transmitting the report in the MAC CE includes transmitting the MAC CE in a resource indicated by an uplink grant that is received after transmitting a scheduling request.

Aspect 13: The method of any of Aspects 10-12, wherein transmitting the report in the MAC CE includes transmitting the MAC CE in a resource indicated by an uplink grant that is associated with a random access channel procedure.

Aspect 14: The method of any of Aspects 1-13, wherein the report includes a current antenna panel identifier mapped to a beam indication identifier, wherein the beam indication identifier corresponds to one of a transmission configuration indicator (TCI) state identifier, an uplink TCI state identifier, a spatial relation identifier, or a joint uplink-downlink TCI state identifier.

Aspect 15: The method of any of Aspects 1-14, wherein the report includes one or more candidate antenna panel identifiers for mapping to a beam indication identifier, wherein each of the one or more candidate antenna panel identifiers includes one or more of a downlink antenna panel identifier, an uplink antenna panel identifier, or a joint uplink-downlink panel identifier, and wherein the beam indication identifier corresponds to one of a transmission configuration indicator (TCI) state identifier, an uplink TCI state identifier, a spatial relation identifier, or a joint uplink-downlink TCI state identifier.

Aspect 16: The method of any of Aspects 1-15, further comprising applying a received mapping between the one or more antenna panels and the one or more beam indications, wherein the received mapping is received from the base station after transmitting the report.

Aspect 17: The method of any of Aspects 1-16, further comprising applying the mapping indicated in the report.

Aspect 18: The method of Aspect 17, further comprising selecting an antenna panel, from among the one or more antenna panels, to map to a beam indication of the one or more beam indications, based at least in part on a panel selection rule.

Aspect 19: The method of Aspect 17 or 18, wherein applying the mapping includes applying the mapping after one or more of a specified time duration after transmitting the report, or a specified time duration after receiving an acknowledgement of the report from the base station.

Aspect 20: A method of wireless communication performed by a base station, comprising: receiving a report indicating a mapping between one or more antenna panels of a user equipment (UE) and one or more beam indications; and transmitting, to the UE, one of an indication to apply the mapping indicated by the report, an indication to apply a modified mapping, or an indication to not apply the mapping.

Aspect 21: The method of Aspect 20, further comprising transmitting, to the UE, a triggering condition for transmitting the report.

Aspect 22: The method of Aspect 20 or 21, further comprising transmitting, to the UE, a quantity of antenna panels for the report.

Aspect 23: The method of any of Aspects 20-22, further comprising transmitting, to the UE, a power threshold for determining whether the report is to be transmitted.

Aspect 24: The method of any of Aspects 20-23, wherein receiving the report includes receiving the report in uplink control information (UCI) on a physical uplink channel.

Aspect 25: The method of Aspect 24, wherein receiving the report in the UCI includes one of receiving the UCI on a configured uplink resource or receiving the report multiplexed with an uplink transmission that is scheduled with an uplink grant.

Aspect 26: The method of any of Aspects 20-23, wherein receiving the report includes receiving the report in a medium access control control element (MAC CE).

Aspect 27: The method of Aspect 26, wherein receiving the report in the MAC CE includes receiving the report multiplexed with an uplink transmission that is scheduled with an uplink grant.

Aspect 28: The method of Aspect 26 or 27, wherein receiving the report in the MAC CE includes receiving the MAC CE in a resource indicated by an uplink grant that is based at least in part on a scheduling request.

Aspect 29: The method of any of Aspects 26-28, wherein receiving the report in the MAC CE includes receiving the MAC CE in a resource indicated by an uplink grant that is associated with a random access channel procedure.

Aspect 30: The method of any of Aspects 20-29, wherein the report includes a current antenna panel identifier mapped to a beam indication identifier, wherein the beam indication identifier corresponds to one of a transmission configuration indicator (TCI) state identifier, an uplink TCI state identifier, a spatial relation identifier, or a joint uplink-downlink TCI state identifier.

Aspect 31: The method of any of Aspects 20-30, wherein the report includes one or more candidate antenna panel identifiers for mapping to a beam indication identifier, wherein each of the one or more candidate antenna panel identifiers includes one or more of a downlink antenna panel identifier, an uplink antenna panel identifier, or a joint uplink-downlink panel identifier, and wherein the beam indication identifier corresponds to one of a transmission configuration indicator (TCI) state identifier, an uplink TCI state identifier, a spatial relation identifier, or a joint uplink-downlink TCI state identifier.

Aspect 32: The method of any of Aspects 20-31, further comprising transmitting, to the UE, a panel selection rule for selecting an antenna panel, from among the one or more antenna panels, to map to a beam indication of the one or more beam indications.

Aspect 33: The method of any of Aspects 20-32, further comprising transmitting, to the UE, a specified time duration for applying the mapping after one or more of transmitting the report, or receiving an acknowledgement of the report from the base station.

Aspect 34: An apparatus for wireless communication at a device, comprising a processor; memory coupled with the processor; and instructions stored in the memory and executable by the processor to cause the apparatus to perform the method of one or more of Aspects 1-33.

Aspect 35: A device for wireless communication, comprising a memory and one or more processors coupled to the memory, the one or more processors configured to perform the method of one or more of Aspects 1-33.

Aspect 36: An apparatus for wireless communication, comprising at least one means for performing the method of one or more of Aspects 1-33.

Aspect 37: A non-transitory computer-readable medium storing code for wireless communication, the code comprising instructions executable by a processor to perform the method of one or more of Aspects 1-33.

Aspect 38: A non-transitory computer-readable medium storing a set of instructions for wireless communication, the set of instructions comprising one or more instructions that, when executed by one or more processors of a device, cause the device to perform the method of one or more of Aspects 1-33.

An antenna panel may generate an analog beam, and transmit or receive a reference signal, data, or control information in the beam. The beam may be configured as a beam indication that corresponds to a TCI state or spatial relation information. A base station may transmit a downlink reference signal, and a UE may have an antenna panel that is mapped to a beam indication that includes the downlink reference signal. Conversely, the UE may also have an antenna panel that is mapped to a beam indication for an uplink reference signal. Due to changing circumstances, a base station may need to update a mapping between a beam indication and an antenna panel at the UE. If a mapping is not aligned, the UE may use an antenna panel that is no longer preferred or has poor strength or quality. The UE may use the antenna panel until the base station responds to a scheduled beam report from the UE. During this time, performance may degrade, and the UE may waste time, processing resources, and signaling resources sending retransmissions or performing other operations that are based on degraded signals and/or inaccurate reference signal measurements.

According to various aspects described herein, a base station may indicate, to a UE, a new mapping between one or more beam indications and one or more antenna panels. The UE may receive the new mapping and configure an antenna panel to associate with a beam indication according to the mapping. Accordingly, the UE may switch one or more antenna panels for one or more beam indications without waiting for a base station response to a scheduled beam report. Thus, the UE and the base station may experience increased reliability and quality of communications as well as reduced network overhead. The reduced network overhead further causes the base station and the UE to conserve power, processing resources, and signaling resources.

The base station may expect the UE to apply the new mapping to antenna panels such that the antenna panels are mapped to beam indications for downlink communications or uplink communications. The base station may expect the mapped antenna panels at the UE to be associated with certain parameters (e.g., maximum antenna ports). For example, whenever a PDSCH TCI state #1 is indicated in a mapping, the base station may expect that the UE will receive a downlink communication on the PDSCH with a maximum of two antenna ports. This maximum may be the maximum number of antenna ports for downlink on UE antenna panel #5 that is mapped to the TCI state #1. In another example, whenever spatial relation information #2 is indicated for SRS for a codebook, the base station may expect that the UE will transmit an SRS or codebook-based uplink communication on a PUSCH with a maximum of one antenna port. This maximum may be the maximum number of antenna ports for uplink on UE antenna panel #7 that is mapped to spatial relation information #2.

Figure 13:
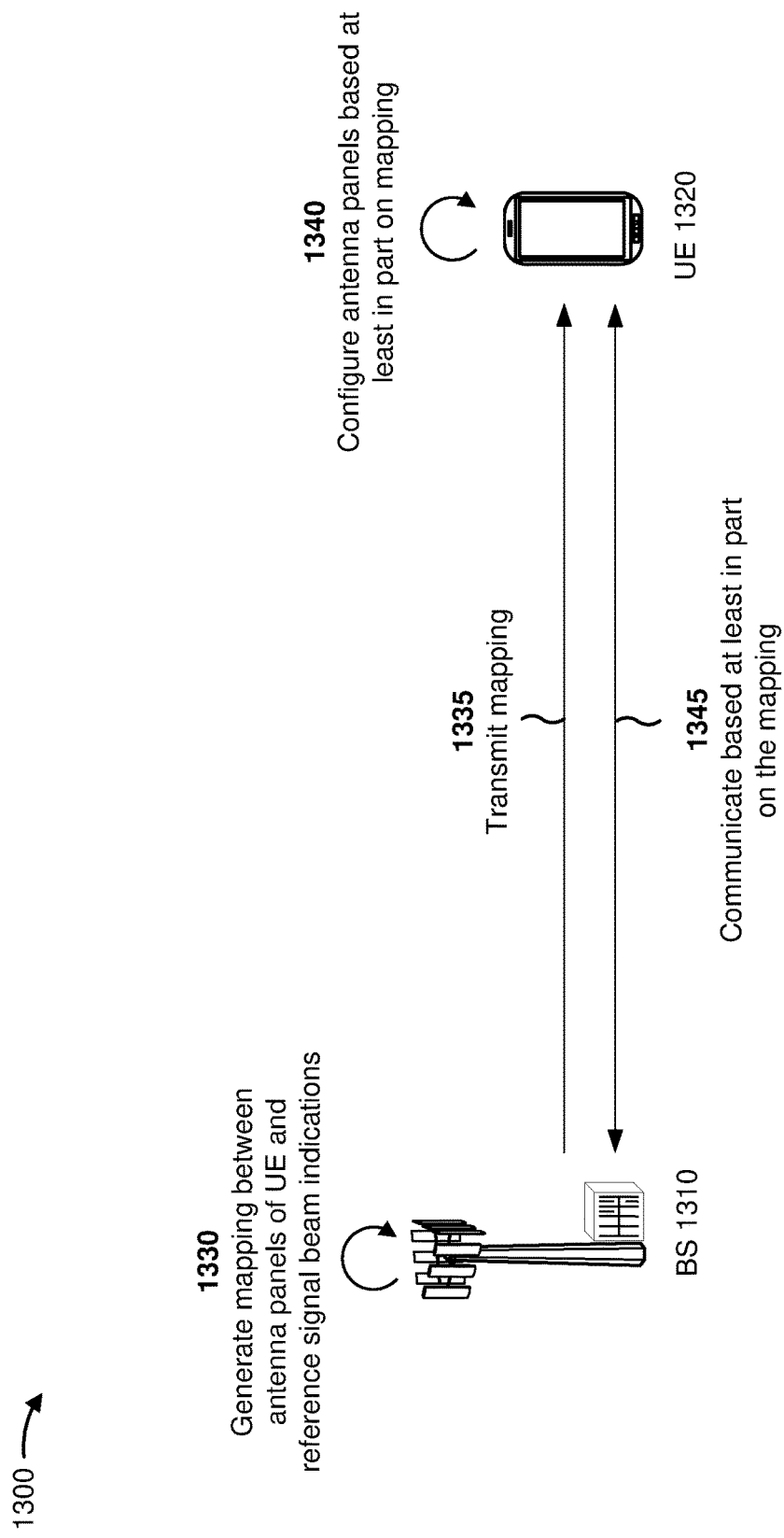
FIG. 13 is a diagram illustrating an example associated with signaling a mapping between beams and antenna panels, in accordance with the present disclosure.

FIG. 13 is a diagram illustrating an example 1300 associated with signaling a mapping between beams and antenna panels, in accordance with the present disclosure. As shown in FIG. 13, example 1300 includes communication between a BS 1310 and a UE 1320. In some aspects, BS 1310 and UE 1320 may be included in a wireless network, such as wireless network 100. BS 1310 and UE 1320 may communicate on a wireless access link, which may include an uplink and a downlink. BS 1310 may have configured UE 1320 to use an antenna panel to measure a downlink reference signal in a beam indication.

BS 1310 may determine to update a mapping between beams indications and antenna panels at UE 1320. This may be due to some change in channel conditions, traffic conditions, UE capabilities, UE locations, reference signals, measurements, a report, and/or some other event or condition. At 1330, BS 1310 may generate the mapping based at least in part on a configuration of antenna panels at UE 1320. In some aspects, BS 1310 may generate the mapping based at least in part on modifying an existing mapping at UE 1320. BS 1310 may generate the mapping based at least in part on parameters associated with antenna panels at UE 1320, such as a maximum MIMO layer number and/or an antenna port number in a corresponding downlink antenna panel or uplink antenna panel. Another parameter may include a maximum candidate analog beam number in the corresponding downlink antenna panel or uplink antenna panel.

At 1335, BS 1310 may transmit the mapping to UE 1320, via an RRC message, a MAC CE, or DCI. Beam indications may be indicated by beam indication identifiers in the mapping. Each beam indication identifier may correspond to a TCI state identifier, a spatial relation identifier, or a joint uplink-downlink TCI state identifier (e.g., common beam for both uplink and downlink). A beam indication may correspond to an uplink TCI state identifier that is associated with a downlink TCI state identifier or quasi-co-located with a downlink TCI state identifier. Antenna panels may be identified by antenna panel identifiers in the mapping. Each antenna panel identifier may include one or more of a downlink antenna panel identifier, an uplink antenna panel identifier, or a joint uplink-downlink panel identifier (e.g., common panel identifier space).

UE 1320 may apply the mapping to antenna panels. At 1340, UE 1320 may configure one or more antenna panels to map to one or more beam indications based at least in part on the mapping. If a signaled beam indication includes a downlink reference signal (e.g., CSI-RS, SSB), the mapping may map: a downlink antenna panel identifier or a joint uplink-downlink antenna panel identifier; and a downlink TCI state identifier or a joint uplink-downlink TCI state identifier. If a beam indication includes an uplink reference signal, the mapping may map an uplink antenna panel identifier or a joint uplink-downlink antenna panel identifier; and spatial relation information, an uplink TCI state identifier, or a joint uplink-downlink TCI state identifier.

At 1345, UE 1320 and BS 1310 may communicate based at least in part on the mapping. That is, UE 1320 may transmit or receive communications on beam indications that are mapped to antenna panels according to the mapping, of which BS 1310 is aware. Because BS 1310 and UE 1320 use a same updated mapping of beam indications and antenna panels, communications in the beam indications avoid prolonged degradations.

In some aspects, UE 1320 may apply the updated mapping after waiting a specified time duration (e.g., certain number of milliseconds) after receiving the mapping, or a specified time duration after transmitting an acknowledgement of the mapping to BS 1310. That is, UE 1320 may wait before configuring antenna panels to be mapped to beam indications according to the mapping, in order for BS 1310 and UE 1320 to both have time to apply the mapping. For example, UE 1320 may receive the mapping in a MAC CE, where the antenna panels are configured based at least in part on the mapping a specified time duration after transmitting an acknowledgment for the MAC CE.

Correspondingly, BS 1310 may wait to apply the mapping a specified time duration after transmitting the mapping, or after receiving an acknowledgement of the mapping. BS 1310 may configure UE 1320 with the specified time duration. Once the specified time duration has passed, BS 1310 may expect UE 1320 to configure the antenna panels according to the mapping, and BS 1310 may configure antenna panels as necessary based at least in part on the mapping.

In some aspects, UE 1320 may receive the mapping in DCI, which may include both an antenna panel identifier and a beam indication identifier. In some aspects, the mapping may be applicable only to communications scheduled by the DCI. Use of the mapping may be restricted if a time offset between DCI and scheduled transmissions is less than a threshold, which could be fixed or may depend on a UE capability. In some aspects, the mapping may be applicable to all communications that occur a specified time duration after receiving the DCI or that occur a specified time duration after transmitting an acknowledgement for the DCI.

As a result of the updated mapping between antenna panels and beam indications, UE 1320 and BS 1310 may suffer less degradation in communications caused by changing conditions.

If a signaled beam indication is for an uplink reference (e.g., SRS), the uplink reference signal may be in a beam indication that is shared with a downlink reference signal that is either a source reference signal or an indirect source reference signal with other uplink reference signals in the middle. If this is the case, a beam indication identifier for the uplink reference signal may be treated as a beam identification identifier for the downlink reference signal. In other words, a mapping of an antenna panel for the uplink reference signal may be the same as reported for the downlink reference signal.

If a signaled beam indication for an uplink reference signal does not share a beam indication with a downlink reference signal, the uplink reference signal may share a beam indication with another uplink reference signal. In some aspects, BS 1310 may request multiple uplink reference signals, and BS 1310 may have a stored mapping of antenna panels to beam indications for the uplink reference signals. An uplink reference signal may have the same antenna port number as a mapped antenna panel. Accordingly, BS 1310 may determine an antenna panel at the UE for each uplink reference signal. BS 1310 may select an uplink reference signal, from among the multiple uplink reference signals, and indicate a signaled beam indication that includes the selected uplink reference signal. Because the signaled beam indication is mapped to an antenna panel, BS 1310 and UE 1320 may determine the antenna panel to use for the signaled beam indication. If no antenna panel is determined from an existing mapping, UE 1320 may follow a rule to configure an antenna panel based at least in part on a mapping for a beam indication of a related uplink reference signal.

As indicated above, FIG. 13 is provided as an example. Other examples may differ from what is described with respect to FIG. 13.

Figure 14:
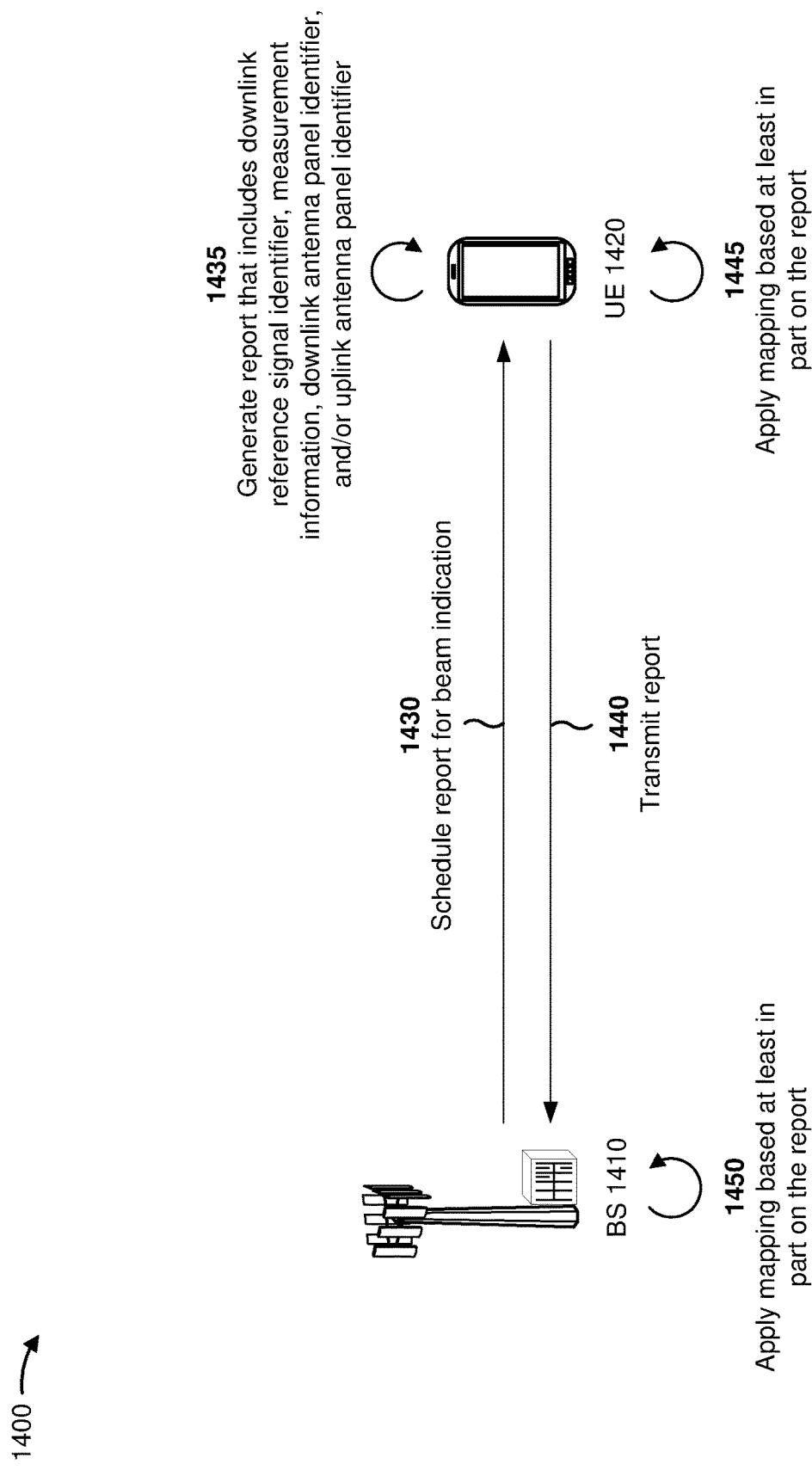
FIG. 14 is a diagram illustrating an example associated with using a mapping between beams and antenna panels, in accordance with the present disclosure.

FIG. 14 is a diagram illustrating an example 1400 associated with using a mapping between beams and antenna panels, in accordance with the present disclosure. As shown in FIG. 14, example 1400 includes communication between a BS 1410 and a UE 1420. In some aspects, BS 1410 and UE 1420 may be included in a wireless network, such as wireless network 100. BS 1410 and UE 1420 may communicate on a wireless access link, which may include an uplink and a downlink. BS 1410 may have configured UE 1420 to use an antenna panel to measure a downlink reference signal in a beam indication.

In some aspects, BS 1410 may schedule a report from UE 1420 at 1430. BS 1410 may use the report to generate a mapping. At 1435, UE 1420 may generate the report, which may be for a downlink reference signal. The report may include a downlink reference signal identifier, measurement information (RSRP measurements, SINR measurements), a downlink antenna panel identifier associated with the measurement information, and/or an uplink antenna panel identifier or a joint uplink-downlink antenna panel identifier that is mapped to a same antenna panel as the downlink antenna panel identifier. At 1440, UE 1420 may transmit the report, via UCI, a MAC CE, or an RRC message. BS 1410 may generate an updated mapping based at least in part on the report.

In some aspects, a mapping may be implicitly indicated by the report, which may carry a mapping between a beam indication identifier and an antenna panel identifier. At 1445, UE 1420 may apply the mapping based at least on the report. For example, UE 1420 may configure an antenna panel to associate with a beam indication indicated in the report, before receiving an updated mapping from BS 1410. UE 1420 may apply the updated mapping after waiting a specified time duration (e.g., certain number of milliseconds) after transmitting the report, or a specified time duration after receiving an acknowledgement of the report from BS 1410. At 1450, BS 1410 may also apply a mapping that is based at least in part on the report. For example, the report may associate an antenna panel identifier with a reference signal beam indication identifier. BS 1410 may configure an antenna panel for a signaled beam indication. In some aspects, BS 1410 may wait to apply a mapping a specified time duration after receiving the report, or a specified time duration after transmitting an acknowledgement for the report.

As indicated above, FIG. 14 is provided as an example. Other examples may differ from what is described with respect to FIG. 14.

Figure 15:
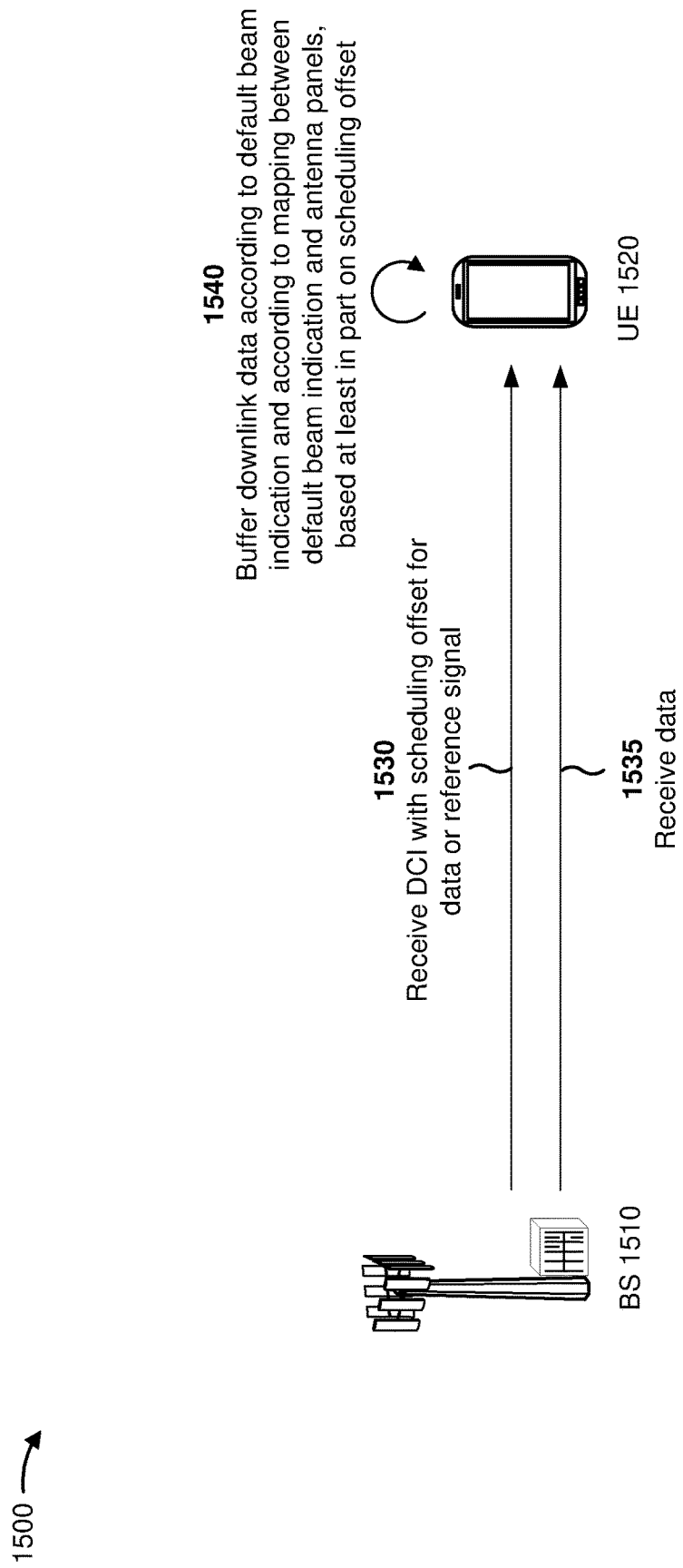
FIG. 15 is a diagram illustrating an example associated with using a mapping between beams and antenna panels, in accordance with the present disclosure.

FIG. 15 is a diagram illustrating an example 1500 associated with using a mapping between beams and antenna panels, in accordance with the present disclosure. As shown in FIG. 15, example 1500 includes communication between a BS 1510 and a UE 1520. In some aspects, BS 1510 and UE 1520 may be included in a wireless network, such as wireless network 100. BS 1510 and UE 1520 may communicate on a wireless access link, which may include an uplink and a downlink. BS 1510 may have configured UE 1520 to use an antenna panel to measure a downlink reference signal in a beam indication.

In some aspects, UE 1520 may not be able to use a mapping from BS 1510. For example, at 1530, UE 1520 may receive DCI from BS 1510 with a scheduling offset before PDSCH data or a reference signal (e.g., aperiodic CSI-RS) is to be received. If the scheduling offset is too small, or less than an offset threshold, UE 1520 may configure an antenna panel to associate with a default beam indication. UE 1520 may use a default mapping that is preconfigured and/or based at least in part on a UE capability of UE 1520.

In some aspects, the default beam indication includes the downlink reference signal as a source reference signal. BS 1510 may indicate a mapping for the default beam indication. If there are multiple TRPs with multiple default beam indications, BS 1510 may signal a mapped antenna panel identifier for each default beam indication.

In some aspects, the default beam indication includes an uplink reference signal as a source reference signal. In this case, BS 1510 need not indicate an antenna panel for the default beam indication, as UE 1520 may use a preconfigured mapping between an antenna panel identifier and a beam indication for an uplink reference signal.

At 1535, UE 1520 may receive data from the PDSCH or a reference signal. As shown at 1540, UE 1520 may buffer downlink data according to the default beam indication and according to the mapping between the default beam indication and one or more antenna panels. In other words, UE 1520 may buffer data using a default antenna panel until UE 1520 configures an antenna panel according to an updated mapping in the DCI from BS 1510. Thus, UE 1520 has less chance of degraded communications.

As indicated above, FIG. 15 is provided as an example. Other examples may differ from what is described with respect to FIG. 15.

Figure 16:
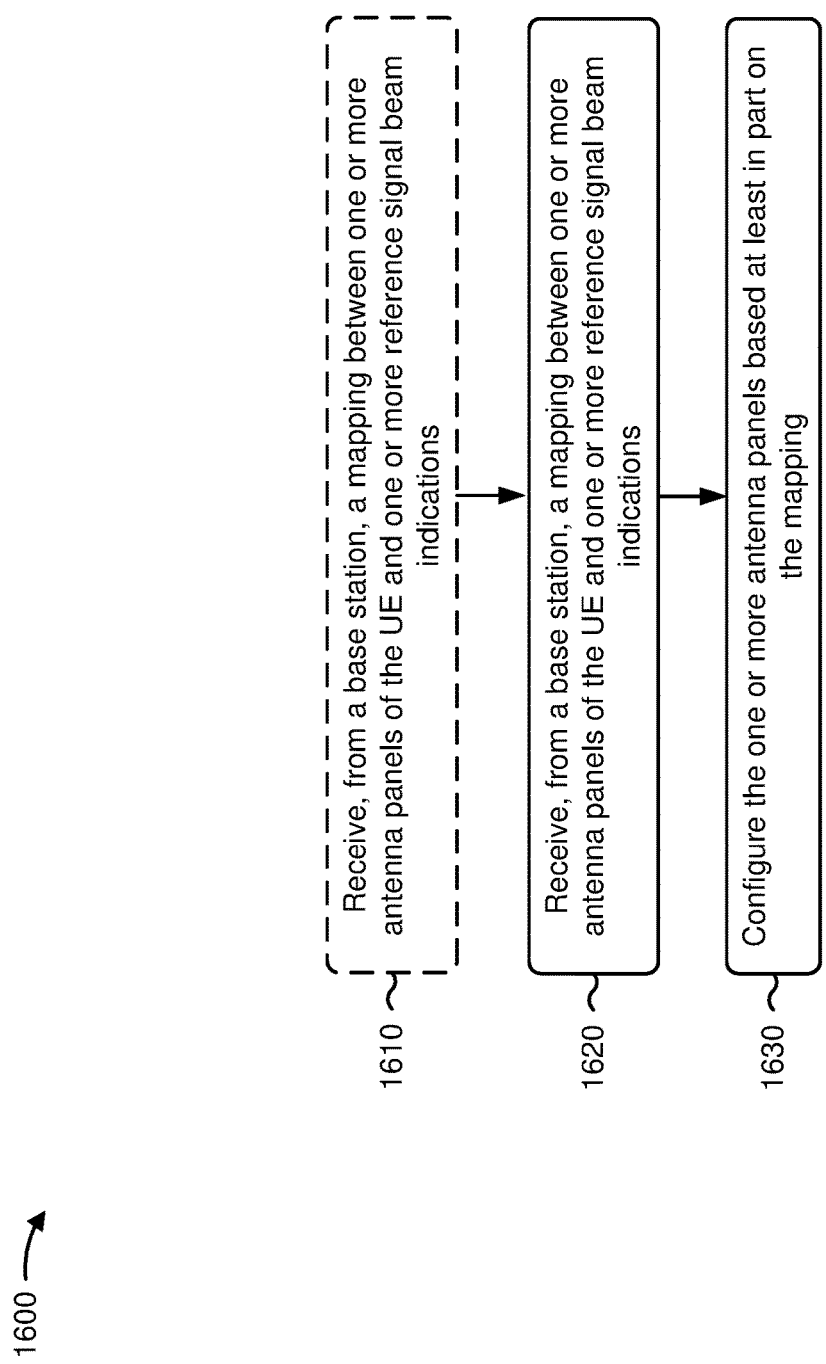
FIG. 16 is a flowchart of an example method of wireless communication, in accordance with the present disclosure.

FIG. 16 is a flowchart of an example method 1600 of wireless communication. The method 1600 may be performed by, for example, a UE (e.g., a UE 120 depicted in FIGS. 1-4, UE 1320 depicted in FIG. 13).

At 1610, the UE may transmit a report. For example, the UE (e.g., using transmission component 2104 depicted in FIG. 21) may transmit a report. The report may be for a signaled beam indication that includes a downlink reference signal, where the report includes a downlink reference signal identifier, measurement information, a downlink antenna panel identifier associated with the measurement information, and an uplink antenna panel identifier or a joint uplink-downlink antenna panel identifier that is mapped to a same antenna panel as the downlink antenna panel identifier.

At 1620, the UE may receive, from a base station, a mapping between one or more antenna panels of the UE and one or more beam indications (e.g., reference signal beam indications). For example, the UE (e.g., using reception component 2102 depicted in FIG. 21) may receive, from a base station, a mapping between one or more antenna panels of the UE and one or more reference signal beam indications, as described above in connection with, for example, FIG. 6.

In some aspects, the one or more antenna panels are configured based at least in part on the mapping a specified time duration after receiving the mapping or a specified time duration after transmitting an acknowledgement for the mapping. In some aspects, receiving the mapping includes receiving the mapping based at least in part on transmitting the report.

In some aspects, the mapping includes a mapping for a downlink reference signal that maps between a downlink antenna panel identifier or a joint uplink-downlink antenna panel identifier, and a downlink TCI state identifier or a joint uplink-downlink TCI state identifier.

In some aspects, the mapping includes a mapping for an uplink reference signal that maps between an uplink antenna panel identifier or a joint uplink-downlink antenna panel identifier, and spatial relation information, an uplink TCI state identifier, or a joint uplink-downlink TCI state identifier.

At 1630, the UE may configure the one or more antenna panels based at least in part on the mapping. For example, the UE (e.g., using map component 2108 depicted in FIG. 21) may configure the one or more antenna panels based at least in part on the mapping, as described above in connection with, for example, FIG. 13.

In some aspects, the configuring associates a signaled beam indication with an antenna panel of the one or more antenna panels. In some aspects, an antenna panel identifier of the antenna panel includes one or more of a downlink antenna panel identifier, an uplink antenna panel identifier, or a joint uplink-downlink panel identifier.

In some aspects, the signaled beam indication includes a beam identifier corresponding to one of a TCI state identifier, an uplink TCI state identifier, a spatial relation identifier, or a joint uplink-downlink TCI state identifier.

In some aspects, parameters associated with the antenna panel include one or more of a maximum number of MIMO layers associated with the antenna panel, or a maximum candidate analog beam number in the antenna panel.

In some aspects, the mapping is received in a MAC CE, and the one or more antenna panels are configured based at least in part on the mapping a specified time duration after transmitting an acknowledgment for the MAC CE. In some aspects, the mapping is received in DCI and is applicable to communications scheduled by the DCI. In some aspects, the mapping is received in DCI and is applicable to communications that occur a specified time duration after receiving the DCI or that occur a specified time duration after transmitting an acknowledgement for the DCI.

In some aspects, the one or more beam indications include a beam indication for an uplink reference signal that corresponds to a downlink reference signal, and an antenna panel identifier that is mapped to a beam indication identifier for the downlink reference signal is mapped to the beam identification identifier for the uplink reference signal.

In some aspects, the uplink reference signal is an SRS and the downlink reference signal is a CSI-RS, where a beam indication identifier for the SRS and a beam indication identifier for the CSI-RS are the same, and an antenna panel identifier for the SRS and an antenna panel identifier for the CSI-RS are the same.

In some aspects, method 1600 includes transmitting a plurality of uplink reference signals, where each uplink reference signal is associated with a mapping of a beam indication identifier and an antenna panel identifier, and the mapping is received from the base station.

In some aspects, method 1600 includes receiving, from the base station, an indication of a selected uplink reference signal from among the plurality of uplink reference signals and configuring an antenna panel mapped to a beam indication that includes the selected uplink reference signal.

Although FIG. 16 shows example blocks of method 1600, in some aspects, method 1600 may include additional blocks, fewer blocks, different blocks, or differently arranged blocks than those depicted in FIG. 16. Additionally, or alternatively, two or more of the blocks of method 1600 may be performed in parallel.

Figure 17:
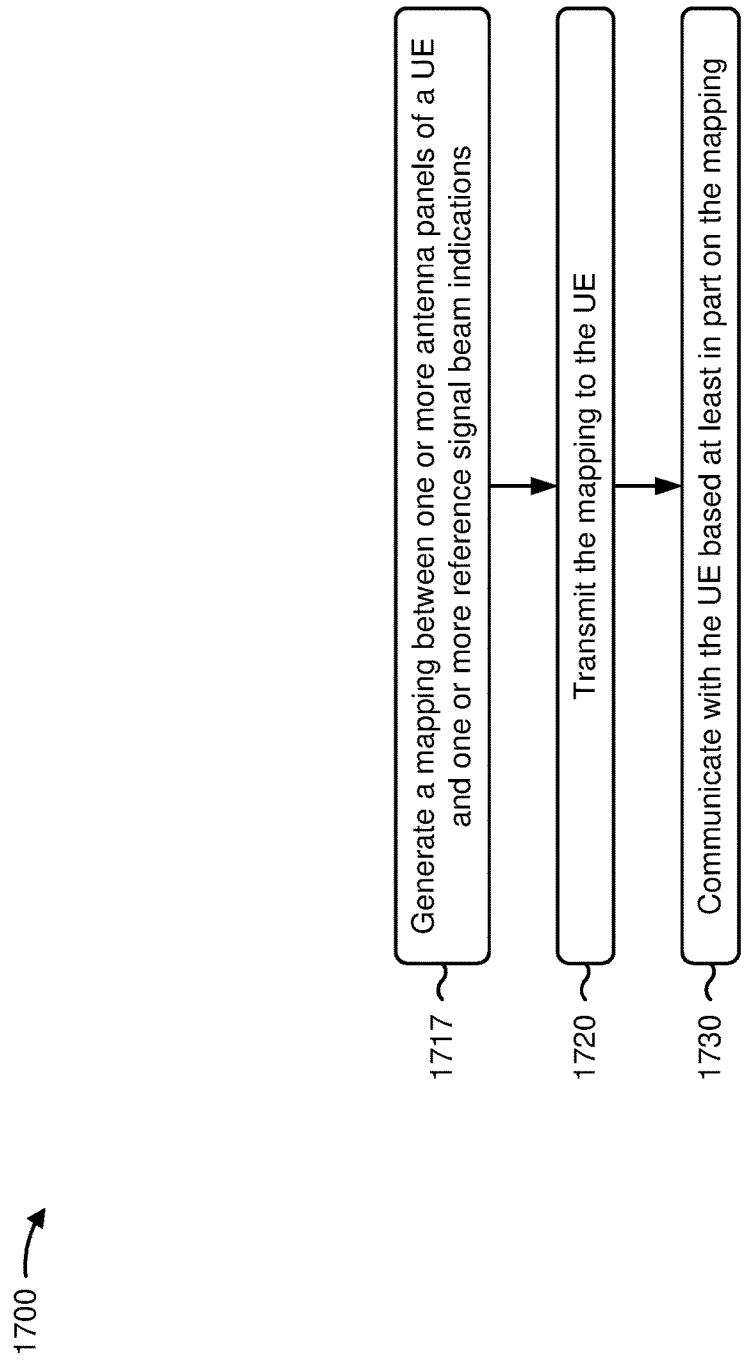
FIG. 17 is a flowchart of an example method of wireless communication, in accordance with the present disclosure.

FIG. 17 is a flowchart of an example method 1700 of wireless communication. The method 1700 may be performed by, for example, a base station (e.g., a base station 110 depicted in FIGS. 1-4, BS 1310 depicted in FIG. 13).

At 1710, the base station may generate a mapping between one or more antenna panels of a UE and one or more beam indications (e.g., reference signal beam indications). For example, the base station (e.g., using generation component 2308 depicted in FIG. 23) may generate a mapping between one or more antenna panels of a UE and one or more reference signal beam indications, as described above in connection with, for example, FIG. 13.

In some aspects, the mapping includes a mapping for a downlink reference signal that maps between a downlink antenna panel identifier or a joint uplink-downlink antenna panel identifier, and a downlink TCI state identifier or a joint uplink-downlink TCI state identifier.

In some aspects, the mapping includes a mapping for an uplink reference signal that maps between an uplink antenna panel identifier or a joint uplink-downlink antenna panel identifier, and spatial relation information, an uplink TCI state identifier, or a joint uplink-downlink TCI state identifier.

At 1720, the base station may transmit the mapping to the UE. For example, the base station (e.g., using transmission component 2304 depicted in FIG. 23) may transmit the mapping to the UE, as described above in connection with, for example, FIG. 13.

In some aspects, transmitting the mapping includes transmitting the mapping in a MAC CE, and method 1700 further comprises configuring an antenna panel based at least in part on the mapping a specified time duration after receiving an acknowledgment for the MAC CE.

In some aspects, transmitting the mapping includes transmitting the mapping in DCI, and method 1700 further comprises configuring an antenna panel based at least in part on the mapping for transmissions scheduled by the DCI.

In some aspects, transmitting the mapping includes transmitting the mapping in DCI, and method 1700 further comprises configuring an antenna panel based at least in part on the mapping for communications that occur a specified time duration after transmitting the DCI or that occur a specified time duration after receiving an acknowledgement for the DCI.

At 1730, the base station may communicate with the UE based at least in part on the mapping. For example, the base station (e.g., using reception component 2302 and transmission component 2304 depicted in FIG. 23) may communicate with the UE based at least in part on the mapping, as described above in connection with, for example, FIG. 13. In some aspects, method 1700 includes configuring an antenna panel, where the configuring associates the antenna panel with a signaled beam indication based at least in part on the mapping.

In some aspects, the configuring the antenna panel includes configuring the antenna panel with one or more of a maximum number of MIMO layers associated with the antenna panel, or a maximum candidate analog beam number in the antenna panel. In some aspects, an antenna panel identifier of the antenna panel includes one or more of a downlink antenna panel identifier, an uplink antenna panel identifier, or a joint uplink-downlink panel identifier. In some aspects, a beam indication identifier of the signaled beam indication corresponds to one of a TCI state identifier, an uplink TCI state identifier, a spatial relation identifier, or a joint uplink-downlink TCI state identifier.

In some aspects, method 1700 includes scheduling the UE to transmit a report that includes a downlink reference signal identifier, measurement information, a downlink antenna panel identifier associated with the measurement information, and an uplink antenna panel identifier or a joint uplink-downlink antenna panel identifier that is mapped to a same antenna panel as the downlink antenna panel identifier. Generating the mapping may include generating the mapping based at least in part on the report.

In some aspects, method 1700 includes configuring an antenna panel based at least in part on the mapping a specified time duration after transmitting the mapping or a specified time duration after receiving an acknowledgement for the mapping.

In some aspects, method 1700 includes receiving a plurality of uplink reference signals, where each uplink reference signal is associated with a mapping of a beam indication identifier and an antenna panel identifier and selecting an uplink reference signal from among the plurality of uplink reference signals based at least in part on measurements of the plurality of uplink reference signals. Method 1700 may include transmitting, to the UE, an indication of the selected reference signal and configuring an antenna panel mapped to a beam indication that includes the selected uplink reference signal.

Although FIG. 17 shows example blocks of method 1700, in some aspects, method 1700 may include additional blocks, fewer blocks, different blocks, or differently arranged blocks than those depicted in FIG. 17. Additionally, or alternatively, two or more of the blocks of method 1700 may be performed in parallel.

Figure 18:
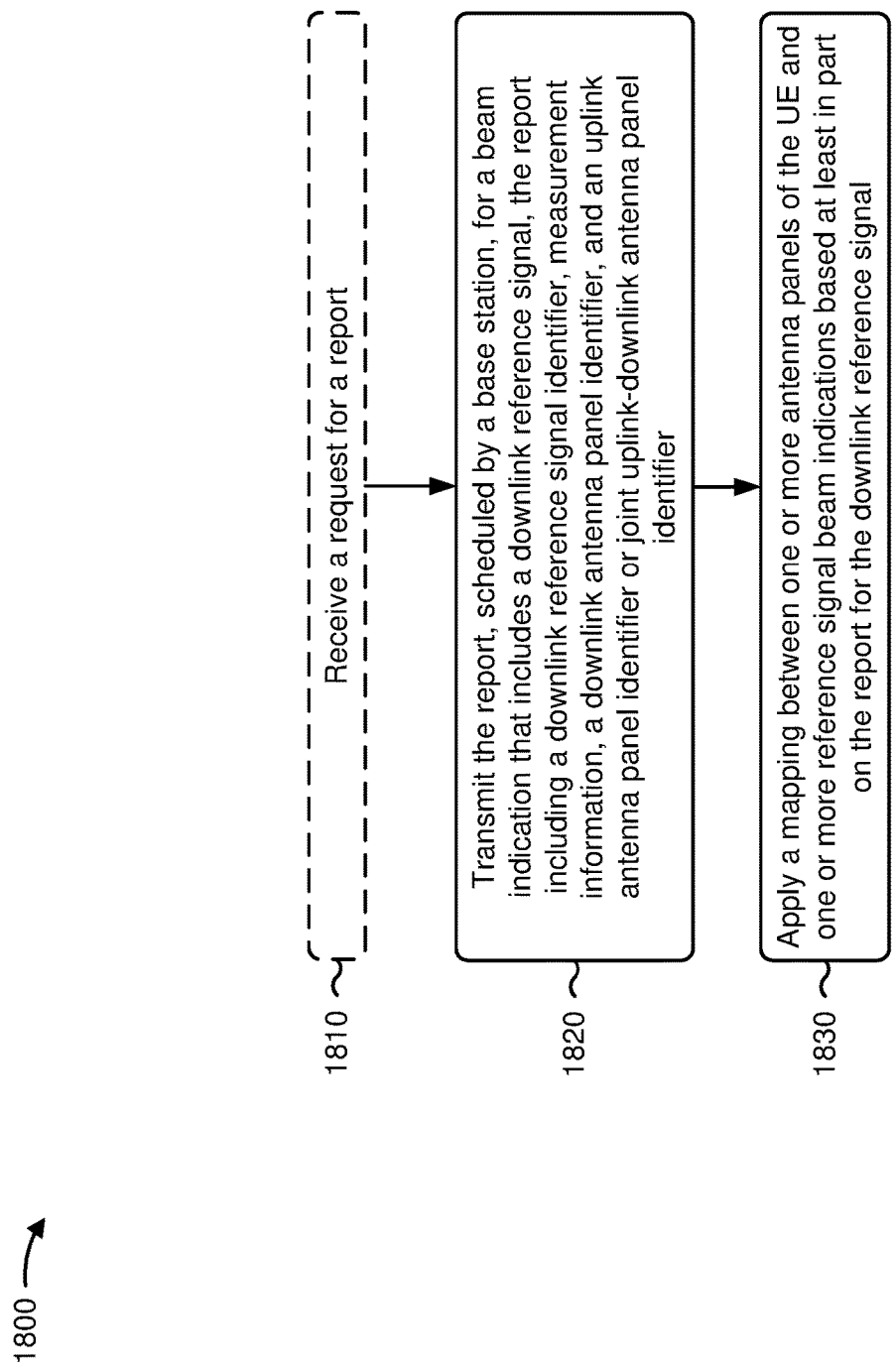
FIG. 18 is a flowchart of an example method of wireless communication, in accordance with the present disclosure.

FIG. 18 is a flowchart of an example method 1800 of wireless communication. The method 1800 may be performed by, for example, a UE (e.g., a UE 120 depicted in FIGS. 1-4, UE 1420 depicted in FIG. 14).

At 1810, the UE may receive a request for a report. For example, the UE (e.g., using reception component 2502 depicted in FIG. 25) may receive a request for a report. The request may include a scheduled resource or time for transmitting the report.

At 1820, the UE may transmit the report, scheduled by a base station, for a beam indication that includes a downlink reference signal. The report may include a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier. For example, the UE (e.g., using transmission component 2504 depicted in FIG. 25) may transmit a report, scheduled by a base station, for a beam indication that includes a downlink reference signal, as described above in connection with, for example, FIG. 14.

At 1830, the UE may apply a mapping between one or more antenna panels of the UE and one or more beam indications (e.g., reference signal beam indications) based at least in part on the report for the downlink reference signal. For example, the UE (e.g., using map component 2508 depicted in FIG. 25) may apply a mapping between one or more antenna panels of the UE and one or more reference signal beam indications based at least in part on the report for the downlink reference signal, as described above in connection with, for example, FIG. 14.

In some aspects, applying the mapping includes applying the mapping a specified time duration after transmitting the report or a specified time duration after receiving an acknowledgement for the report from the base station.

Although FIG. 18 shows example blocks of method 1800, in some aspects, method 1800 may include additional blocks, fewer blocks, different blocks, or differently arranged blocks than those depicted in FIG. 18. Additionally, or alternatively, two or more of the blocks of method 1800 may be performed in parallel.

Figure 19:
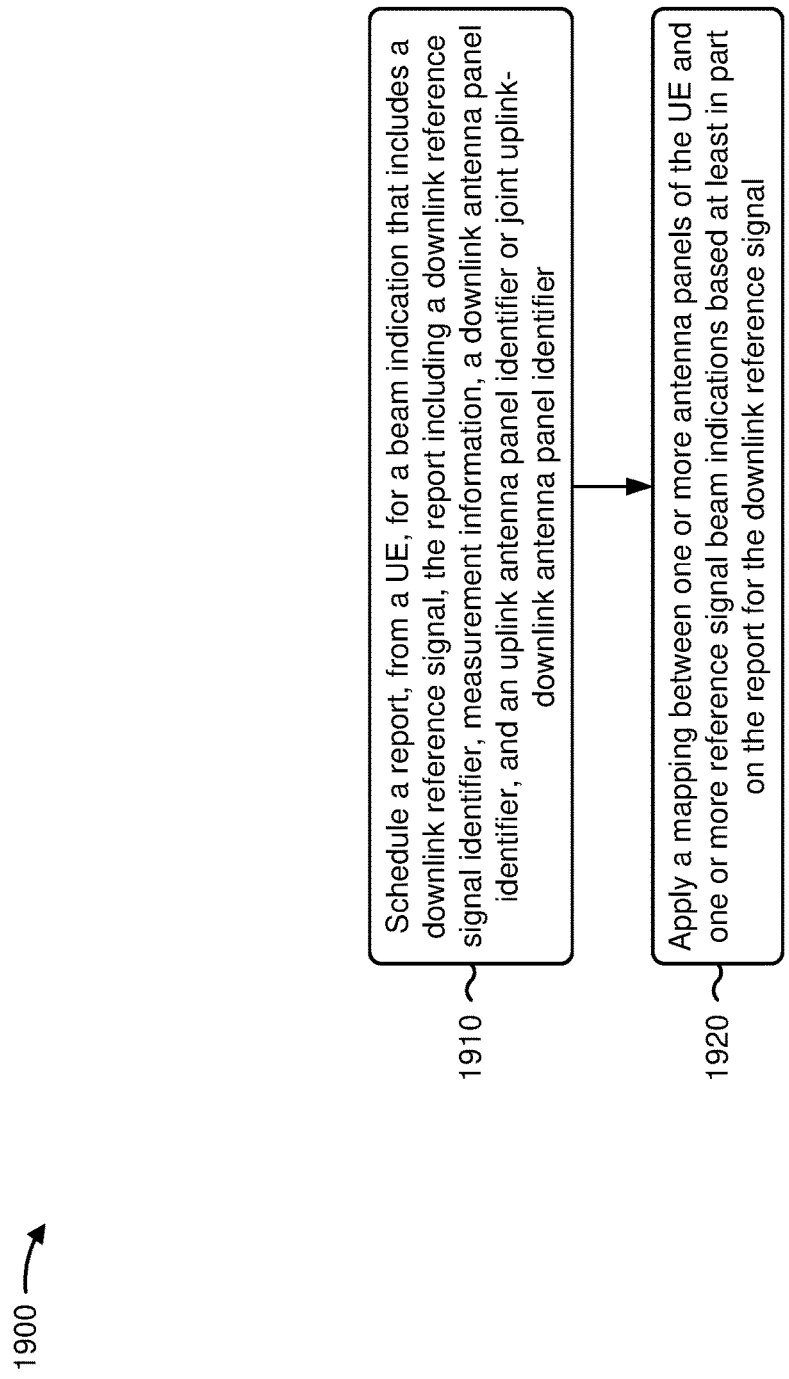
FIG. 19 is a flowchart of an example method of wireless communication, in accordance with the present disclosure.

FIG. 19 is a flowchart of an example method 1900 of wireless communication. The method 1900 may be performed by, for example, a base station (e.g., a base station 110 depicted in FIGS. 1-4, BS 1410 depicted in FIG. 14).

At 1910, the base station may schedule a report, from a UE, for a beam indication that includes a downlink reference signal. The report may include a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier. For example, the base station (e.g., using report component 2708 depicted in FIG. 27) may schedule a report, from a UE, for a beam indication that includes a downlink reference signal, as described above in connection with, for example, FIG. 14.

At 1920, the base station may apply a mapping between one or more antenna panels of the UE and one or more beam indications (e.g., reference signal beam indications) based at least in part on the report for the downlink reference signal. For example, the base station (e.g., using map component 2710 depicted in FIG. 27) may apply a mapping between one or more antenna panels of the UE and one or more reference signal beam indications based at least in part on the report for the downlink reference signal, as described above in connection with, for example, FIG. 14.

In some aspects, applying the mapping includes applying the mapping a specified time duration after receiving the report or a specified time duration after transmitting an acknowledgement for the report.

Although FIG. 19 shows example blocks of method 1900, in some aspects, method 1900 may include additional blocks, fewer blocks, different blocks, or differently arranged blocks than those depicted in FIG. 19. Additionally, or alternatively, two or more of the blocks of method 1900 may be performed in parallel.

Figure 20:
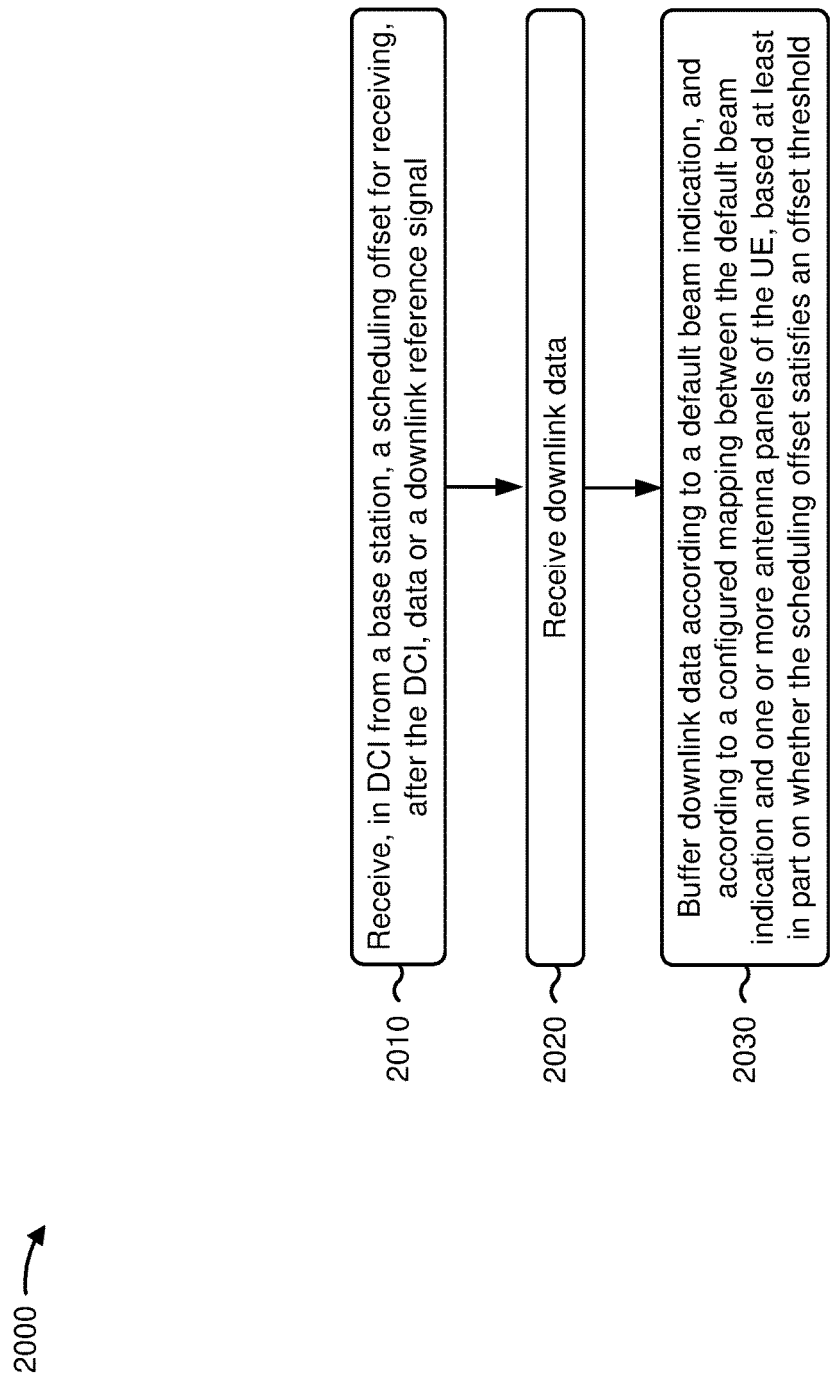
FIG. 20 is a flowchart of an example method of wireless communication, in accordance with the present disclosure.

FIG. 20 is a flowchart of an example method 2000 of wireless communication. The method 2000 may be performed by, for example, a UE (e.g., a UE 120 depicted in FIGS. 1-4, BS 1510 depicted in FIG. 15).

At 2010, the UE may receive, in DCI from a base station, a scheduling offset for receiving, after the DCI, data or a downlink reference signal. For example, the UE (e.g., using reception component 2902 depicted in FIG. 29) may receive, in DCI from a base station, a scheduling offset for receiving, after the DCI, data or a downlink reference signal, as described above in connection with, for example, FIG. 15.

At 2020, the UE may receive downlink data. For example, the UE (e.g., using reception component 2902 depicted in FIG. 29) may receive downlink data.

At 2030, the UE may buffer the downlink data according to a default beam indication, and according to a configured mapping between the default beam indication and one or more antenna panels of the UE, based at least in part on whether the scheduling offset satisfies an offset threshold. The offset threshold may be a specified amount of time or quantity of symbols between when the DCI is received and when the data or the downlink reference signal is received. The scheduling offset may satisfy the offset threshold if, for example, the scheduling offset meets or exceeds the offset threshold. For example, the UE (e.g., using buffer component 2908 depicted in FIG. 29) may buffer downlink data according to a default beam indication, and according to a configured mapping between the default beam indication and one or more antenna panels of the UE, based at least in part on whether the scheduling offset satisfies an offset threshold, as described above in connection with, for example, FIG. 15.

In some aspects, the default beam indication is for a downlink reference signal, and method 2000 may include configuring an antenna panel that is mapped to the default beam indication.

In some aspects, the default beam indication is for an uplink reference signal, and method 2000 may include configuring an antenna panel that is mapped to the default beam indication.

Although FIG. 20 shows example blocks of method 2000, in some aspects, method 2000 may include additional blocks, fewer blocks, different blocks, or differently arranged blocks than those depicted in FIG. 20. Additionally, or alternatively, two or more of the blocks of method 2000 may be performed in parallel.

Figure 21:
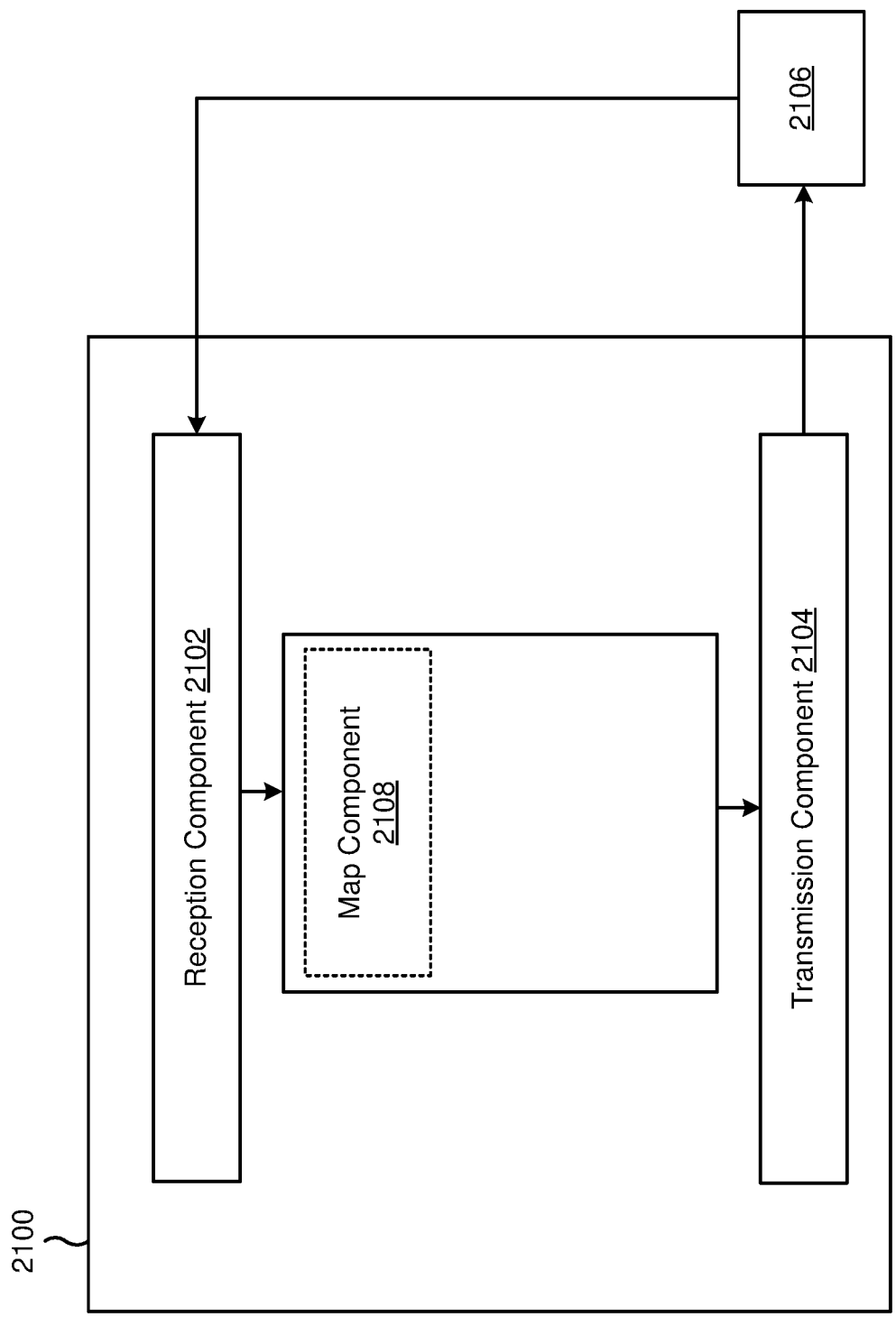
FIG. 21 is a block diagram of an example apparatus for wireless communication, in accordance with the present disclosure.

FIG. 21 is a block diagram of an example apparatus 2100 for wireless communication. The apparatus 2100 may be a UE, or a UE may include the apparatus 2100. In some aspects, the apparatus 2100 includes a reception component 2102 and a transmission component 2104, which may be in communication with one another (for example, via one or more buses and/or one or more other components). As shown, the apparatus 2100 may communicate with another apparatus 2106 (such as a UE, a base station, or another wireless communication device) using the reception component 2102 and the transmission component 2104. As further shown, the apparatus 2100 may include a map component 2108, among other examples.

In some aspects, the apparatus 2100 may be configured to perform one or more operations described herein in connection with FIGS. 1-5 and 13-15. Additionally, or alternatively, the apparatus 2100 may be configured to perform one or more processes described herein, such as method 1600 of FIG. 16. In some aspects, the apparatus 2100 and/or one or more components shown in FIG. 21 may include one or more components of the UE described above in connection with FIG. 2. Additionally, or alternatively, one or more components shown in FIG. 21 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2102 may receive communications, such as reference signals, control information, data communications, or a combination thereof, from the apparatus 2106. The reception component 2102 may provide received communications to one or more other components of the apparatus 2100. In some aspects, the reception component 2102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2100. In some aspects, the reception component 2102 may include one or more antennas, a demodulator, a MIMO detector, a receive processor, a controller/processor, a memory, or a combination thereof, of the UE described above in connection with FIG. 2.

The transmission component 2104 may transmit communications, such as reference signals, control information, data communications, or a combination thereof, to the apparatus 2106. In some aspects, one or more other components of the apparatus 2100 may generate communications and may provide the generated communications to the transmission component 2104 for transmission to the apparatus 2106. In some aspects, the transmission component 2104 may perform signal processing on the generated communications (such as filtering, amplification, modulation, digital-to-analog conversion, multiplexing, interleaving, mapping, or encoding, among other examples), and may transmit the processed signals to the apparatus 2106. In some aspects, the transmission component 2104 may include one or more antennas, a modulator, a transmit MIMO processor, a transmit processor, a controller/processor, a memory, or a combination thereof, of the UE described above in connection with FIG. 2. In some aspects, the transmission component 2104 may be co-located with the reception component 2102 in a transceiver.

The reception component 2102 may receive, from a base station, a mapping between one or more antenna panels of the UE and one or more reference signal beam indications. The map component 2108 may configure the one or more antenna panels based at least in part on the mapping. In some aspects, the map component 2108 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The transmission component 2104 may transmit a report for a signaled beam indication that includes a downlink reference signal, wherein the report includes a downlink reference signal identifier, measurement information, a downlink antenna panel identifier associated with the measurement information, and an uplink antenna panel identifier or a joint uplink-downlink antenna panel identifier that is mapped to a same antenna panel as the downlink antenna panel identifier.

The transmission component 2104 may transmit a plurality of uplink reference signals, where each uplink reference signal is associated with a mapping of a beam indication identifier and an antenna panel identifier, and the mapping is received from the base station.

The reception component 2102 may receive, from the base station, an indication of a selected uplink reference signal from among the plurality of uplink reference signals.

The map component 2108 may configure an antenna panel mapped to a beam indication that includes the selected uplink reference signal.

The number and arrangement of components shown in FIG. 21 are provided as an example. In practice, there may be additional components, fewer components, different components, or differently arranged components than those shown in FIG. 21. Furthermore, two or more components shown in FIG. 21 may be implemented within a single component, or a single component shown in FIG. 21 may be implemented as multiple, distributed components. Additionally, or alternatively, a set of (one or more) components shown in FIG. 21 may perform one or more functions described as being performed by another set of components shown in FIG. 21.

Figure 22:
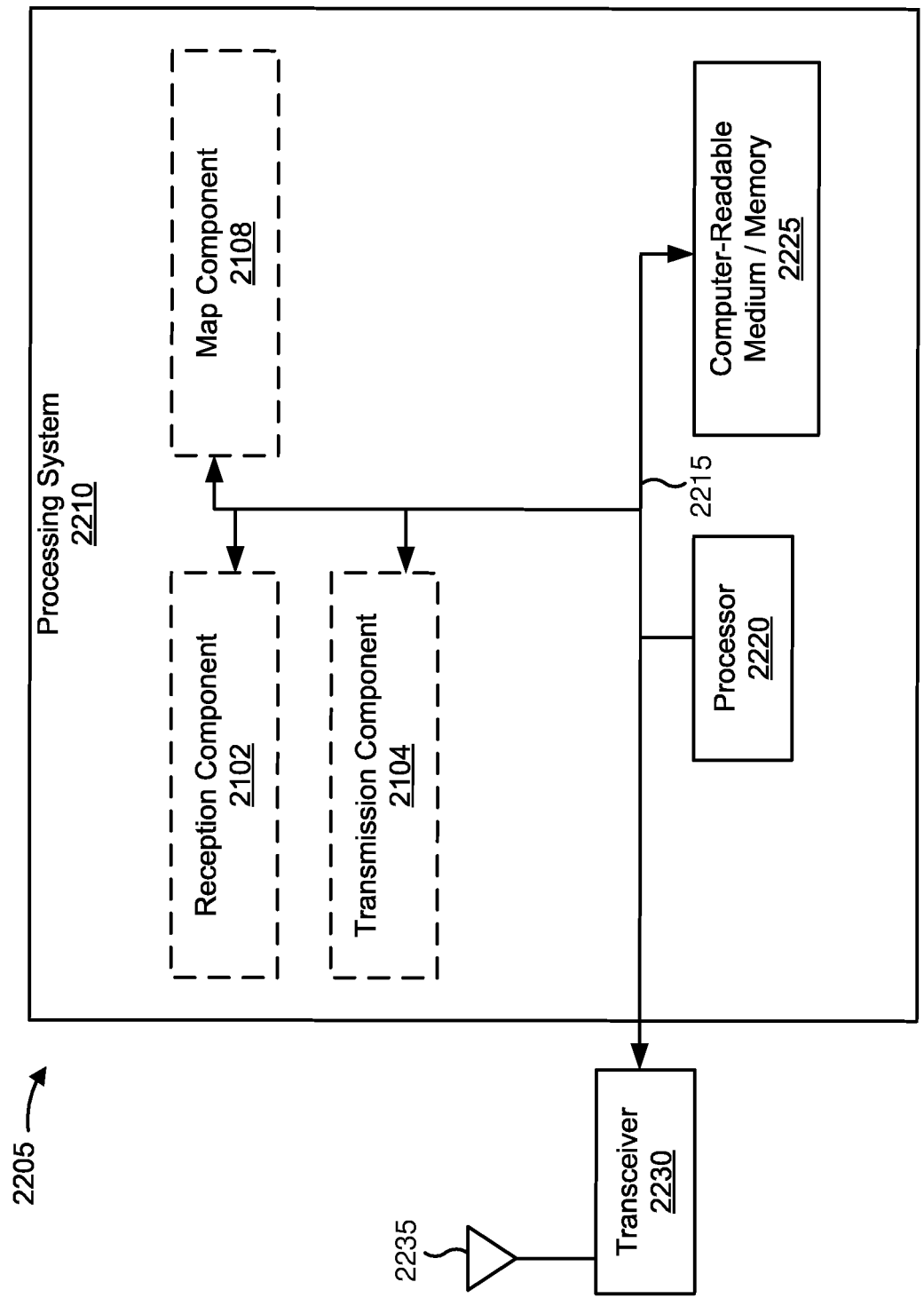
FIG. 22 is a diagram illustrating an example of a hardware implementation for an apparatus employing a processing system, in accordance with the present disclosure.

FIG. 22 is a diagram illustrating an example 2200 of a hardware implementation for an apparatus 2205 employing a processing system 2210. The apparatus 2205 may be a UE.

The processing system 2210 may be implemented with a bus architecture, represented generally by the bus 2215. The bus 2215 may include any number of interconnecting buses and bridges depending on the specific application of the processing system 2210 and the overall design constraints. The bus 2215 links together various circuits including one or more processors and/or hardware components, represented by the processor 2220, the illustrated components, and the computer-readable medium/memory 2225. The bus 2215 may also link various other circuits, such as timing sources, peripherals, voltage regulators, power management circuits, and/or the like.

The processing system 2210 may be coupled to a transceiver 2230. The transceiver 2230 is coupled to one or more antennas 2235. The transceiver 2230 provides a means for communicating with various other apparatuses over a transmission medium. The transceiver 2230 receives a signal from the one or more antennas 2235, extracts information from the received signal, and provides the extracted information to the processing system 2210, specifically the reception component 2102 depicted in FIG. 21. In addition, the transceiver 2230 receives information from the processing system 2210, specifically the transmission component 2104 depicted in FIG. 21, and generates a signal to be applied to the one or more antennas 2235 based at least in part on the received information. The map component 2108 depicted in FIG. 21 may apply a mapping and configure antenna panels to be associated with beam indications.

The processing system 2210 includes a processor 2220 coupled to a computer-readable medium/memory 2225. The processor 2220 is responsible for general processing, including the execution of software stored on the computer-readable medium/memory 2225. The software, when executed by the processor 2220, causes the processing system 2210 to perform the various functions described herein for any particular apparatus. The computer-readable medium/memory 2225 may also be used for storing data that is manipulated by the processor 2220 when executing software. The processing system further includes at least one of the illustrated components. The components may be software modules running in the processor 2220, resident/stored in the computer-readable medium/memory 2225, one or more hardware modules coupled to the processor 2220, or some combination thereof.

In some aspects, the processing system 2210 may be a component of the UE 120 and may include the memory 282 and/or at least one of the TX MIMO processor 266, the RX processor 258, and/or the controller/processor 280. In some aspects, the apparatus 2205 for wireless communication includes means for receiving, from a base station, a mapping between one or more antenna panels of the UE and one or more reference signal beam indications, and/or means for configuring the one or more antenna panels based at least in part on the mapping.

In some aspects, the apparatus 2205 includes means for transmitting a report for a signaled beam indication that includes a downlink reference signal, where the report includes a downlink reference signal identifier, measurement information, a downlink antenna panel identifier associated with the measurement information, and an uplink antenna panel identifier or a joint uplink-downlink antenna panel identifier that is mapped to a same antenna panel as the downlink antenna panel identifier In some aspects, the apparatus 2205 includes means for transmitting a plurality of uplink reference signals, where each uplink reference signal is associated with a mapping of a beam indication identifier and an antenna panel identifier, and the mapping is received from the base station.

In some aspects, the apparatus 2205 includes means for receiving, from the base station, an indication of a selected uplink reference signal from among the plurality of uplink reference signals, and/or means for configuring an antenna panel mapped to a beam indication that includes the selected uplink reference signal.

The means for the UE to perform operations described herein may include, for example, antenna 252, demodulator 254, MIMO detector 256, receive processor 258, transmit processor 264, TX MIMO processor 266, modulator 254, controller/processor 280, and/or memory 282. The aforementioned means may be one or more of the aforementioned components of the apparatus 2100 depicted in FIG. 21 and/or the processing system 2210 of the apparatus 2205 configured to perform the functions recited by the aforementioned means. As described elsewhere herein, the processing system 2210 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 22 is provided as an example. Other examples may differ from what is described in connection with FIG. 22.

Figure 23:
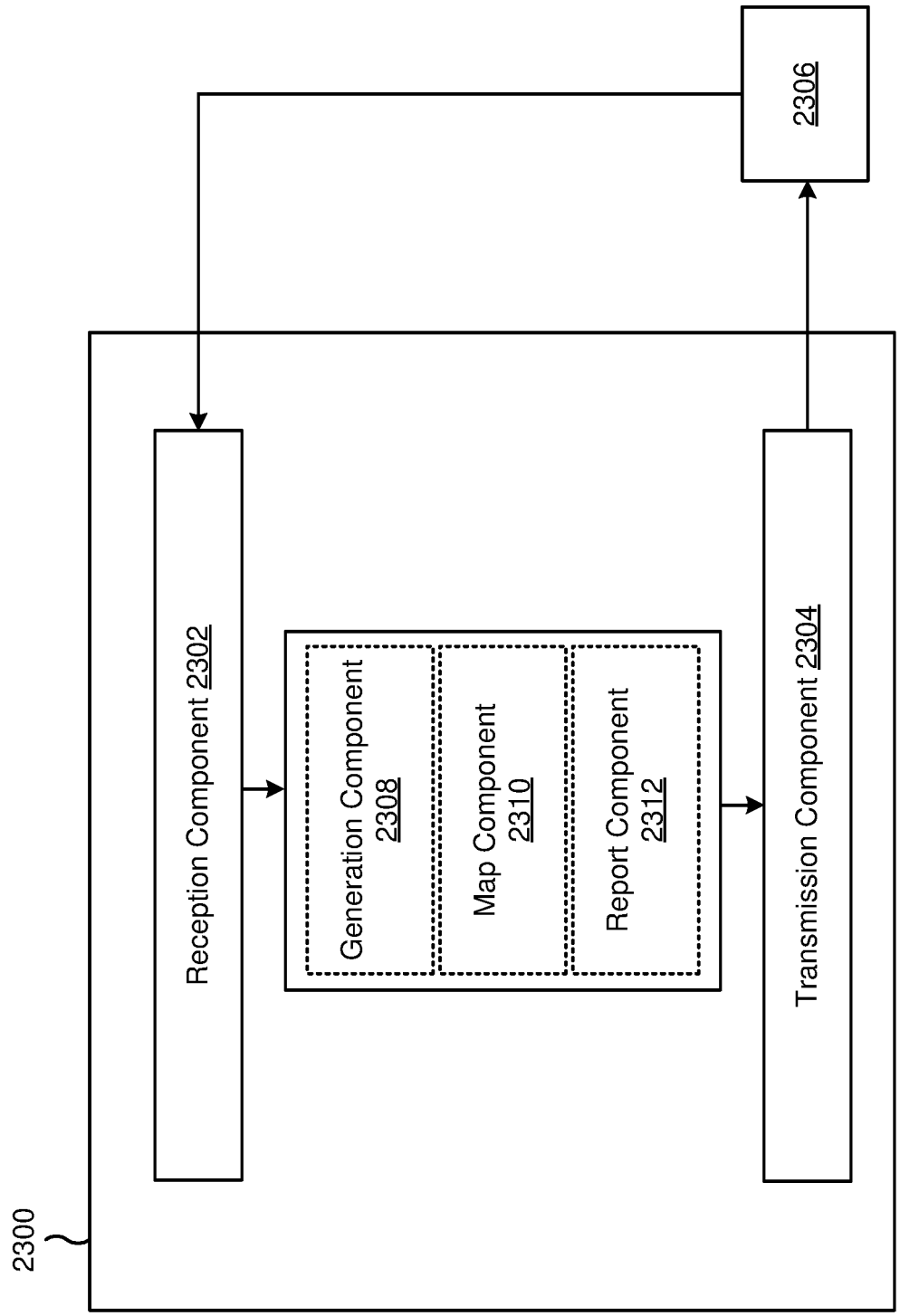
FIG. 23 is a block diagram of an example apparatus for wireless communication, in accordance with the present disclosure.

FIG. 23 is a block diagram of an example apparatus 2300 for wireless communication. The apparatus 2300 may be a base station, or a base station may include the apparatus 2300. In some aspects, the apparatus 2300 includes a reception component 2302 and a transmission component 2304, which may be in communication with one another (for example, via one or more buses and/or one or more other components). As shown, the apparatus 2300 may communicate with another apparatus 2306 (such as a UE, a base station, or another wireless communication device) using the reception component 2302 and the transmission component 2304. As further shown, the apparatus 2300 may include a generation component 2308, a map component 2310, or a report component 2312, among other examples.

In some aspects, the apparatus 2300 may be configured to perform one or more operations described herein in connection with FIGS. 1-5 and 13-15. Additionally, or alternatively, the apparatus 2300 may be configured to perform one or more processes described herein, such as method 1700 of FIG. 17, or a combination thereof. In some aspects, the apparatus 2300 and/or one or more components shown in FIG. 23 may include one or more components of the base station described above in connection with FIG. 2. Additionally, or alternatively, one or more components shown in FIG. 23 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2302 may receive communications, such as reference signals, control information, data communications, or a combination thereof, from the apparatus 2306. The reception component 2302 may provide received communications to one or more other components of the apparatus 2300. In some aspects, the reception component 2302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2300. In some aspects, the reception component 2302 may include one or more antennas, a demodulator, a MIMO detector, a receive processor, a controller/processor, a memory, or a combination thereof, of the base station described above in connection with FIG. 2.

The transmission component 2304 may transmit communications, such as reference signals, control information, data communications, or a combination thereof, to the apparatus 2306. In some aspects, one or more other components of the apparatus 2300 may generate communications and may provide the generated communications to the transmission component 2304 for transmission to the apparatus 2306. In some aspects, the transmission component 2304 may perform signal processing on the generated communications (such as filtering, amplification, modulation, digital-to-analog conversion, multiplexing, interleaving, mapping, or encoding, among other examples), and may transmit the processed signals to the apparatus 2306. In some aspects, the transmission component 2304 may include one or more antennas, a modulator, a transmit MIMO processor, a transmit processor, a controller/processor, a memory, or a combination thereof, of the base station described above in connection with FIG. 2. In some aspects, the transmission component 2304 may be co-located with the reception component 2302 in a transceiver.

The generation component 2308 may generate a mapping between one or more antenna panels of a UE and one or more reference signal beam indications. In some aspects, the generation component 2308 may include a controller/processor, a memory, or a combination thereof, of the base station described above in connection with FIG. 2. The transmission component 2304 may transmit the mapping to the UE. The reception component 2302 and transmission component 2304 may communicate with the UE based at least in part on the mapping.

The map component 2310 may configure an antenna panel, wherein the configuring associates the antenna panel with a signaled beam indication based at least in part on the mapping. In some aspects, the map component 2310 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The report component 2312 may schedule the UE to transmit a report that includes a downlink reference signal identifier, measurement information, a downlink antenna panel identifier associated with the measurement information, and an uplink antenna panel identifier or a joint uplink-downlink antenna panel identifier that is mapped to a same antenna panel as the downlink antenna panel identifier. Generating the mapping may include generating the mapping based at least in part on the report. In some aspects, the report component 2312 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The map component 2310 may configure an antenna panel based at least in part on the mapping a specified time duration after transmitting the mapping or a specified time duration after receiving an acknowledgement for the mapping.

The reception component 2302 may receive a plurality of uplink reference signals, where each uplink reference signal is associated with a mapping of a beam indication identifier and an antenna panel identifier.

The map component 2310 may select an uplink reference signal from among the plurality of uplink reference signals based at least in part on measurements of the plurality of uplink reference signals. The transmission component 2304 may transmit, to the UE, an indication of the selected reference signal. The map component 2310 may configure an antenna panel mapped to a beam indication that includes the selected uplink reference signal.

The number and arrangement of components shown in FIG. 23 are provided as an example. In practice, there may be additional components, fewer components, different components, or differently arranged components than those shown in FIG. 23. Furthermore, two or more components shown in FIG. 23 may be implemented within a single component, or a single component shown in FIG. 23 may be implemented as multiple, distributed components. Additionally, or alternatively, a set of (one or more) components shown in FIG. 23 may perform one or more functions described as being performed by another set of components shown in FIG. 23.

Figure 24:
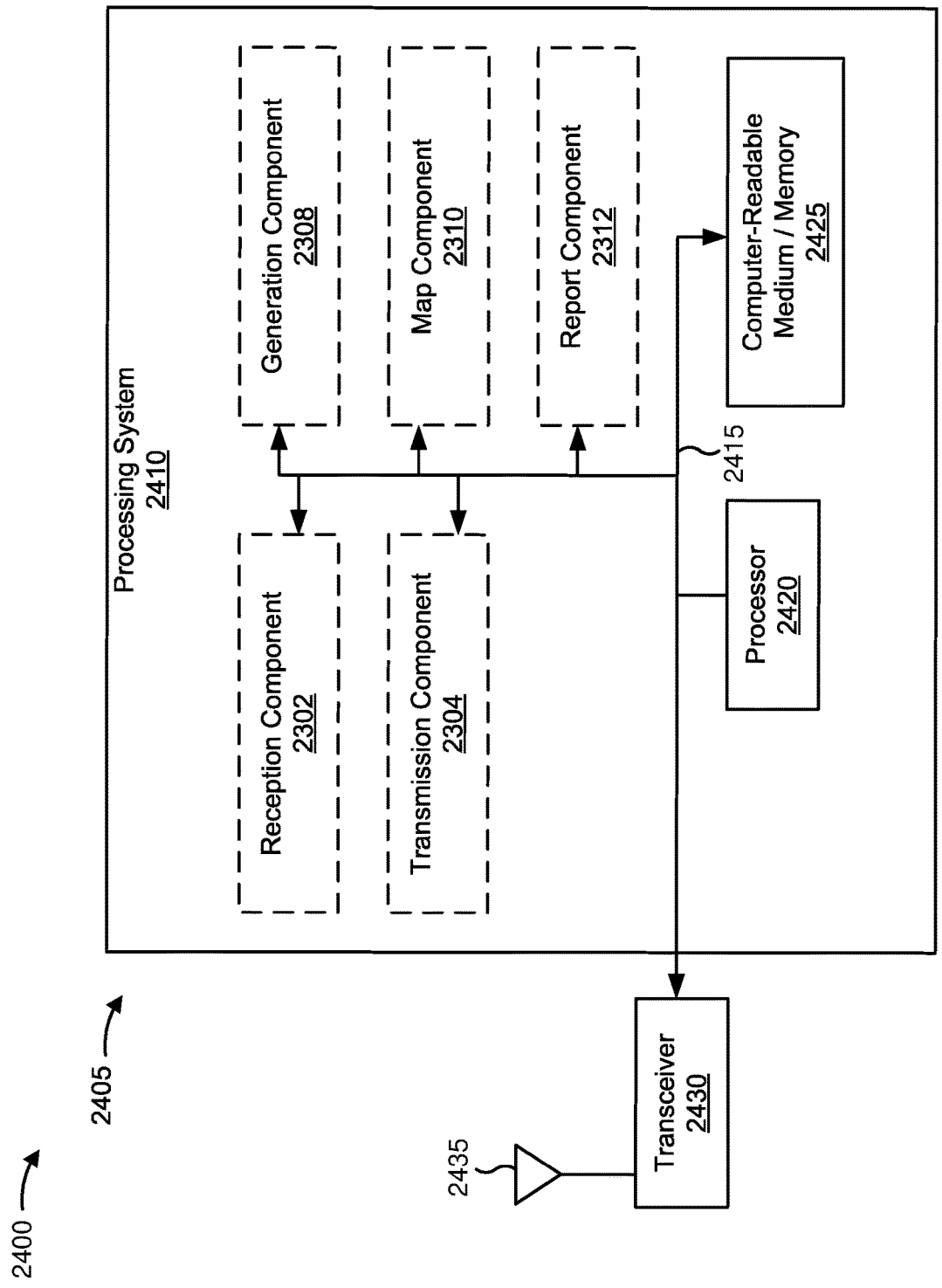
FIG. 24 is a diagram illustrating an example of a hardware implementation for an apparatus employing a processing system, in accordance with the present disclosure.

FIG. 24 is a diagram illustrating an example 2400 of a hardware implementation for an apparatus 2405 employing a processing system 2410. The apparatus 2405 may be a base station.

The processing system 2410 may be implemented with a bus architecture, represented generally by the bus 2415. The bus 2415 may include any number of interconnecting buses and bridges depending on the specific application of the processing system 2410 and the overall design constraints. The bus 2415 links together various circuits including one or more processors and/or hardware components, represented by the processor 2420, the illustrated components, and the computer-readable medium/memory 2425. The bus 2415 may also link various other circuits, such as timing sources, peripherals, voltage regulators, power management circuits, and/or the like.

The processing system 2410 may be coupled to a transceiver 2430. The transceiver 2430 is coupled to one or more antennas 2435. The transceiver 2430 provides a means for communicating with various other apparatuses over a transmission medium. The transceiver 2430 receives a signal from the one or more antennas 2435, extracts information from the received signal, and provides the extracted information to the processing system 2410, specifically the reception component 2302 depicted in FIG. 23. In addition, the transceiver 2430 receives information from the processing system 2410, specifically the transmission component 2304 depicted in FIG. 23, and generates a signal to be applied to the one or more antennas 2435 based at least in part on the received information. Generation component 2308, map component 2310, and report component 2312 may perform operations described in connection with FIG. 23.

The processing system 2410 includes a processor 2420 coupled to a computer-readable medium/memory 2425. The processor 2420 is responsible for general processing, including the execution of software stored on the computer-readable medium/memory 2425. The software, when executed by the processor 2420, causes the processing system 2410 to perform the various functions described herein for any particular apparatus. The computer-readable medium/memory 2425 may also be used for storing data that is manipulated by the processor 2420 when executing software. The processing system further includes at least one of the illustrated components. The components may be software modules running in the processor 2420, resident/stored in the computer-readable medium/memory 2425, one or more hardware modules coupled to the processor 2420, or some combination thereof.

In some aspects, the processing system 2410 may be a component of the base station 110 and may include the memory 242 and/or at least one of the TX MIMO processor 230, the RX processor 238, and/or the controller/processor 240. In some aspects, the apparatus 2405 for wireless communication includes means for generating a mapping between one or more antenna panels of a UE and one or more reference signal beam indications, means for transmitting the mapping to the UE, and/or means for communicating with the UE based at least in part on the mapping.

In some aspects, the apparatus 2405 includes means for configuring an antenna panel, where the configuring associates the antenna panel with a signaled beam indication based at least in part on the mapping.

In some aspects, the apparatus 2405 includes means for scheduling the UE to transmit a report that includes a downlink reference signal identifier, measurement information, a downlink antenna panel identifier associated with the measurement information, and an uplink antenna panel identifier or a joint uplink-downlink antenna panel identifier that is mapped to a same antenna panel as the downlink antenna panel identifier, In some aspects, the apparatus 2405 includes means for configuring an antenna panel based at least in part on the mapping a specified time duration after transmitting the mapping or a specified time duration after receiving an acknowledgement for the mapping.

In some aspects, the apparatus 2405 includes means for receiving a plurality of uplink reference signals, where each uplink reference signal is associated with a mapping of a beam indication identifier and an antenna panel identifier, means for selecting an uplink reference signal from among the plurality of uplink reference signals based at least in part on measurements of the plurality of uplink reference signals, means for transmitting, to the UE, an indication of the selected reference signal, and/or means for configuring an antenna panel mapped to a beam indication that includes the selected uplink reference signal.

The aforementioned means may be one or more of the aforementioned components of the apparatus 2300 and/or the processing system 2410 of the apparatus 2405 configured to perform the functions recited by the aforementioned means. As described elsewhere herein, the processing system 2410 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 24 is provided as an example. Other examples may differ from what is described in connection with FIG. 24.

Figure 25:
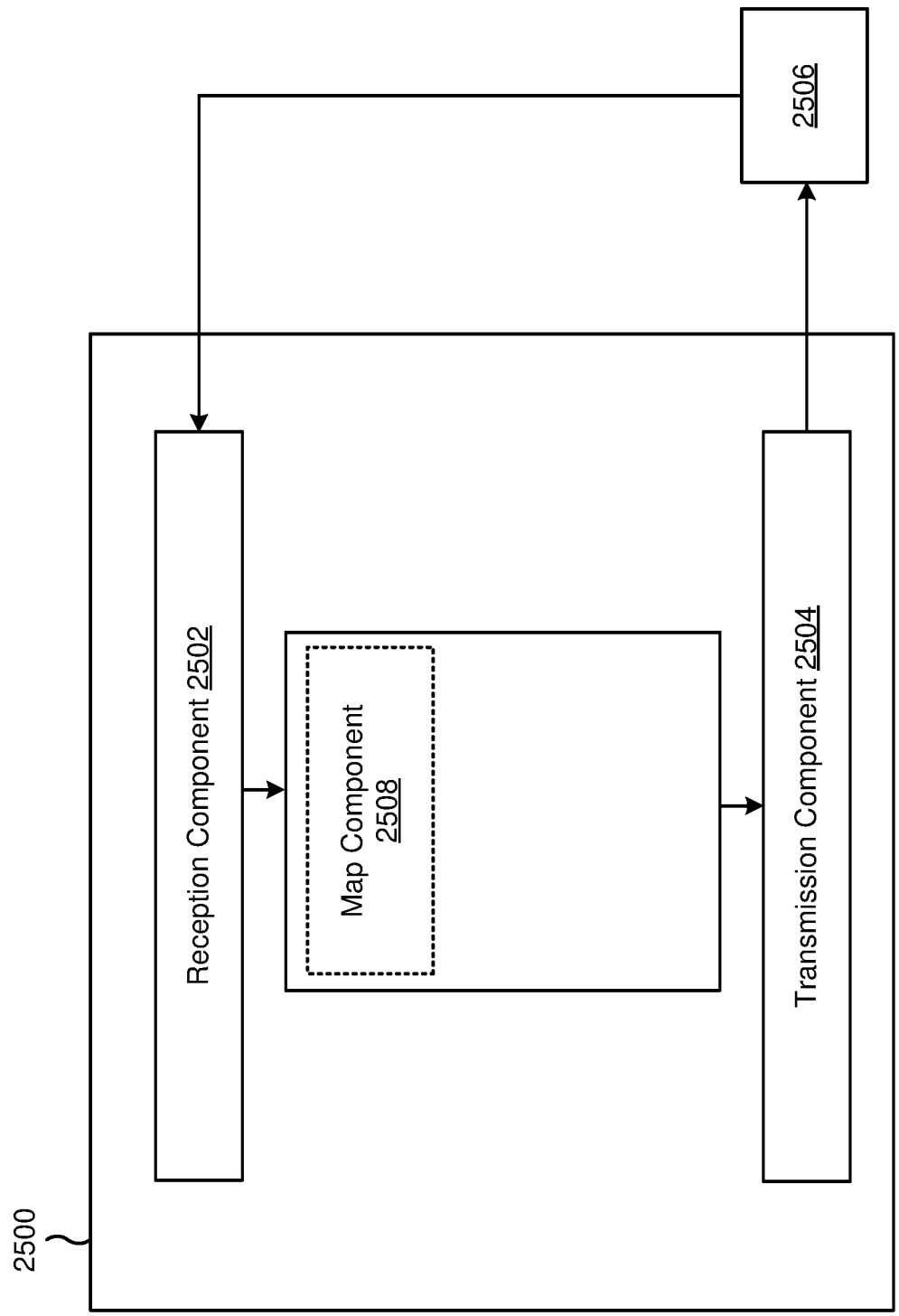
FIG. 25 is a block diagram of an example apparatus for wireless communication, in accordance with the present disclosure.

FIG. 25 is a block diagram of an example apparatus 2500 for wireless communication. The apparatus 2500 may be a UE, or a UE may include the apparatus 2500. In some aspects, the apparatus 2500 includes a reception component 2502 and a transmission component 2504, which may be in communication with one another (for example, via one or more buses and/or one or more other components). As shown, the apparatus 2500 may communicate with another apparatus 2506 (such as a UE, a base station, or another wireless communication device) using the reception component 2502 and the transmission component 2504. As further shown, the apparatus 2500 may include a map component 2508, among other examples.

In some aspects, the apparatus 2500 may be configured to perform one or more operations described herein in connection with FIGS. 1-5 and 12-15. Additionally, or alternatively, the apparatus 2500 may be configured to perform one or more processes described herein, such as method 1800 of FIG. 18. In some aspects, the apparatus 2500 and/or one or more components shown in FIG. 25 may include one or more components of the UE described above in connection with FIG. 2. Additionally, or alternatively, one or more components shown in FIG. 25 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2502 may receive communications, such as reference signals, control information, data communications, or a combination thereof, from the apparatus 2506. The reception component 2502 may provide received communications to one or more other components of the apparatus 2500. In some aspects, the reception component 2502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2500. In some aspects, the reception component 2502 may include one or more antennas, a demodulator, a MIMO detector, a receive processor, a controller/processor, a memory, or a combination thereof, of the UE described above in connection with FIG. 2.

The transmission component 2504 may transmit communications, such as reference signals, control information, data communications, or a combination thereof, to the apparatus 2506. In some aspects, one or more other components of the apparatus 2500 may generate communications and may provide the generated communications to the transmission component 2504 for transmission to the apparatus 2506. In some aspects, the transmission component 2504 may perform signal processing on the generated communications (such as filtering, amplification, modulation, digital-to-analog conversion, multiplexing, interleaving, mapping, or encoding, among other examples), and may transmit the processed signals to the apparatus 2506. In some aspects, the transmission component 2504 may include one or more antennas, a modulator, a transmit MIMO processor, a transmit processor, a controller/processor, a memory, or a combination thereof, of the UE described above in connection with FIG. 2. In some aspects, the transmission component 2504 may be co-located with the reception component 2502 in a transceiver.

The transmission component 2504 may transmit a report, scheduled by a base station, for a beam indication that includes a downlink reference signal, the report including a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier. The map component 2508 may apply a mapping between one or more antenna panels of the UE and one or more reference signal beam indications based at least in part on the report for the downlink reference signal. In some aspects, the map component 2508 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 25 are provided as an example. In practice, there may be additional components, fewer components, different components, or differently arranged components than those shown in FIG. 25. Furthermore, two or more components shown in FIG. 25 may be implemented within a single component, or a single component shown in FIG. 25 may be implemented as multiple, distributed components. Additionally, or alternatively, a set of (one or more) components shown in FIG. 25 may perform one or more functions described as being performed by another set of components shown in FIG. 25.

Figure 26:
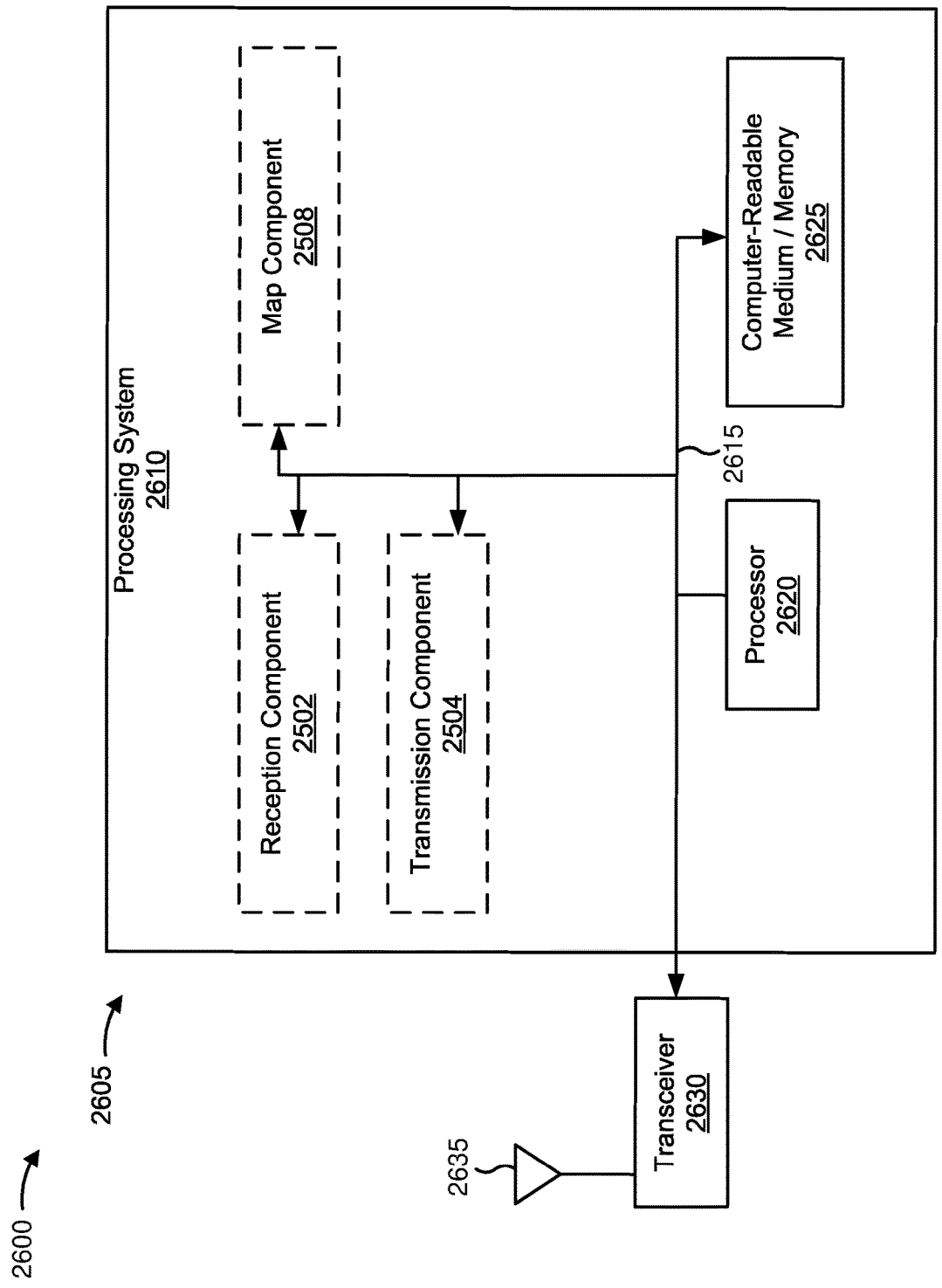
FIG. 26 is a diagram illustrating an example of a hardware implementation for an apparatus employing a processing system, in accordance with the present disclosure.

FIG. 26 is a diagram illustrating an example 2600 of a hardware implementation for an apparatus 2605 employing a processing system 2610. The apparatus 2605 may be a UE.

The processing system 2610 may be implemented with a bus architecture, represented generally by the bus 2615. The bus 2615 may include any number of interconnecting buses and bridges depending on the specific application of the processing system 2610 and the overall design constraints. The bus 2615 links together various circuits including one or more processors and/or hardware components, represented by the processor 2620, the illustrated components, and the computer-readable medium/memory 2625. The bus 2615 may also link various other circuits, such as timing sources, peripherals, voltage regulators, power management circuits, and/or the like.

The processing system 2610 may be coupled to a transceiver 2630. The transceiver 2630 is coupled to one or more antennas 2635. The transceiver 2630 provides a means for communicating with various other apparatuses over a transmission medium. The transceiver 2630 receives a signal from the one or more antennas 2635, extracts information from the received signal, and provides the extracted information to the processing system 2610, specifically the reception component 2502. In addition, the transceiver 2630 receives information from the processing system 2610, specifically the transmission component 2504, and generates a signal to be applied to the one or more antennas 2635 based at least in part on the received information.

The processing system 2610 includes a processor 2620 coupled to a computer-readable medium/memory 2625. The processor 2620 is responsible for general processing, including the execution of software stored on the computer-readable medium/memory 2625. The software, when executed by the processor 2620, causes the processing system 2610 to perform the various functions described herein for any particular apparatus. The computer-readable medium/memory 2625 may also be used for storing data that is manipulated by the processor 2620 when executing software. The processing system further includes at least one of the illustrated components. The components may be software modules running in the processor 2620, resident/stored in the computer-readable medium/memory 2625, one or more hardware modules coupled to the processor 2620, or some combination thereof.

In some aspects, the processing system 2610 may be a component of the UE 120 and may include the memory 282 and/or at least one of the TX MIMO processor 266, the RX processor 258, and/or the controller/processor 280. In some aspects, the apparatus 2605 for wireless communication includes means for transmitting a report, scheduled by a base station, for a beam indication that includes: a downlink reference signal, the report including a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier; and/or means for applying a mapping between one or more antenna panels of the UE and one or more reference signal beam indications based at least in part on the report for the downlink reference signal. Map component 2508 may perform operations described in connection with FIG. 25.

The aforementioned means may be one or more of the aforementioned components of the apparatus 2500 and/or the processing system 2610 of the apparatus 2605 configured to perform the functions recited by the aforementioned means. As described elsewhere herein, the processing system 2610 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 26 is provided as an example. Other examples may differ from what is described in connection with FIG. 26

Figure 27:
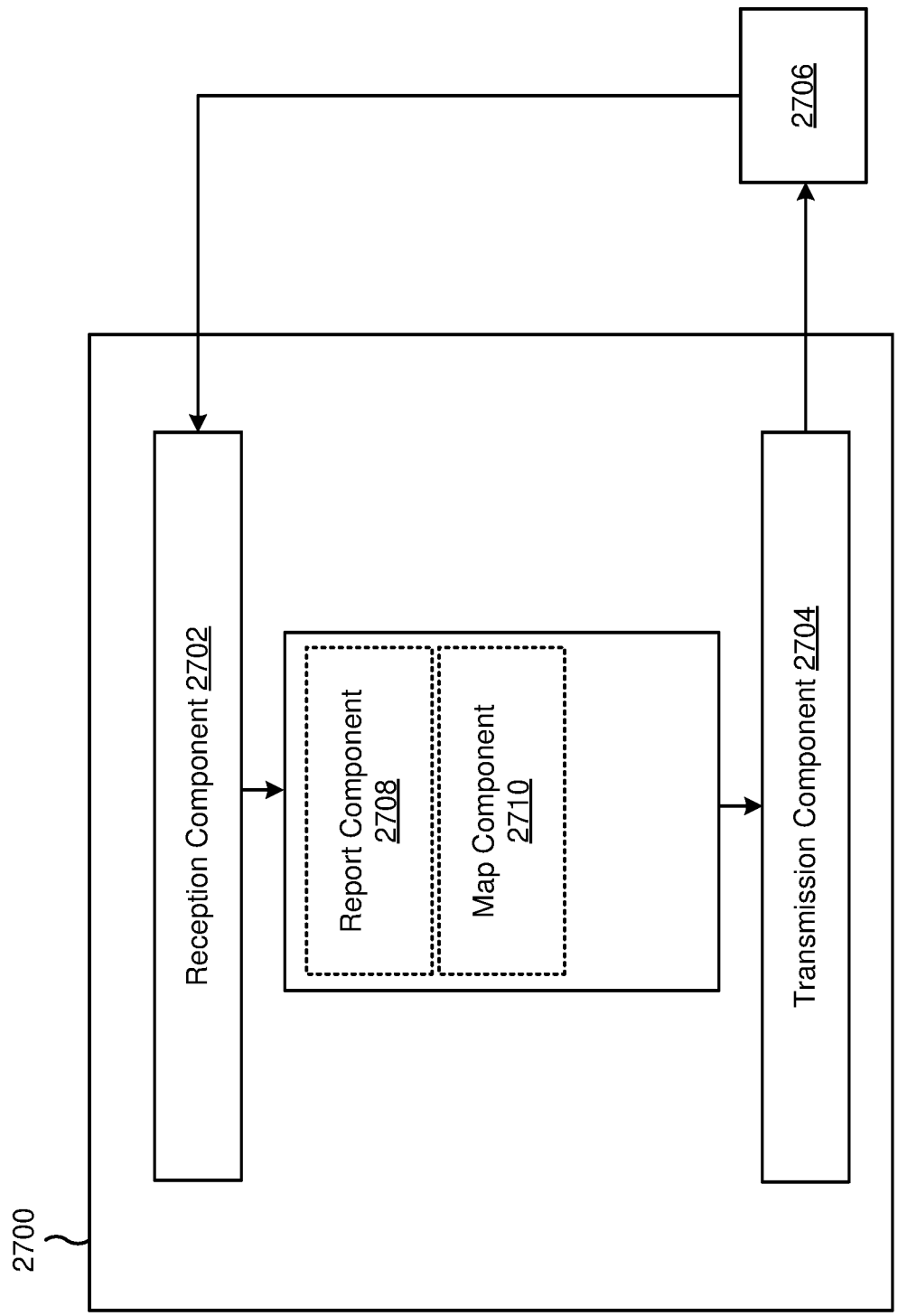
FIG. 27 is a block diagram of an example apparatus for wireless communication, in accordance with the present disclosure.

FIG. 27 is a block diagram of an example apparatus 2700 for wireless communication. The apparatus 2700 may be a base station, or a base station may include the apparatus 2700. In some aspects, the apparatus 2700 includes a reception component 2702 and a transmission component 2704, which may be in communication with one another (for example, via one or more buses and/or one or more other components). As shown, the apparatus 2700 may communicate with another apparatus 2706 (such as a UE, a base station, or another wireless communication device) using the reception component 2702 and the transmission component 2704. As further shown, the apparatus 2700 may include a report component 2708, and/or map component 2710, among other examples.

In some aspects, the apparatus 2700 may be configured to perform one or more operations described herein in connection with FIGS. 1-5 and 12-15. Additionally, or alternatively, the apparatus 2700 may be configured to perform one or more processes described herein, such as method 1900 of FIG. 19. In some aspects, the apparatus 2700 and/or one or more components shown in FIG. 27 may include one or more components of the base station described above in connection with FIG. 2. Additionally, or alternatively, one or more components shown in FIG. 27 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2702 may receive communications, such as reference signals, control information, data communications, or a combination thereof, from the apparatus 2706. The reception component 2702 may provide received communications to one or more other components of the apparatus 2700. In some aspects, the reception component 2702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2700. In some aspects, the reception component 2702 may include one or more antennas, a demodulator, a MIMO detector, a receive processor, a controller/processor, a memory, or a combination thereof, of the base station described above in connection with FIG. 2.

The transmission component 2704 may transmit communications, such as reference signals, control information, data communications, or a combination thereof, to the apparatus 2706. In some aspects, one or more other components of the apparatus 2700 may generate communications and may provide the generated communications to the transmission component 2704 for transmission to the apparatus 2706. In some aspects, the transmission component 2704 may perform signal processing on the generated communications (such as filtering, amplification, modulation, digital-to-analog conversion, multiplexing, interleaving, mapping, or encoding, among other examples), and may transmit the processed signals to the apparatus 2706. In some aspects, the transmission component 2704 may include one or more antennas, a modulator, a transmit MIMO processor, a transmit processor, a controller/processor, a memory, or a combination thereof, of the base station described above in connection with FIG. 2. In some aspects, the transmission component 2704 may be co-located with the reception component 2702 in a transceiver.

The report component 2708 may schedule a report, from a UE, for a beam indication that includes a downlink reference signal, the report including a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier. In some aspects, the report component 2708 may include one or more antennas, a demodulator, a MIMO detector, a receive processor, a modulator, a transmit MIMO processor, a transmit processor, a controller/processor, a memory, or a combination thereof, of the base station described above in connection with FIG. 2. The map component 2710 may apply a mapping between one or more antenna panels of the UE and one or more reference signal beam indications based at least in part on the report for the downlink reference signal. In some aspects, the map component 2710 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The number and arrangement of components shown in FIG. 27 are provided as an example. In practice, there may be additional components, fewer components, different components, or differently arranged components than those shown in FIG. 27. Furthermore, two or more components shown in FIG. 27 may be implemented within a single component, or a single component shown in FIG. 27 may be implemented as multiple, distributed components. Additionally, or alternatively, a set of (one or more) components shown in FIG. 27 may perform one or more functions described as being performed by another set of components shown in FIG. 27.

Figure 28:
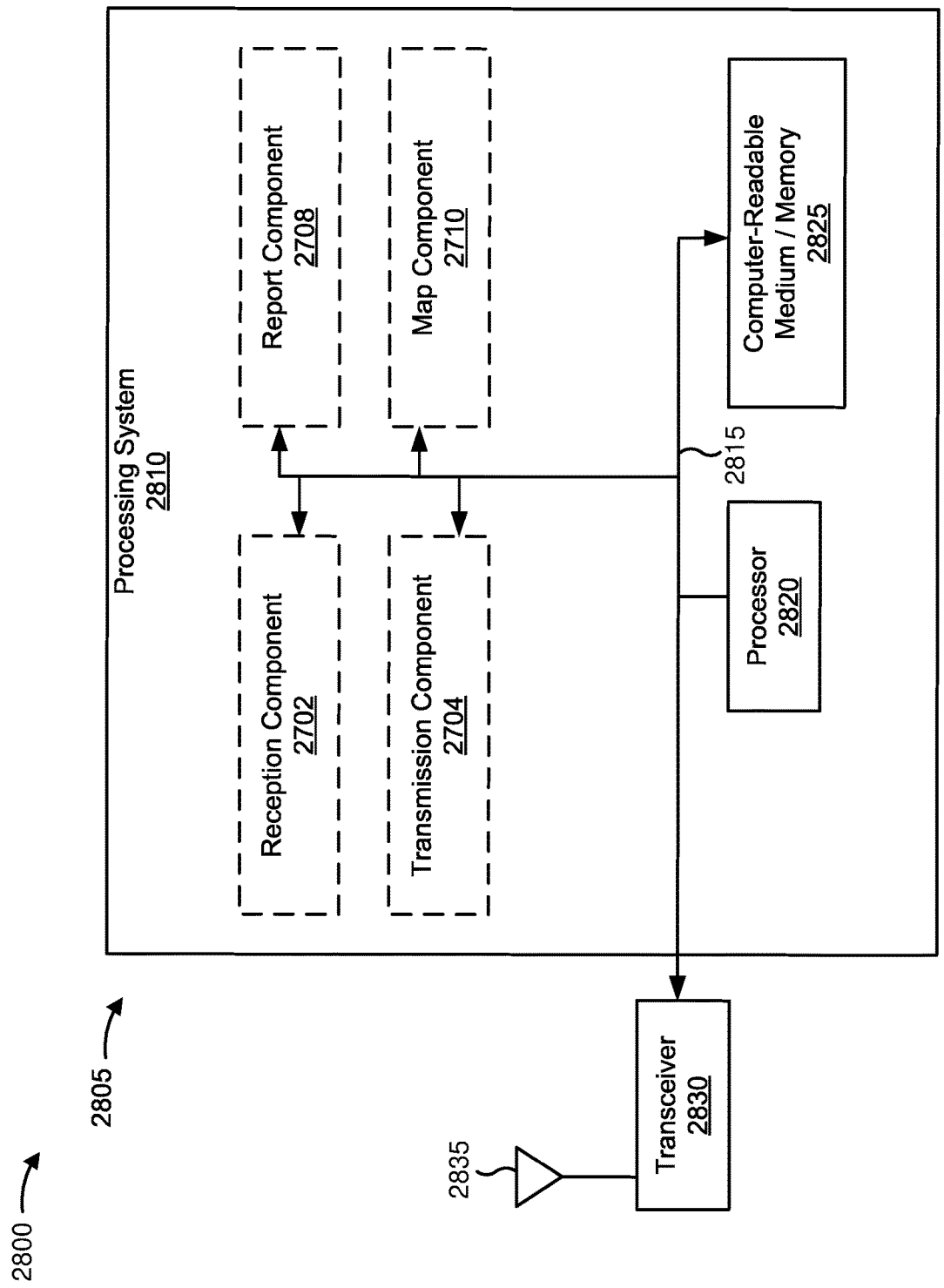
FIG. 28 is a diagram illustrating an example of a hardware implementation for an apparatus employing a processing system, in accordance with the present disclosure.

FIG. 28 is a diagram illustrating an example 2800 of a hardware implementation for an apparatus 2805 employing a processing system 2810. The apparatus 2805 may be a base station.

The processing system 2810 may be implemented with a bus architecture, represented generally by the bus 2815. The bus 2815 may include any number of interconnecting buses and bridges depending on the specific application of the processing system 2810 and the overall design constraints. The bus 2815 links together various circuits including one or more processors and/or hardware components, represented by the processor 2820, the illustrated components, and the computer-readable medium/memory 2825. The bus 2815 may also link various other circuits, such as timing sources, peripherals, voltage regulators, power management circuits, and/or the like.

The processing system 2810 may be coupled to a transceiver 2830. The transceiver 2830 is coupled to one or more antennas 2835. The transceiver 2830 provides a means for communicating with various other apparatuses over a transmission medium. The transceiver 2830 receives a signal from the one or more antennas 2835, extracts information from the received signal, and provides the extracted information to the processing system 2810, specifically the reception component 2702. In addition, the transceiver 2830 receives information from the processing system 2810, specifically the transmission component 2704, and generates a signal to be applied to the one or more antennas 2835 based at least in part on the received information.

The processing system 2810 includes a processor 2820 coupled to a computer-readable medium/memory 2825. The processor 2820 is responsible for general processing, including the execution of software stored on the computer-readable medium/memory 2825. The software, when executed by the processor 2820, causes the processing system 2810 to perform the various functions described herein for any particular apparatus. The computer-readable medium/memory 2825 may also be used for storing data that is manipulated by the processor 2820 when executing software. The processing system further includes at least one of the illustrated components. The components may be software modules running in the processor 2820, resident/stored in the computer-readable medium/memory 2825, one or more hardware modules coupled to the processor 2820, or some combination thereof. Report component 2708 and map component 2710 may perform operations described in connection with FIG. 27.

In some aspects, the processing system 2810 may be a component of the base station 110 and may include the memory 242 and/or at least one of the TX MIMO processor 230, the RX processor 238, and/or the controller/processor 240. In some aspects, the apparatus 2805 for wireless communication includes means for scheduling a report, from a UE, for a beam indication that includes a downlink reference signal, the report including a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier; and/or means for applying a mapping between one or more antenna panels of the UE and one or more reference signal beam indications based at least in part on the report for the downlink reference signal.

The aforementioned means may be one or more of the aforementioned components of the apparatus 2700 and/or the processing system 2810 of the apparatus 2805 configured to perform the functions recited by the aforementioned means. As described elsewhere herein, the processing system 2810 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 28 is provided as an example. Other examples may differ from what is described in connection with FIG. 28.

Figure 29:
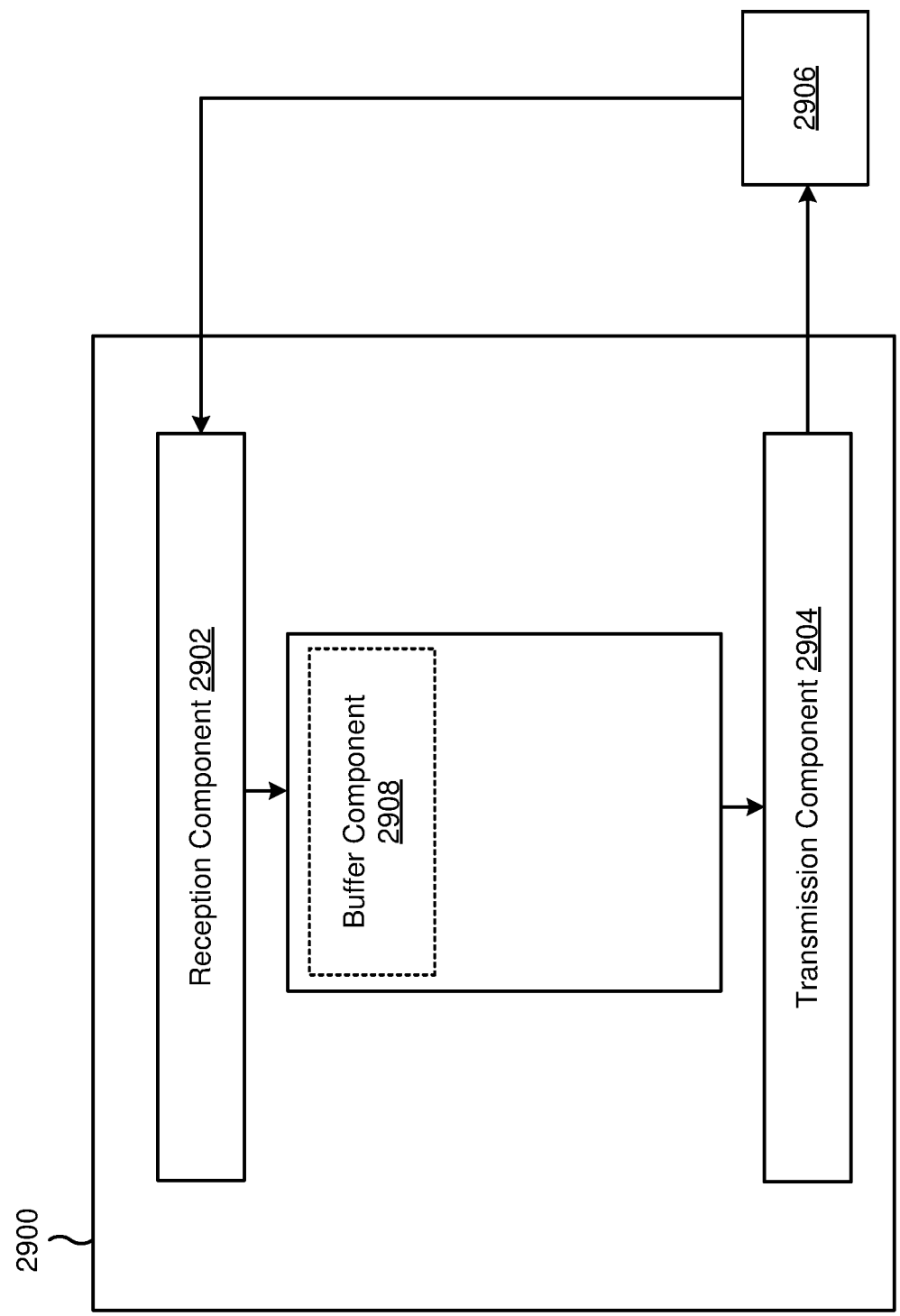
FIG. 29 is a block diagram of an example apparatus for wireless communication, in accordance with the present disclosure.

FIG. 29 is a block diagram of an example apparatus 2900 for wireless communication. The apparatus 2900 may be a UE, or a UE may include the apparatus 2900. In some aspects, the apparatus 2900 includes a reception component 2902 and a transmission component 2904, which may be in communication with one another (for example, via one or more buses and/or one or more other components). As shown, the apparatus 2900 may communicate with another apparatus 2906 (such as a UE, a base station, or another wireless communication device) using the reception component 2902 and the transmission component 2904. As further shown, the apparatus 2900 may include a buffer component 2908, among other examples.

In some aspects, the apparatus 2900 may be configured to perform one or more operations described herein in connection with FIGS. 1-5 and 12-15. Additionally, or alternatively, the apparatus 2900 may be configured to perform one or more processes described herein, such as method 2000 of FIG. 20, or a combination thereof. In some aspects, the apparatus 2900 and/or one or more components shown in FIG. 29 may include one or more components of the UE described above in connection with FIG. 2. Additionally, or alternatively, one or more components shown in FIG. 29 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2902 may receive communications, such as reference signals, control information, data communications, or a combination thereof, from the apparatus 2906. The reception component 2902 may provide received communications to one or more other components of the apparatus 2900. In some aspects, the reception component 2902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2900. In some aspects, the reception component 2902 may include one or more antennas, a demodulator, a MIMO detector, a receive processor, a controller/processor, a memory, or a combination thereof, of the UE described above in connection with FIG. 2.

The transmission component 2904 may transmit communications, such as reference signals, control information, data communications, or a combination thereof, to the apparatus 2906. In some aspects, one or more other components of the apparatus 2900 may generate communications and may provide the generated communications to the transmission component 2904 for transmission to the apparatus 2906. In some aspects, the transmission component 2904 may perform signal processing on the generated communications (such as filtering, amplification, modulation, digital-to-analog conversion, multiplexing, interleaving, mapping, or encoding, among other examples), and may transmit the processed signals to the apparatus 2906. In some aspects, the transmission component 2904 may include one or more antennas, a modulator, a transmit MIMO processor, a transmit processor, a controller/processor, a memory, or a combination thereof, of the UE described above in connection with FIG. 2. In some aspects, the transmission component 2904 may be co-located with the reception component 2902 in a transceiver.

The reception component 2902 may receive, in DCI from a base station, a scheduling offset for receiving, after the DCI, data or a downlink reference signal. The buffer component 2908 may buffer downlink data according to a default beam indication, and according to a configured mapping between the default beam indication and one or more antenna panels of the UE, based at least in part on whether the scheduling offset satisfies an offset threshold. In some aspects, the buffer component 1208 may include a demodulator, a MIMO detector, a receive processor, a controller/processor, a memory, or a combination thereof, of the UE described above in connection with FIG. 2.

The number and arrangement of components shown in FIG. 29 are provided as an example. In practice, there may be additional components, fewer components, different components, or differently arranged components than those shown in FIG. 29. Furthermore, two or more components shown in FIG. 29 may be implemented within a single component, or a single component shown in FIG. 29 may be implemented as multiple, distributed components. Additionally, or alternatively, a set of (one or more) components shown in FIG. 29 may perform one or more functions described as being performed by another set of components shown in FIG. 29.

Figure 30:
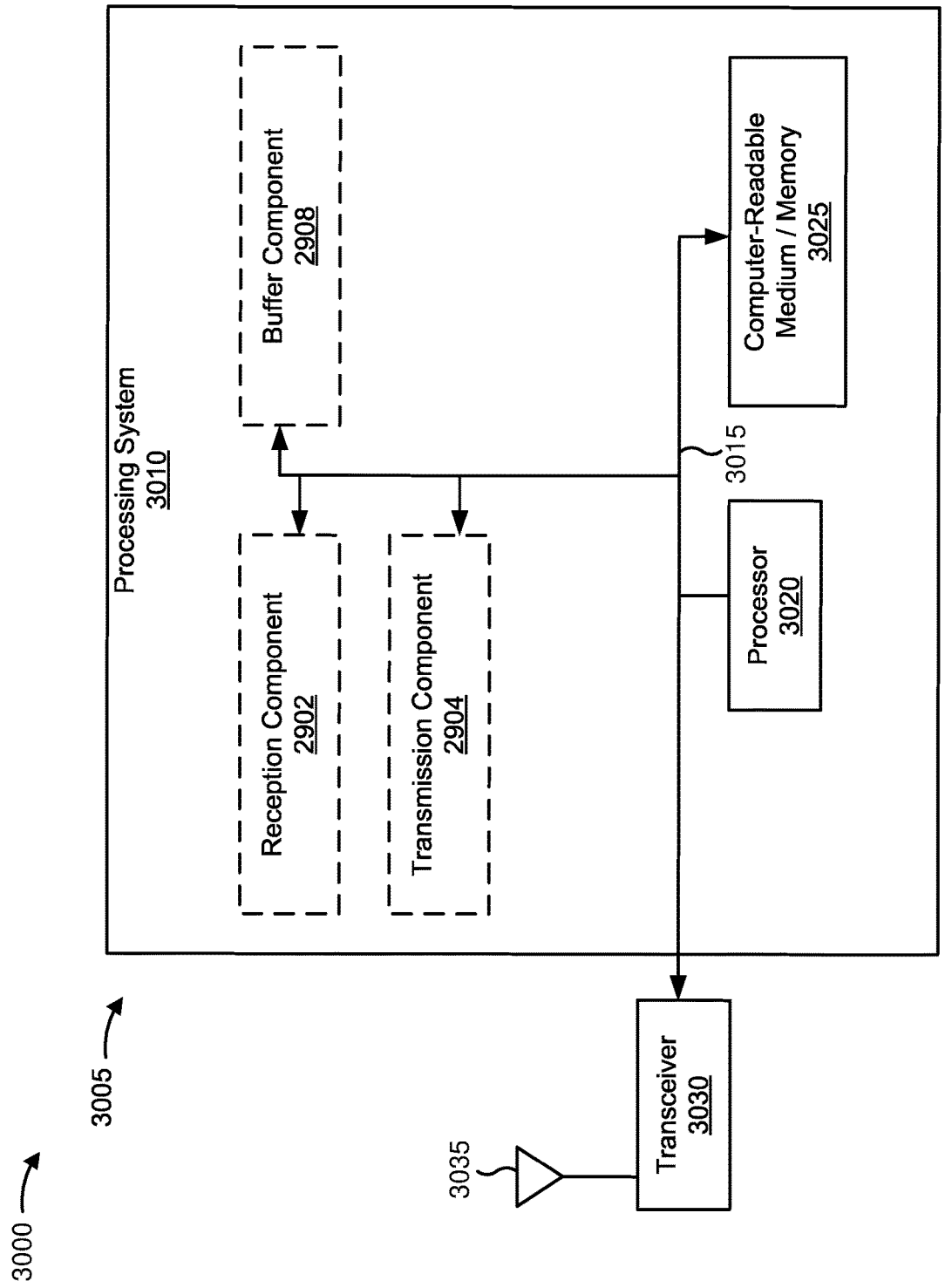
FIG. 30 is a diagram illustrating an example of a hardware implementation for an apparatus employing a processing system, in accordance with the present disclosure.

FIG. 30 is a diagram illustrating an example 3000 of a hardware implementation for an apparatus 3005 employing a processing system 3010. The apparatus 3005 may be a UE.

The processing system 3010 may be implemented with a bus architecture, represented generally by the bus 3015. The bus 3015 may include any number of interconnecting buses and bridges depending on the specific application of the processing system 3010 and the overall design constraints. The bus 3015 links together various circuits including one or more processors and/or hardware components, represented by the processor 3020, the illustrated components, and the computer-readable medium/memory 3025. The bus 3015 may also link various other circuits, such as timing sources, peripherals, voltage regulators, power management circuits, and/or the like.

The processing system 3010 may be coupled to a transceiver 3030. The transceiver 3030 is coupled to one or more antennas 3035. The transceiver 3030 provides a means for communicating with various other apparatuses over a transmission medium. The transceiver 3030 receives a signal from the one or more antennas 3035, extracts information from the received signal, and provides the extracted information to the processing system 3010, specifically the reception component 2902 depicted in FIG. 29. In addition, the transceiver 3030 receives information from the processing system 3010, specifically the transmission component 2904 depicted in FIG. 29, and generates a signal to be applied to the one or more antennas 3035 based at least in part on the received information. The buffer component 2908 may perform operations described in connection with FIG. 29.

The processing system 3010 includes a processor 3020 coupled to a computer-readable medium/memory 3025. The processor 3020 is responsible for general processing, including the execution of software stored on the computer-readable medium/memory 3025. The software, when executed by the processor 3020, causes the processing system 3010 to perform the various functions described herein for any particular apparatus. The computer-readable medium/memory 3025 may also be used for storing data that is manipulated by the processor 3020 when executing software. The processing system further includes at least one of the illustrated components. The components may be software modules running in the processor 3020, resident/stored in the computer-readable medium/memory 3025, one or more hardware modules coupled to the processor 3020, or some combination thereof.

In some aspects, the processing system 3010 may be a component of the UE 120 and may include the memory 282 and/or at least one of the TX MIMO processor 266, the RX processor 258, and/or the controller/processor 280. In some aspects, the apparatus 3005 for wireless communication includes means for receiving, in DCI from a base station, a scheduling offset for receiving, after the DCI, data or a downlink reference signal; and/or means for buffering downlink data according to a default beam indication, and according to a configured mapping between the default beam indication and one or more antenna panels of the UE, based at least in part on whether the scheduling offset satisfies an offset threshold.

The aforementioned means may be one or more of the aforementioned components of the apparatus 2900 and/or the processing system 3010 of the apparatus 3005 configured to perform the functions recited by the aforementioned means. As described elsewhere herein, the processing system 3010 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 30 is provided as an example. Other examples may differ from what is described in connection with FIG. 30.

The following provides an overview of some Aspects of the present disclosure:

Aspect 1: A method of wireless communication performed by a user equipment (UE), comprising: receiving, from a base station, a mapping between one or more antenna panels of the UE and one or more reference signal beam indications; and configuring the one or more antenna panels based at least in part on the mapping.

Aspect 2: The method of Aspect 1, wherein the configuring associates a signaled beam indication with an antenna panel of the one or more antenna panels.

Aspect 3: The method of Aspect 2, wherein parameters associated with the antenna panel include one or more of: a maximum number of multiple-input multiple-output (MIMO) layers associated with the antenna panel, or a maximum candidate analog beam number in the antenna panel.

Aspect 4: The method of Aspect 2 or 3, wherein an antenna panel identifier of the antenna panel includes one or more of a downlink antenna panel identifier, an uplink antenna panel identifier, or a joint uplink-downlink panel identifier.

Aspect 5: The method of any of Aspects 2-4, wherein the signaled beam indication includes a beam identifier corresponding to one of a transmission configuration indicator (TCI) state identifier, an uplink TCI state identifier, a spatial relation identifier, or a joint uplink-downlink TCI state identifier.

Aspect 6: The method of any of Aspects 1-5, wherein the mapping includes a mapping for a downlink reference signal that maps between: a downlink antenna panel identifier or a joint uplink-downlink antenna panel identifier, and a downlink transmission configuration indicator (TCI) state identifier or a joint uplink-downlink TCI state identifier.

Aspect 7: The method of any of Aspects 1-6, wherein the mapping includes a mapping for an uplink reference signal that maps between: an uplink antenna panel identifier or a joint uplink-downlink antenna panel identifier; and spatial relation information, an uplink TCI state identifier, or a joint uplink-downlink TCI state identifier.

Aspect 8: The method of any of Aspects 1-7, further comprising transmitting a report for a signaled beam indication that includes a downlink reference signal, wherein the report includes: a downlink reference signal identifier, measurement information, a downlink antenna panel identifier associated with the measurement information, and an uplink antenna panel identifier or a joint uplink-downlink antenna panel identifier that is mapped to a same antenna panel as the downlink antenna panel identifier.

Aspect 9: The method of Aspect 8, wherein receiving the mapping includes receiving the mapping based at least in part on transmitting the report.

Aspect 10: The method of any of Aspects 1-9, wherein the one or more antenna panels are configured based at least in part on the mapping a specified time duration after receiving the mapping or a specified time duration after transmitting an acknowledgement for the mapping.

Aspect 11: The method of any of Aspects 1-10, wherein the mapping is received in a medium access control control element (MAC CE), and wherein the one or more antenna panels are configured based at least in part on the mapping a specified time duration after transmitting an acknowledgment for the MAC CE.

Aspect 12: The method of any of Aspects 1-11, wherein the mapping is received in downlink control information (DCI) and is applicable to communications scheduled by the DCI.

Aspect 13: The method of any of Aspects 1-11, wherein the mapping is received in downlink control information (DCI) and is applicable to communications that occur a specified time duration after receiving the DCI or that occur a specified time duration after transmitting an acknowledgement for the DCI.

Aspect 14: The method of any of Aspects 1-13, wherein the one or more beam indications include a beam indication for an uplink reference signal that corresponds to a downlink reference signal, and wherein an antenna panel identifier that is mapped to a beam indication identifier for the downlink reference signal is mapped to the beam identification identifier for the uplink reference signal.

Aspect 15: The method of Aspect 14, wherein the uplink reference signal is a sounding reference signal (SRS) and the downlink reference signal is a channel state information reference signal (CSI-RS), wherein a beam indication identifier for the SRS and a beam indication identifier for the CSI-RS are the same, and wherein an antenna panel identifier for the SRS and an antenna panel identifier for the CSI-RS are the same.

Aspect 16: The method of any of Aspects 1-15, further comprising transmitting a plurality of uplink reference signals, wherein each uplink reference signal is associated with a mapping of a beam indication identifier and an antenna panel identifier, and wherein the mapping is received from the base station.

Aspect 17: The method of Aspect 16, further comprising: receiving, from the base station, an indication of a selected uplink reference signal from among the plurality of uplink reference signals; and configuring an antenna panel mapped to a beam indication that includes the selected uplink reference signal.

Aspect 18: A method of wireless communication performed by a base station, comprising: generating a mapping between one or more antenna panels of a user equipment (UE) and one or more reference signal beam indications; transmitting the mapping to the UE; and communicating with the UE based at least in part on the mapping.

Aspect 19: The method of Aspect 18, further comprising configuring an antenna panel, wherein the configuring associates the antenna panel with a signaled beam indication based at least in part on the mapping.

Aspect 20: The method of Aspect 19, wherein the configuring the antenna panel includes configuring the antenna panel with one or more of a maximum number of multiple-input multiple-output (MIMO) layers associated with the antenna panel, or a maximum candidate analog beam number in the antenna panel.

Aspect 21: The method of Aspect 19 or 20, wherein an antenna panel identifier of the antenna panel includes one or more of a downlink antenna panel identifier, an uplink antenna panel identifier, or a joint uplink-downlink panel identifier.

Aspect 22: The method of any of Aspects 19-21, wherein a beam indication identifier of the signaled beam indication corresponds to one of a transmission configuration indicator (TCI) state identifier, an uplink TCI state identifier, a spatial relation identifier, or a joint uplink-downlink TCI state identifier.

Aspect 23: The method of any of Aspects 18-22, wherein the mapping includes a mapping for a downlink reference signal that maps between: a downlink antenna panel identifier or a joint uplink-downlink antenna panel identifier, and a downlink transmission configuration indicator (TCI) state identifier or a joint uplink-downlink TCI state identifier.

Aspect 24: The method of any of Aspects 18-22, wherein the mapping includes a mapping for an uplink reference signal that maps between: an uplink antenna panel identifier or a joint uplink-downlink antenna panel identifier; and spatial relation information, an uplink TCI state identifier, or a joint uplink-downlink TCI state identifier.

Aspect 25: The method of any of Aspects 18-24, further comprising: scheduling the UE to transmit a report that includes a downlink reference signal identifier, measurement information, a downlink antenna panel identifier associated with the measurement information, and an uplink antenna panel identifier or a joint uplink-downlink antenna panel identifier that is mapped to a same antenna panel as the downlink antenna panel identifier, wherein generating the mapping includes generating the mapping based at least in part on the report.

Aspect 26: The method of any of Aspects 18-25, further comprising configuring an antenna panel based at least in part on the mapping a specified time duration after transmitting the mapping or a specified time duration after receiving an acknowledgement for the mapping.

Aspect 27: The method of any of Aspects 18-26, wherein transmitting the mapping includes transmitting the mapping in a medium access control control element (MAC CE), and wherein the method further comprises configuring an antenna panel based at least in part on the mapping a specified time duration after receiving an acknowledgment for the MAC CE.

Aspect 28: The method of any of Aspects 18-26, wherein transmitting the mapping includes transmitting the mapping in downlink control information (DCI), and wherein the method further comprises configuring an antenna panel based at least in part on the mapping for transmissions scheduled by the DCI.

Aspect 29: The method of any of Aspects 18-26, wherein transmitting the mapping includes transmitting the mapping in downlink control information (DCI), and wherein the method further comprises configuring an antenna panel based at least in part on the mapping for communications that occur a specified time duration after transmitting the DCI or that occur a specified time duration after receiving an acknowledgement for the DCI.

Aspect 30: The method of any of Aspects 18-29, further comprising: receiving a plurality of uplink reference signals, wherein each uplink reference signal is associated with a mapping of a beam indication identifier and an antenna panel identifier; selecting an uplink reference signal from among the plurality of uplink reference signals based at least in part on measurements of the plurality of uplink reference signals; transmitting, to the UE, an indication of the selected reference signal; and configuring an antenna panel mapped to a beam indication that includes the selected uplink reference signal.

Aspect 31: A method of wireless communication performed by a user equipment (UE), comprising: transmitting a report, scheduled by a base station, for a beam indication that includes a downlink reference signal, the report including a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier; and applying a mapping between one or more antenna panels of the UE and one or more reference signal beam indications based at least in part on the report for the downlink reference signal.

Aspect 32: The method of Aspect 31, wherein applying the mapping includes applying the mapping a specified time duration after transmitting the report or a specified time duration after receiving an acknowledgement for the report from the base station.

Aspect 33: A method of wireless communication performed by a base station, comprising: scheduling a report, from a user equipment (UE), for a beam indication that includes a downlink reference signal, the report including a downlink reference signal identifier, measurement information, a downlink antenna panel identifier associated with the measurement information, and an uplink antenna panel identifier or joint uplink-downlink antenna panel identifier that is mapped to a same antenna panel as the downlink antenna panel identifier; and applying a mapping between one or more antenna panels of the UE and one or more reference signal beam indications based at least in part on the report for the downlink reference signal.

Aspect 34: The method of Aspect 33, wherein applying the mapping includes applying the mapping a specified time duration after receiving the report or a specified time duration after transmitting an acknowledgement for the report.

Aspect 35: A method of wireless communication performed by a user equipment (UE), comprising: receiving, in downlink control information (DCI) from a base station, a scheduling offset for receiving, after the DCI, data or a downlink reference signal; and buffering downlink data according to a default beam indication, and according to a configured mapping between the default beam indication and one or more antenna panels of the UE, based at least in part on whether the scheduling offset satisfies an offset threshold.

Aspect 36: The method of Aspect 35, wherein the default beam indication is for a downlink reference signal, and wherein the method further comprises configuring an antenna panel that is mapped to the default beam indication.

Aspect 37: The method of Aspect 35, wherein the default beam indication is for an uplink reference signal, and wherein the method further comprises configuring an antenna panel that is mapped to the default beam indication.

Aspect 38: An apparatus for wireless communication at a device, comprising a processor; memory coupled with the processor; and instructions stored in the memory and executable by the processor to cause the apparatus to perform the method of one or more of Aspects 1-37.

Aspect 39: A device for wireless communication, comprising a memory and one or more processors coupled to the memory, the one or more processors configured to perform the method of one or more of Aspects 1-37.

Aspect 40: An apparatus for wireless communication, comprising at least one means for performing the method of one or more of Aspects 1-37.

Aspect 41: A non-transitory computer-readable medium storing code for wireless communication, the code comprising instructions executable by a processor to perform the method of one or more of Aspects 1-37.

Aspect 42: A non-transitory computer-readable medium storing a set of instructions for wireless communication, the set of instructions comprising one or more instructions that, when executed by one or more processors of a device, cause the device to perform the method of one or more of Aspects 1-37.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive a configuration associated with sounding reference signals (SRSs), wherein:
the SRSs are associated with one or more beam indications,
the one or more beam indications correspond to spatial relation information and to a downlink reference signal that is a source reference signal, and
the one or more beam indications are associated with a maximum quantity of antenna ports for uplink communications; and
communicate with a network entity based at least in part on the one or more beam indications.

2. The UE of claim 1, wherein the one or more beam indications are indicative of the maximum quantity of antenna ports.

3. The UE of claim 1, wherein the uplink communications include SRSs associated with the one or more beam indications.

4. The UE of claim 1, wherein the one or more processors, to communicate with the network entity, are configured to:
transmit the SRSs on one or more configured SRS resource sets.

5. The UE of claim 1, wherein the downlink reference signal includes one or more of:
a synchronization signal block (SSB),
a channel state information (CSI) reference signal (CSI-RS),
a demodulation reference signal (DMRS),
a positioning reference signal (PRS), or
a phase tracking reference signal (PTRS).

6. The UE of claim 1, wherein the one or more processors are configured to:
receive an indication of a mapping between the one or more beam indications and one or more antenna panels.

7. The UE of claim 1, wherein the one or more processors are configured to:
configure one or more antenna panels based at least in part on the one or more beam indications.

8. The UE of claim 1, wherein the one or more processors are configured to:
transmit a report for a beam indication of the one or more beam indications, the report including:
a downlink reference signal identifier,
measurement information,
a downlink antenna panel identifier associated with the measurement information, and
an uplink antenna panel identifier or a joint uplink-downlink antenna panel identifier that is mapped to a same antenna panel as the downlink antenna panel identifier.

9. A network entity for wireless communication, comprising:
one or more memories; and
one or more processors, coupled to the one or more memories, configured to:
transmit a configuration associated with sounding reference signals (SRSs), wherein:
the SRSs are associated with one or more beam indications,
the one or more beam indications correspond to spatial relation information and to a downlink reference signal that is a source reference signal, and
the one or more beam indications are associated with a maximum quantity of antenna ports for uplink communications; and
communicate with a user equipment (UE) based at least in part on the one or more beam indications.

10. The network entity of claim 9, wherein the one or more beam indications are indicative of the maximum quantity of antenna ports.

11. The network entity of claim 9, wherein the uplink communications include SRSs associated with the one or more beam indications.

12. The network entity of claim 9, wherein the one or more processors, to communicate with the network entity, are configured to:
receive the SRSs on one or more configured SRS resource sets.

13. The network entity of claim 9, wherein the downlink reference signal includes one or more of:
- a synchronization signal block (SSB),
- a channel state information (CSI) reference signal (CSI-RS),
- a demodulation reference signal (DMRS),
- a positioning reference signal (PRS), or
- a phase tracking reference signal (PTRS).

14. The network entity of claim 9, wherein the one or more processors are configured to:
transmit an indication of a mapping between the one or more beam indications and one or more antenna panels.

15. The network entity of claim 9, wherein the one or more processors are configured to:
receive a report for a beam indication of the one or more beam indications, the report including:
- a downlink reference signal identifier,
- measurement information,
- a downlink antenna panel identifier associated with the measurement information, and
- an uplink antenna panel identifier or a joint uplink-downlink antenna panel identifier that is mapped to a same antenna panel as the downlink antenna panel identifier.

16. A method of wireless communication at a user equipment (UE), comprising:
receiving a configuration associated with sounding reference signals (SRSs), wherein:
- the SRSs are associated with one or more beam indications,
- the one or more beam indications correspond to spatial relation information and to a downlink reference signal that is a source reference signal, and
- the one or more beam indications are associated with a maximum quantity of antenna ports for uplink communications; and communicating with a network entity based at least in part on the one or more beam indications.

17. The method of claim 16, wherein the one or more beam indications are indicative of the maximum quantity of antenna ports.

18. The method of claim 16, wherein the uplink communications include SRSs associated with the one or more beam indications.

19. The method of claim 16, wherein communicating with the network entity comprises:
transmitting the SRSs on one or more configured SRS resource sets.

20. The method of claim 16, wherein the downlink reference signal includes one or more of:
- a synchronization signal block (SSB),
- a channel state information (CSI) reference signal (CSI-RS),
- a demodulation reference signal (DMRS),
- a positioning reference signal (PRS), or
- a phase tracking reference signal (PTRS).

* * * * *